US012792653B1

(12) United States Patent
Jain et al.

(10) Patent No.: US 12,792,653 B1
(45) Date of Patent: Nov. 10, 2026

(54) ISSUE TRACKING PLATFORM HAVING A GENERATIVE SERVICE FOR GENERATING AUTOMATED ASSISTANT SERVICES FOR PROCESSING ISSUE OBJECTS

(71) Applicant: Atlassian Pty Ltd., Sydney (AU)

(72) Inventors: Anmol Jain, Sunnyvale, CA (US); Joseph Andrew DeGregorio, Seattle, WA (US); Nisha Iyer, Washington, DC (US)

(73) Assignee: Atlassian Pty Ltd., Sydney (AU)

( * ) Notice: Subject to any disclaimer, the term of this patent is extended or adjusted under 35 U.S.C. 154(b) by 0 days.

(21) Appl. No.: 19/342,556

(22) Filed: Sep. 27, 2025

(51) Int. Cl.
*G06F 16/334* (2025.01)
*G06F 16/353* (2025.01)
*H04L 41/5074* (2022.01)

(52) U.S. Cl.
CPC ........ *G06F 16/3347* (2019.01); *G06F 16/353* (2019.01); *H04L 41/5074* (2013.01)

(58) Field of Classification Search
CPC . G06F 16/3347; G06F 16/353; H04L 41/5074
See application file for complete search history.

(56) References Cited

U.S. PATENT DOCUMENTS

| | | | | |
|---|---|---|---|---|
| 6,112,181 A * | 8/2000 | Shear | ..................... | G06Q 30/02 705/7.29 |
| 11,336,539 B2 * | 5/2022 | Rath | .................... | G06Q 30/016 |
| 12,267,219 B2 * | 4/2025 | Rath | ...................... | G06N 20/20 |
| 12,639,361 B2 * | 5/2026 | Jiang | ..................... | G06F 16/383 |
| 2003/0046244 A1 * | 3/2003 | Shear | .................... | G06F 16/285 705/52 |
| 2019/0220695 A1 * | 7/2019 | Nefedov | ........... | G06F 16/24578 |
| 2019/0258966 A1 * | 8/2019 | Baron | .................... | G06Q 10/02 |
| 2021/0264253 A1 * | 8/2021 | Damodaran | ........ | G06F 16/2457 |
| 2026/0024037 A1 * | 1/2026 | Mystetskyi | ...... | G06Q 10/06316 |
| 2026/0089051 A1 * | 3/2026 | Sarkar | ................. | H04L 41/0631 |
| 2026/0127383 A1 * | 5/2026 | Feng | ................... | G06F 16/3329 |
| 2026/0154277 A1 * | 6/2026 | Landes | ............. | G06F 16/24578 |

* cited by examiner

*Primary Examiner* — Jorge A Casanova
(74) *Attorney, Agent, or Firm* — Fish & Richardson P.C.

(57) ABSTRACT

Embodiments relate to systems and methods for creating automated assistant services that can be used to perform actions on issue objects managed by an issue tracking system. The methods can include obtaining issue tickets, extracting issue content from the issue tickets and generating a first prompt using the extracted issue content and instructions to identify resolutions steps for each issue ticket. The methods can include using a clustering operation to obtain a group of related issue tickets using a generative output from the first prompt and generating a second prompt that includes the group of related issue tickets. The second prompt can include instructions for defining a problem definition and product specification for the group of related issue tickets. The system can create an automated assistant service using the problem definition and product specification and the automated assistant service can perform operations on new issues.

20 Claims, 18 Drawing Sheets

ISSUE TRACKING PLATFORM HAVING A GENERATIVE SERVICE FOR GENERATING AUTOMATED ASSISTANT SERVICES FOR PROCESSING ISSUE OBJECTS

FIELD

Embodiments described herein relate to multi-tenant services of collaborative work environments and, in particular, to systems and methods for operating generative services that can create automated assistant services that can be used to perform actions on content items managed by a content collaboration platform.

BACKGROUND

An organization can employ software tools to assist with technical problems and interruptions in technical services. Typically, an issue tracking platform or similar platform is used to track and manage technical problems submitted by system users. Different users may each submit requests for a similar or same problem. In some cases, these request may be handled independently by the system, and the system may expend duplicative resource solving each of these issues separately. Additionally, some solutions for a same or similar request may be more effective or efficient at resolving the request. In large integrated issue tracking platforms it may be difficult to cross-reference solutions or utilize previous solutions to address new issue requests. The systems and techniques described herein can be used to automatically generate automated assistant services, which may be used to automate processing of issue objects or other content items.

SUMMARY

Embodiments described herein are directed to system and methods for generating automated assistant services. The methods can include obtaining, at a first server system, a first set of issue tickets corresponding to issues managed by an issue tracking platform, where each issue ticket of the first set of issue tickets associated with an escalation event indicating transition of a respective issue ticket from an automated support system to a user-based support system. The methods can include extracting issue content from the first set of issue tickets. The issue content can be extracted from a message thread associated with each issue ticket of the first set of issue tickets and include input information generated by a respective first user of the issue tracking platform as part of a service request and support information generated by a respective second user of the issue tracking platform as part of an issue response. The methods can include generating a first prompt that includes the extracted issue content for the first set of issue tickets and prompt text including instructions for identifying resolutions steps and corresponding customer inputs for each issue ticket. The methods can include providing the prompt to a generative output engine and obtaining a first structured data set. The first structured data set can include, for each issue ticket of the first set of issue tickets, one or more resolutions steps for a respective issue ticket and one or more customer inputs corresponding to the one or more resolution steps for the respective issue ticket. The methods can include performing a clustering operation on the first structured data set to obtain a cluster group comprising a first subset of issue tickets from the first set of issue tickets included in the first structured data set. The methods can include generating a second prompt including the first subset of issue tickets assigned to the cluster group and instructions for defining a problem definition for the first subset of issue tickets and a product specification document defining parameters for an automated assistant service that can be used to resolve the problem for the first subset of issue tickets. The methods can include providing the second prompt to the generative output engine and obtaining a second structured data set comprising the problem definition and the product specification document. The methods can include generating the automated assistant service using the second structured data set. The automated assistant service can be configured to be utilized by an automated processing service when processing an issue submitted to the issue tracking platform. In response to receiving a new issue ticket determined to correspond to the problem definition, the methods can include causing the automated processing service to utilize the automated assistant service to perform one or more operations for the new issue ticket.

Embodiments described herein are also directed to computer-implemented methods that include obtaining, at a first server system, a first set of issue tickets corresponding to issues managed by an issue tracking platform. The methods can include extracting issue content from the first set of issue tickets. The issue content extracted from a message thread can be associated with each issue ticket of the first set of issue tickets and include input information generated by a respective first user of the issue tracking platform as part of a service request and support information generated by a respective second user of the issue tracking platform as part of an issue response. The methods can include generating a first prompt including the extracted issue content for the first set of issue tickets and prompt text comprising instructions for identifying resolutions steps and corresponding customer inputs for each issue ticket. The methods can include providing the prompt to a generative output engine and obtaining a first structured data set. The first structured data set can include, for each issue ticket of the first set of issue tickets, one or more resolutions steps for a respective issue ticket and one or more customer inputs corresponding to the one or more resolution steps for the respective issue ticket. The methods can include performing a clustering operation on the first structured data set. The clustering operation can include performing a first clustering operation to separate issue tickets of the first set of issue tickets into multiple cluster groups, for a first cluster group of the multiple cluster groups, identifying a first subset of issue tickets as key issue tickets, and performing, using the key issue tickets, a query at the issue tracking platform to identify a second set of issue tickets that satisfy a similarity metric with respect to the key issue tickets. The methods can include generating a second prompt comprising the key issue tickets and the second set of issue tickets, and instructions for defining a problem definition for issue tickets included in the second prompt and a product specification document defining parameters that can be used to generate an automated assistant service to resolve the issue tickets included in the second prompt. The methods can include providing the second prompt to the generative output engine and obtaining a second structured data set including the problem definition and the product specification document. The methods can include generating the automated assistant service using the second structured data set. The automated assistant service can be configured to be utilized by an automated processing service when processing an issue submitted to the issue tracking platform. In response to receiving a new issue ticket determined to correspond to the problem definition, the method can include causing the automated processing service to utilize the automated assistant service to perform one or more operations for the new issue ticket.

Embodiment described herein are further directed to computer-implemented methods that include obtaining, at a first server system, a first set of issue tickets corresponding to issues managed by an issue tracking platform. The methods can include extracting issue content from the first set of issue tickets. The issue content extracted from a message thread can be associated with each issue ticket of the first set of issue tickets and include input information generated by a first user of the issue tracking platform as part of a service request, and support information generated by a second user of the issue tracking platform as part of an issue response. The methods can include generating a first prompt comprising the extracted issue content for the first set of issue tickets and prompt text comprising instructions for identifying resolutions steps and corresponding customer inputs for each issue ticket. The methods can include providing the prompt to a generative output engine and obtaining a first set of structured data. The first set of structured data can include, for each issue ticket of the first set of issue tickets, one or more resolutions steps for a respective issue ticket and one or more customer inputs corresponding to the one or more resolution steps for the respective issue ticket. The methods can include performing a clustering operation on the first set of structured data. The clustering operation can include performing a first clustering operation to separate issue tickets of the first set of issue tickets into multiple cluster groups, and performing a second clustering operation causing one or more issue tickets to be moved between cluster groups of the multiple cluster groups. The methods can include generating, for each of the multiple cluster groups, a respective prompt including a subset of issue tickets assigned to a respective cluster group and instructions for defining a problem definition for the subset of issue tickets and a product specification document defining parameters for an automated assistant service that can be used to resolve the problem for the subset of issue tickets in the respective cluster group. The methods can include generating, using one or more outputs obtained in response to providing each respective prompt to the generative output engine, multiple automated assistant services. The methods can include in response to receiving a new issue ticket that is categorized as corresponding, causing one of the multiple automated actions agents to perform one or more operations for the new issue ticket.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

Figure 1:
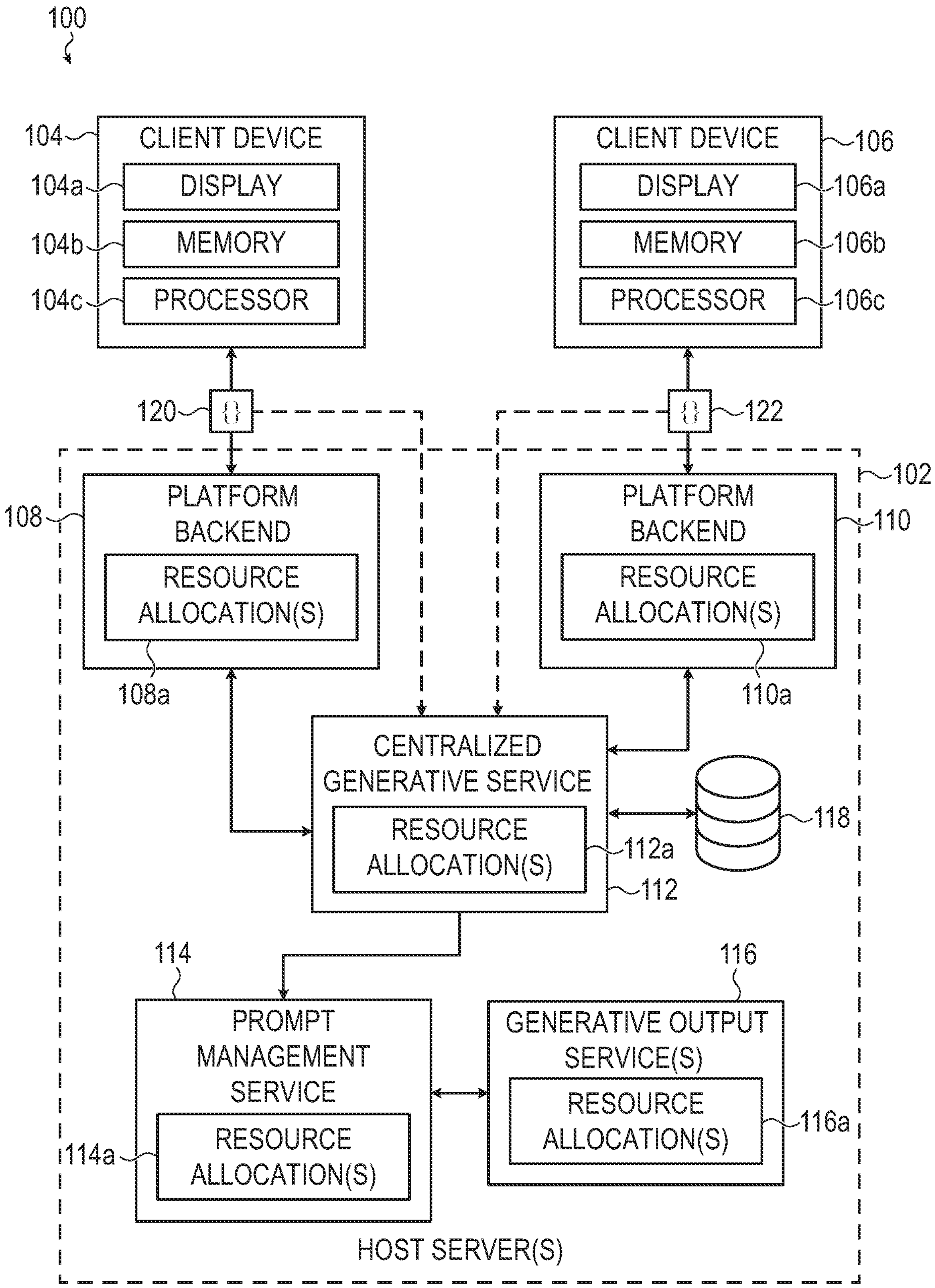
FIG. 1 depicts an example diagram of a system, such as described herein that can include and/or may receive input from a generative output engine.

The use of the same or similar reference numerals in different figures indicates similar, related, or identical items. Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein are directed to systems and methods for utilizing a generative service to create automated assistant services that can perform one or more operations for issue tickets managed by an issue tracking platform. An issue tracking platform may be used to submit issue requests, assign work within an organization and/or to track completion of work. A ticketing system may be used to track compliance with service level agreements, and so on. An issue tracking platform can manage various issues or tasks that are processed in accordance with an automated workflow. The workflow may define a series of states that the issue ticket or task must traverse before being completed. The system may also track user interaction events, issue state transitions, and other events that occur over the lifecycle of the issue, which may be indexed and searchable by the platform. In some cases, the issue tracking platform may include or interface with an automated processing service that can perform one or more actions on an issue ticket associated with an issue. An automated processing service may be configured for user interactions using natural language inputs and utilize one or more generative output engines to provide responses and/or perform actions on an issue ticket, as described herein.

There may be issue tickets that included problems or required actions that cannot be addresses using an automated processing service. For example, the automated processing service may not have access to the appropriate information sources, databases or other platforms/systems, the appropriate permissions for accessing these system, may not include training sets that allow it to solve the particular problem (e.g., not be configured with appropriate syntax), and/or other reasons that the automated processing service is unable to perform and resolve issue related to one or more particular issue tickets. In these cases, issue tickets may be sent to a support agent, and the support agent may take one or more actions to progress the issue ticket to completion. As user herein, the term "support agent" may be used to refer to a human user of the system that may perform actions on an issue, cause updates, transitions or other actions to occur in relation to an issue ticket, and so on. A support agent may include a user having a designated skill set and issue tickets may be assigned or escalated to support agents based on the issue data and designated skill set or skill level of the agent. The support agent may analyze the issue ticket and perform one or more actions to progress and/or resolve the issue ticket.

The system may also track user interaction events (e.g., messages), issue state transitions, automations associated with the issue and other events that occur over the lifecycle of the issue, which may be indexed and searchable by the system. A graphical user interface for an issue ticket can include fields that display issue content for the issue, which may include a title, summary, description, workflow, assigned users, relationships to other issues/content, and so on. The issue content can include a message thread, which may capture inputs from a requesting user (i.e., user that submitted the issue request resulting in creation of the issue ticket), messages to or from the requesting user, messages generated by an automated processing service, messages generated by a support agent, and so on. In some cases, the message thread can include steps performed by a support agent, reference resources (e.g., technical documents hosted at a collaborative document platform), and include indications of actions, transitions or other events that occurred in relation to the issue ticket.

The systems and methods described herein can be configured to identify issue tickets that were escalated from an automated processing service to a support agent. For example, the systems and methods described herein may identify issue tickets in which an automated assistance service was not able to address one or more aspects of an issue ticket and the issue was escalated to a support agent and resolved by the support agent. The systems and methods described herein can extract and utilize information from these escalated issue tickets to generate automated assistant services that can be utilized by the automated processing service to perform operations on new tickets that have a similar issue or set of issues that need to be resolved. As used herein the term "automated assistant services" may be used to refer to specialized applications, services or systems that can be utilized by a more generalized automated processing service, and can include specialized configurations that allow the automated assistant service to perform specialized actions with respect to a particular issue ticket. The automated assistant services can be specialized processing configurations that are configured to address a specific type of issue and be utilized by the automated processing service to resolve the specific type of issue. In some cases, the automated assistant services can provide automated services that are not performed by a more general assistant service such as an automated processing service, as described herein. In this way the automated assistant services may be utilized to supplement or expand the capabilities of a generalized natural language service such as an automated processing service without needing to reconfigure or retrain the automated processing service.

The systems described herein can be configured to analyze issue content from issue tickets to determine one or more issue groups. Each issue group may identify issue tickets having issues that were resolved using similar process steps. The system can be configured to determine the issue groups based on identifying issue tickets in which one or more issues were or could be resolved using the same or similar process. The system can be configured to use issue content from a determined issue group to generate a problem definition that provides a summary of the common issue for issue tickets assigned to a same issue group. The system can also be configured to use the issue content from the determined issue group to generate a product specification document defining parameters for an automated assistant service that can be used to resolve the common issue for the issues tickets assigned to a same group. In some cases, the system may generate an automated assistant service using the problem specification documents and/or the problem definition.

The automated assistant service can be utilized by the issue tracking platform to perform operations on issue tickets that are determined to correspond to the problem definition. For example, the system may perform a semantic analysis between newly submitted issues and the problem definition and identify new issues having a threshold correspondence to the problem definition. The issue tracking platform may utilize the associated automated assistant service to perform one or more actions on the new issues. Accordingly, systems and methods described herein may analyze system data to create and utilize automated assistant services that can perform actions on issue tickets that previously required assignment to specialized user for progressing or resolving workflow steps for the issue ticket.

The issue tracking platform may utilize one or more generative output engines to create and implement the automated assistant services, described herein. In some cases, issue content from escalated issues (e.g., issues that were transition from an automated processing service and to a support agent) may be processed to extract specific types of issue content, which can be included in a prompt to a generative output engine. For example, the system may be configured to, for each escalated issue, extract message data from a message thread and submit the extracted message data in the prompt. The prompt can include instructions for a generative output engine to identify resolutions steps from the message content and customer inputs correspond to the resolution steps. For example, as a support agent performs actions with respect to an issue ticket, the support agent may input these actions into a message for the ticket. In some cases, these actions may include steps that are performed by a requesting user, performed by the system, and so on. Additionally, the message thread may include inputs such as a description of the problem that a requesting user is experiencing. Accordingly, the prompt can be configured to cause the generative output engine to analyze the message thread content and identify a problem as characterized by a requesting user and the steps that were determined by a specialized agent to resolve the problem.

The generative output engine can be configured to output a structured data set that identifies each escalated issue ticket, the resolution steps for a respective ticket, and customer inputs (e.g., a problem definition) corresponding to the resolution steps. The system can be configured to analyze the structured data set to identify issue tickets having similar problems and/or having similar resolution steps. For example, the system can be configured to perform a clustering operation on the structured data set to separate the issue tickets into cluster groups based on a similarity of the problems and/or resolution steps. For each cluster group, the system can utilize a generative output engine to analyze issue data for the issue tickets assigned to the cluster group and generate a problem definition and product specification document defining parameters for an automated assistant service that can be used to resolve the problem for the issue tickets in the cluster group. Accordingly, the system may create an automated assistant service for multiple different problems identified from the escalated issue tickets based on a similarity of the problems and/or resolutions steps between issues.

The systems described herein can utilize automated assistant services to perform one or more automations, operations or other processes on new issue tickets. For example, in response to receiving a new issue ticket at the issue tracking platform, the issue tracking platform may be configured to analyze the new issue ticket data to determine whether the new issue ticket corresponds to a particular automated assistant service. In some cases, this can include performing a semantic analysis on the new issue ticket data (e.g., a title provided by a respecting user, a description of the issue provided by the requesting user, message thread data, and/or other content associated with the new ticket). The semantic analysis can generate embedded vector representations of issue content from the new issue ticket. The system can determine a similarity criterion of the new ticket with respect to one or more of the automated assistant services. For example, the system may determine a similar criterion based on a semantic similarity between the new issue ticket data and a problem definition corresponding to an automated assistant service. If the similarity criterion satisfies a defined metric, the system can be configured to utilize the corresponding automated assistant service for performing actions for the new issue ticket.

Scalable Network Architecture for Automatic Content Generation

Systems and methods described herein can leverage a scalable network architecture that includes an input request queue, a normalization (and/or redaction) preconditioning processing pipeline, an optional secondary request queue, and a set of one or more purpose-configured large language model instances (LLMs) and/or other trained classifiers or natural language processors.

Collectively, such engines or natural language processors may be referred to herein as "generative output engines." A system incorporating a generative output engine can be referred to as a "generative output system" or a "generative output platform." Broadly, the term "generative output engine" may be used to refer to any combination of computing resources that cooperate to instantiate an instance of software (an "engine") in turn configured to receive a string prompt as input and configured to provide, as deterministic or pseudo-deterministic output, generated text which may include words, phrases, paragraphs and so on in at least one of (1) one or more human languages, (2) code complying with a particular language syntax, (3) pseudocode conveying in human-readable syntax an algorithmic process, or (4) structured data conforming to a known data storage protocol or format, or combinations thereof.

The string prompt (or "input prompt" or simply "prompt") received as input by a generative output engine can be any suitably formatted string of characters, in any natural language or text encoding.

In some examples, prompts can include non-linguistic content, such as media content (e.g., image attachments, audiovisual attachments, files, links to other content, and so on) or source or pseudocode. In some cases, a prompt can include structured data such as tables, markdown, JSON formatted data, XML formatted data, and the like. A single prompt can include natural language portions, structured data portions, formatted portions, portions with embedded media (e.g., encoded as base64 strings, compressed files, byte streams, or the like) pseudocode portions, or any other suitable combination thereof.

The string prompt may include letters, numbers, whitespace, punctuation, and in some cases formatting. Similarly, the generative output of a generative output engine as described herein can be formatted/encoded according to any suitable encoding (e.g., ISO, Unicode, ASCII as examples).

In these embodiments, a user may provide input to a software platform coupled to a network architecture as described herein. The user input may be in the form of interaction with a graphical user interface affordance (e.g., button or other UI element), or may be in the form of plain text. In some cases, the user input may be provided as typed string input provided to a command prompt triggered by a preceding user input. Many of the examples described herein are directed to an interface that includes a generative interface panel having an input region that can receive commands, references to content, links, and other input, at least a portion of which is provided as natural language text.

In some examples, the user may engage with a button in a UI that causes the generative interface panel or a command prompt input box to be rendered, into which the user can begin typing a command. In other cases, the user may position a cursor within an editable text field and the user may type a character or trigger sequence of characters that cause a command-receptive user interface element to be rendered. As one example, a text editor may support slash commands—after the user types a slash character, any text input after the slash character can be considered as a command to instruct the underlying system to perform a task.

Regardless of how a software platform user interface is instrumented to receive user input, the user may provide an input that includes a string of text including a natural language request or instruction (e.g., a prompt). The prompt may be provided as input to an input queue including other requests from other users or other software platforms. Once the prompt is popped from the queue, it may be normalized and/or preconditioned by a preconditioning service. The preconditioning service may be provided by one or more registered plugins that are selected in accordance with an analysis of the input and/or context of the current session.

The preconditioning service can, without limitation: append additional context to the user's raw input; may insert the user's raw input into a template prompt selected from a set of prompts (also referred to herein as "predetermined query prompt text" or "predetermined prompt text"); replace ambiguous references in the user's input with specific references (e.g., replace user-directed pronouns with user IDs, replace @mentions with user IDs, and so on); correct spelling or grammar; translate the user input to another language; or other operations. Thereafter, optionally, the modified/supplemented/hydrated user input can be provided as input to a secondary queue that meters and orders requests from one or more software platforms to a generative output system, such as described herein. The generative output system receives, as input, a modified prompt and provides a continuation of that prompt as output which can be directed to an appropriate recipient, such as the graphical user interface operated by the user that initiated the request or such as a separate platform. Many configurations and constructions are possible.

Large Language Models

An example of a generative output engine of a generative output system as described herein may be a large language model (LLM). An LLM may include a neural network specifically trained to determine probabilistic relationships between members of a sequence of lexical elements, characters, strings or tags (e.g., words, parts of speech, or other subparts of a string), the sequence presumed to conform to rules and structure of one or more natural languages and/or the syntax, convention, and structure of a particular programming language and/or the rules or convention of a data structuring format (e.g., JSON, XML, HTML, Markdown, and the like).

More simply, an LLM is configured to determine what word, phrase, number, whitespace, nonalphanumeric character, or punctuation is most statistically likely to be next in a sequence, given the context of the sequence itself. The sequence may be initialized by the input prompt provided to the LLM. In this manner, output of an LLM is a continuation of the sequence of words, characters, numbers, whitespace, and formatting provided as the prompt input to the LLM.

To determine probabilistic relationships between different lexical elements (as used herein, "lexical elements" may be a collective noun phrase referencing words, characters, numbers, whitespace, formatting, and the like), an LLM is trained against as large of a body of text as possible, comparing the frequency with which particular words appear within N distance of one another. The distance N may be referred to in some examples as the token depth or contextual depth of the LLM.

In many cases, word and phrase lexical elements may be lemmatized, part of speech tagged, or tokenized in another manner as a pretraining normalization step, but this is not required of all embodiments. An LLM is typically trained on natural language text in respect of multiple domains, subjects, contexts, and so on; typical commercial LLMs are trained against substantially all available internet text or written content available (e.g., printed publications, source repositories, and the like). Training data may occupy petabytes of storage space in some examples.

As an LLM is trained to determine which lexical elements are most likely to follow a preceding lexical element or set of lexical elements, an LLM must be provided with a prompt that invites continuation. In general, the more specific a prompt is, the fewer possible continuations of the prompt exist. For example, the grammatically incomplete prompt of "can a computer" invites completion, but also represents an initial phrase that can begin a near limitless number of probabilistically reasonable next words, phrases, punctuation, and whitespace. A generative output engine may not provide a contextually interesting or useful response to such an input prompt, effectively choosing a continuation at random from a set of generated continuations of the grammatically incomplete prompt.

By contrast, a narrower prompt that invites continuation may be "can a computer supplied with a 30 W power supply consume 60 W of power?" A large number of possible correct phrasings of a continuation of this example prompt exist, but the number is significantly smaller than the preceding example, and a suitable continuation can be selected or generated using a number of techniques. In many cases, a continuation of an input prompt may be referred to more generally as "generated text" or "generated output" provided by a generative output engine as described herein.

Fundamentally all written natural languages, syntaxes, and well-defined data structuring formats can be probabilistically modeled by an LLM trained by a suitable training dataset that is both sufficiently large and sufficiently relevant to the language, syntax, or data structuring format desired for automatic content/output generation. In addition, because punctuation and whitespace can serve as a portion of training data, generated output of an LLM can be expected to be grammatically and syntactically correct, as well as being punctuated appropriately. As a result, generated output can take many suitable forms and styles, if appropriate in respect of an input prompt.

Further, as noted above in addition to natural language, LLMs can be trained on source code in various highly structured languages or programming environments and/or on data sets that are structured in compliance with a particular data structuring format (e.g., markdown, table data, CSV data, TSV data, XML, HTML, JSON, and so on).

As with natural language, data structuring and serialization formats (e.g., JSON, XML, and so on) and high-order programming languages (e.g., C, C++, Python, Go, Ruby, JavaScript, Swift, and so on) include specific lexical rules, punctuation conventions, whitespace placement, and so on. In view of this similarity with natural language, an LLM generated output can, in response to suitable prompts, include source code in a language indicated or implied by that prompt. For example, a prompt of "what is the syntax for a while loop in C and how does it work" may be continued by an LLM by providing, in addition to an explanation in natural language, a C++ compliant example of a while loop pattern. In some cases, the continuation/generative output may include format tags/keys such that when the output is rendered in a user interface, the example C++ code that forms a part of the response is presented with appropriate syntax highlighting and formatting.

As noted above, in addition to source code, generative output of an LLM or other generative output engine type can include and/or may be used for document structuring or data structuring, such as by inserting format tags (e.g., markdown). In other cases, whitespace may be inserted, such as paragraph breaks, page breaks, or section breaks. In yet other examples, a single document may be segmented into multiple documents to support improved legibility. In other cases, an LLM generated output may insert cross-links to other content, such as other documents, other software platforms, or external resources such as websites.

In yet further examples, an LLM generated output can convert static content to dynamic content. In one example, a user-generated document can include a string that contextually references another software platform. For example, a documentation platform document may include the string "this document corresponds to project ID 123456, status of which is pending." In this example, a suitable LLM prompt may be provided that causes the LLM to determine an association between the documentation platform and a project management platform based on the reference to "project ID 123456."

In response to this recognized context, the LLM can wrap the substring "project ID 123456" in anchor tags with an embedded URL in HTML-compliant syntax that links directly to project 123456 in the project management platform, such as: "<a href='https://example link/123456>project 123456</a>". In addition, the LLM may be configured to replace the substring "pending" with a real-time updating token associated with an API call to the project management system. In this manner, the LLM converts a static string within the document management system into richer content that facilitates convenient and automatic cross-linking between software products, and may result in additional downstream positive effects on performance of indexing and search systems.

In further embodiments, the LLM may be configured to generate as a portion of the same generated output a body of an API call to the project management system that creates a link back or other association to the documentation platform. In this manner, the LLM facilitates bidirectional content enrichment by adding links to each software platform.

More generally, a continuation produced as output by an LLM can include not only text, source code, pseudocode, structured data, and/or cross-links to other platforms, but it also may be formatted in a manner that includes titles, emphasis, paragraph breaks, section breaks, code sections, quote sections, cross-links to external resources, inline images, graphics, table-backed graphics, and so on.

In yet further examples, static data may be generated and/or formatted in a particular manner in a generative output. For example, a valid generative output can include JSON-formatted data, XML-formatted data, HTML-formatted data, markdown table formatted data, comma-separated value data, tab-separated value data, or any other suitable data structuring defined by a data serialization format.

Transformer Architecture

In many constructions, an LLM may be implemented with a transformer architecture. In other cases, traditional encoder/decoder models may be appropriate. In transformer topologies, a suitable self-attention or intra-attention mechanism may be used to inform both training and generative output. A number of attention mechanisms, including self-attention mechanisms, may be suitable.

In response to an input prompt that at least contextually invites continuation, a transformer-architected LLM may provide probabilistic, generated, output informed by one or more self-attention signals. Even still, the LLM or a system coupled to an output thereof may be required to select one of many possible generated outputs/continuations. In some cases, continuations may be misaligned in respect of conventional ethics. For example, a continuation of a prompt requesting information to build a weapon may be inappropriate. Similarly, a continuation of a prompt requesting to write code that exploits a vulnerability in software may be inappropriate. Similarly, a continuation requesting drafting of libelous content in respect of a real person may be inappropriate. In more innocuous cases, continuations of an LLM may adopt an inappropriate tone or may include offensive language.

In view of the foregoing, more generally, a trained LLM may provide an output that continues an input prompt, but in some cases, that output may be inappropriate. To account for these and other limitations of source-agnostic trained LLMs, fine tuning may be performed to align output of the LLM with values and standards appropriate to a particular use case. In many cases, reinforcement training may be used. In particular, output of an untuned LLM can be provided to a human reviewer for evaluation.

The human reviewer can provide feedback to inform further training of the LLM, such as by filling out a brief survey indicating whether a particular generated output: suitably continues the input prompt; contains offensive language or tone; provides a continuation misaligned with typical human values; and so on.

This reinforcement training by human feedback can reinforce high quality, tone neutral, continuations provided by the LLM (e.g., positive feedback corresponds to positive reward) while simultaneously disincentivizing the LLM to produce offensive continuations (e.g., negative feedback corresponds to negative reward). In this manner, an LLM can be fine-tuned to preferentially produce desirable, inoffensive, generative output which, as noted above, can be in the form of natural language and/or source code.

Generative Output Engines & Generative Output Systems

Independent of training and/or configuration of one or more underlying engines (typically instantiated as software), it may be appreciated that generally and broadly, a generative output system as described herein can include a physical processor or an allocation of the capacity thereof (shared with other processes, such as operating system processes and the like), a physical memory or an allocation thereof, and a network interface. The physical memory can include datastores, working memory portions, storage portions, and the like. Storage portions of the memory can include executable instructions that, when executed by the processor, cause the processor to (with assistance of working memory) instantiate an instance of a generative output application, also referred to herein as a generative output service.

The generative output application can be configured to expose one or more API endpoint, such as for configuration or for receiving input prompts. The generative output application can be further configured to provide generated text output to one or more subscribers or API clients. Many suitable interfaces can be configured to provide input to and receive output from a generative output application, as described herein.

For simplicity of description, the embodiments that follow reference generative output engines and generative output applications configured to exchange structured data with one or more clients, such as the input and output queues described above. The structured data can be formatted according to any suitable format, such as JSON or XML. The structured data can include attributes or key-value pairs that identify or correspond to subparts of a single response from the generative output engine.

For example, a request to the generative output engine from a client can include attribute fields such as, but not limited to: requester client ID; requester authentication tokens or other credentials; requester authorization tokens or other credentials; requester username; requester tenant ID or credentials; API key(s) for access to the generative output engine; request timestamp; generative output generation time; request prompt; string format form generated output; response types requested (e.g., paragraph, numeric, or the like); callback functions or addresses; generative engine ID; data fields; supplemental content; reference corpuses (e.g., additional training or contextual information/data) and so on. A simple example request may be JSON formatted, and may be:

```
{
  "prompt" : "Generate five words of placeholder text in the English language.",
  "API_KEY": "hx-Y5u4zx3kaF67AzkXK1hC",
  "user_token": "PkcLe7Co2G-50AoIVojGJ"
}
```

Similarly, a response from the generative output engine can include attribute fields such as, but not limited to: requester client ID; requester authentication tokens or other credentials; requester authorization tokens or other credentials; requester username; requester role; request timestamp; generative output generation time; request prompt; generative output formatted as a string; and so on. For example, a simple response to the preceding request may be JSON formatted and may be:

```
{
  "response" : "Hello world text goes here.",
  "generation_time_ms" : 2
}
```

In some embodiments, a prompt provided as input to a generative output engine can be engineered from user input. For example, in some cases, a user input can be inserted into an engineered template prompt that itself is stored in a database and includes text that may be referred to as predetermined query prompt text or predetermined prompt text. For example, an engineered prompt template can include one or more fields into which user input portions thereof can be inserted. In some cases, an engineered prompt template can include contextual information that narrows the scope of the prompt, increasing the specificity thereof.

For example, some engineered prompt templates can include example input/output format cues or requests that define for a generative output engine, as described herein, how an input format is structured and/or how output should be provided by the generative output engine.

Prompt Pre-Configuration, Templatizing, & Engineering

As noted above, a prompt received from a user can be preconditioned and/or parsed to extract certain content therefrom. The extracted content can be used to inform selection of a particular engineered prompt template from a database of engineered prompt templates including predetermined query prompt text or predetermined prompt text. Once the selected prompt template is selected, the extracted content can be inserted into the template to generate a populated engineered prompt template that, in turn, can be provided as input to a generative output engine as described herein. Content extraction, prompt configuration, and prompt selection may be performed by a processing plugin that is registered or otherwise available to a generative service.

In many cases, a particular engineered prompt template can be selected based on a desired task for which output of the generative output engine may be useful to assist. For example, if a user requires a summary of a particular document, the user input prompt may be a text string comprising the phrase "generate a summary of this page." A software instance configured for prompt preconditioning—which may be referred to as a "preconditioning software instance," "prompt preconditioning software instance," "processing plugin," or "plugin"—may perform one or more substitutions of terms or words in this input phrase, such as replacing the demonstrative pronoun phrase "this page" with an unambiguous unique page ID. In this example, preconditioning software instance can provide an output of "generate a summary of the page with id 123456" which in turn can be provided as input to a generative output engine.

In an extension of this example, the preconditioning software instance can be further configured to insert one or more additional contextual terms or phrases into the user input. In some cases, the inserted content can be inserted at a grammatically appropriate location within the input phrase or, in other cases, may be appended or prepended as separate sentences.

For example, in an embodiment, the preconditioning software instance can insert a phrase that adds contextual information describing the user making the initial input and request. In this example, output of the prompt preconditioning instance may be "generate a summary of the page with id 123456 with phrasing and detail appropriate for the role of user 76543." In this example, if the user requesting the summary is an engineer, a different summary may be provided than if the user requesting the summary is a manager or executive.

In yet other examples, prompt preconditioning may be further contextualized before a given prompt is provided as input to a generative output engine. Additional information that can be added to a prompt (sometimes referred to as "contextual information" or "prompt context" or "supplemental prompt information") can include but may not be limited to: user names; user roles; user tenure (e.g., new users may benefit from more detailed summaries or other generative content than long-term users); user projects; user groups; user teams; user tasks; user reports; tasks, assignments, or projects of a user's reports, and so on. For example, in some embodiments, a user-input prompt may be "generate a table of all my tasks for the next two weeks, and insert the table into my home page in my personal space." In this example, a preconditioning instance can replace "my" with a reference to the user's ID or another unambiguous identifier associated with the user. Similarly, the "home page in my personal space" can be replaced, contextually, with a page identifier that corresponds to that user's personal space and the page that serves as the homepage thereof. Additionally, the preconditioning instance can replace the referenced time window in the raw input prompt based on the current date and based on a calculated date two weeks in the future. With these two modifications, the modified input prompt may be "generate a table of the tasks assigned to User 1234 dating from Jan. 1, 2023-Jan. 14, 2023 (inclusive), and insert the generated table into page 567." In these embodiments, the preconditioning instance may be configured to access session information to determine the user ID.

In other cases, the preconditioning service may be configured to structure and submit a query to an active directory service or user graph service to determine user information and/or relationships to other users. For example, a prompt of "summarize the edits to this page made by my team since I last visited this page" could determine the user's ID, team members with close connections to that user based on a user graph, determine that the user last visited the page three weeks prior, and filter attribution of edits within the last three weeks to the current page ID based on those team members. With these modifications, the prompt provided to the generative output engine may be:

{
"raw_prompt" : "summarize the edits to this page made by my team since I last visited this page",
"modified_prompt" : "Generate a summary of each paragraph tagged with an editId attribute matching editId=1, editId=51, editId=165, editId=99 within the following HTML-formatted content: [HTML-formatted content of the page]."
}

Similarly, the preconditioning service may utilize a project graph, issue graph, or other data structure that is generated using edges or relationships between system objects that are determined based on express object dependencies, user event histories of interactions with related objects, or other system activity indicating relationships between system objects. The graphs may also associate system objects with particular users or user identifiers based on interaction logs or event histories.

Generally, a preconditioning service, as described herein, can be configured to access and append significant contextual information describing a user and/or users associated with the user submitting a particular request, the user's role in a particular organization, the user's technical expertise, the user's computing hardware (e.g., different response formats may be suitable and/or selectable based on user equipment), and so on.

In further implementations of this example, a snippet of prompt text can be selected from a snippet dictionary or table that further defines how the requested table should be formatted as output by the generative output engine. For example, a snippet selected from a database and appended to the modified prompt may be:

{
"snippet123_table_from_tasks" : "The table should be formatted as a three-column table with multiple rows. The leftmost column should be titled 'Title' and the corresponding content of each row of this column should be the title attribute of a task. The middle column should be titled 'Created Date' and the corresponding content of each row of this column should be the creation date of the task. The rightmost column should be titled 'Status' and the corresponding content of each row of this column should be the status attribute of the selected task."
}

The foregoing examples of modifications and supplements to user input prompt are not exhaustive. Other modifications are possible. In one embodiment, the user input of "generate a table of all my tasks for the next two weeks" may be converted, supplemented, modified, and/or otherwise preconditioned to:

{
"modified_prompt" : "Find all tasks assigned to User 1234 dating from Jan 01, 2023 - Jan 14, 2023 (inclusive). Create a table in which each found task corresponds to a respective row of that table. The table should be formatted as a markdown table, in plain text, with three columns. The leftmost column should be titled 'Title' and the corresponding content of each row of this column should be the title attribute of a respective task. The middle column should be titled 'Created Date' and the corresponding content of each row of this column should be the creation date of the respective task. The rightmost column should be titled 'Status' and the corresponding content of each row of this column should be the status attribute of the respective task."
}

The operations of modifying a user input into a descriptive paragraph or set of paragraphs that further contextualize the input may be referred to as "prompt engineering." In many embodiments, a preconditioning software instance may serve as a portion of a prompt engineering service configured to receive user input and to enrich, supplement, and/or otherwise hydrate a raw user input into a detailed prompt that may be provided as input to a generative output engine as described herein.

In other embodiments, a prompt engineering service may be configured to append bulk text to a prompt, such as document content in need of summarization or contextualization.

In other cases, a prompt engineering service can be configured to recursively and/or iteratively leverage output from a generative output engine in a chain of prompts and responses. For example, a prompt may call for a summary of all documents related to a particular project. In this case, a prompt engineering service may coordinate and/or orchestrate several requests to a generative output engine to summarize a first document, a second document, and a third document, and then generate an aggregate response of each of the three summarized documents.

In yet other examples, staging of requests may be useful for other purposes.

Authentication & Authorization

Still further embodiments reference systems and methods for maintaining compliance with permissions, authentication, and authorization within a software environment. For example, in some embodiments, a prompt engineering service can be configured to append to a prompt one or more contextualizing phrases that direct a generative output engine to draw insight from only a particular subset of content to which the requesting user has authorization to access.

In other cases, a prompt engineering service may be configured to proactively determine what data or database calls may be required by a particular user input. If data required to service the user's request is not authorized to be accessed by the user, that data and/or references to it may be restricted/redacted/removed from the prompt before the prompt is submitted as input to a generative output engine. The prompt engineering service may access a user profile of the respective user and identify content having access permissions that are consistent with a role, permissions profile, or other aspect of the user profile.

In other embodiments, a prompt engineering service may be configured to request that the generative output engine append citations (e.g., back links) to each page or source from which information in a generative response was based. In these examples, the prompt engineering service or another software instance can be configured to iterate through each link to determine (1) whether the link is valid, and (2) whether the requesting user has permission and authorization to view content at the link. If either test fails, the response from the generative output engine may be rejected and/or a new prompt may be generated specifically including an exclusion request such as "Exclude and ignore all content at XYZ.url".

In yet other examples, a prompt engineering service may be configured to classify a user input into one of a number of classes of request. Different classes of request may be associated with different permissions handling techniques. For example, a class of request that requires a generative output engine to resource from multiple pages may have different authorization enforcement mechanisms or workflows than a class of request that requires a generative output engine to resource from only a single location.

These foregoing examples are not exhaustive. Many suitable techniques for managing permissions in a prompt engineering service and generative output engine system may be possible in view of the embodiments described herein. More generally, as noted above, a generative output engine may be a portion of a larger network and communications architecture as described herein. This network can include input queues, prompt constructors, engine selection logical elements, request routing appliances, authentication handlers and so on.

Collaboration Platforms Integrated with Generative Output Systems

In particular, embodiments described herein are focused to leveraging generative output engines to produce content in a software platform used for collaboration between multiple users, such as documentation tools, issue tracking systems, project management systems, information technology service management systems, ticketing systems, repository systems, telecommunications systems, messaging systems, and the like, each of which may define different environments in which content can be generated by users of those systems. For example, a documentation system may define an environment in which users of the documentation system can leverage a user interface of a frontend of the system to generate documentation in respect of a project, product, process, or goal. For example, a software development team may use a documentation system to document features and functionality of the software product. In other cases, the development team may use the documentation system to capture meeting notes, track project goals, and outline internal best practices.

Other software platforms store, collect, and present different information in different ways. For example, an issue tracking system may be used to assign work within an organization and/or to track completion of work, a ticketing system may be used to track compliance with service level agreements, and so on. Any one of these software platforms or platform types can be communicably coupled to a generative output engine, as described herein, in order to automatically generate structured or unstructured content within environments defined by those systems. For example, a documentation system can leverage a generative output engine to, without limitation: summarize individual documents; summarize portions of documents; summarize multiple selected documents; generate document templates; generate document section templates; generate suggestions for cross-links to other documents or platforms; generate suggestions for adding detail or improving conciseness for particular document sections; and so on.

More broadly, it may be appreciated that a single organization may be a tenant of multiple software platforms, of different software platform types. Generally and broadly, regardless of configuration or purpose, a software platform that can serve as source information for operation of a generative output engine as described herein may include a frontend and a backend configured to communicably couple over a computing network (which may include the open Internet) to exchange computer-readable structured data.

The frontend may be a first instance of software executing on a client device, such as a desktop computer, laptop computer, tablet computer, or handheld computer (e.g., mobile phone). The backend may be a second instance of software executing over a processor allocation and memory allocation of a virtual or physical computer architecture. In many cases, although not required, the backend may support multiple tenancies. In such examples, a software platform may be referred to as a multitenant software platform.

For simplicity of description, the multitenant embodiments presented herein reference software platforms from the perspective of a single common tenant. For example, an organization may secure a tenancy of multiple discrete software platforms, providing access for one or more employees to each of the software platforms. Although other organizations may have also secured tenancies of the same software platforms which may instantiate one or more backends that serve multiple tenants, it is appreciated that data of each organization is siloed, encrypted, and inaccessible to, other tenants of the same platform.

In many embodiments, the frontend and backend of a software platform—multitenant or otherwise—as described herein are not collocated, and communicate over a large area and/or wide area network by leveraging one or more networking protocols, but this is not required of all implementations.

A frontend of a software platform as described herein may be configured to render a graphical user interface at a client device that instantiates frontend software. As a result of this architecture, the graphical user interface of the frontend can receive inputs from a user of the client device, which, in turn, can be formatted by the frontend into computer-readable structured data suitable for transmission to the backend for storage, transformation, and later retrieval. One example architecture includes a graphical user interface rendered in a browser executing on the client device. In other cases, a frontend may be a native application executing on a client device. Regardless of architecture, it may be appreciated that generally and broadly a frontend of a software platform as described herein is configured to render a graphical user interface to receive inputs from a user of the software platform and to provide outputs to the user of the software platform.

Input to a frontend of a software platform by a user of a client device within an organization may be referred to herein as "organization-owned" content. With respect to a particular software platform, such input may be referred to as "tenant-owned" or "platform-specific" content. In this manner, a single organization's owned content can include multiple buckets of platform-specific content.

Herein, the phrases "tenant-owned content" and "platform-specific content" may be used to refer to any and all content, data, metadata, or other information regardless of form or format that is authored, developed, created, or otherwise added by, edited by, or otherwise provided for the benefit of, a user or tenant of a multitenant software platform. In many embodiments, as noted above, tenant-owned content may be stored, transmitted, and/or formatted for display by a frontend of a software platform as structured data. In particular structured data that includes tenant-owned content may be referred to herein as a "data object" or a "tenant-specific data object."

In a more simple, non-limiting phrasing, any software platform described herein can be configured to store one or more data objects in any form or format unique to that platform. Any data object of any platform may include one or more attributes and/or properties or individual data items that, in turn, include tenant-owned content input by a user.

Example tenant-owned content can include personal data, private data, health information, personally-identifying information, business information, trade secret content, copyrighted content or information, restricted access information, research and development information, classified information, mutually-owned information (e.g., with a third-party or government entity), or any other information, multi-media, or data. In many examples, although not required, tenant-owned content or, more generally, organization-owned content may include information that is classified in some manner, according to some procedure, protocol, or jurisdiction-specific regulation.

In particular, the embodiments and architectures described herein can be leveraged by a provider of multitenant software and, in particular, by a provider of suites of multitenant software platforms, each platform being configured for a different particular purpose. Herein, providers of systems or suites of multitenant software platforms are referred to as "multiplatform service providers." Generally, customers/clients of a multiplatform service provider are typically tenants of multiple platforms provided by a given multiplatform service provider. For example, a single organization (a client of a multiplatform service provider) may be a tenant of a messaging platform and, separately, a tenant of a project management platform.

The organization can create and/or purchase user accounts for its employees so that each employee has access to both messaging and project management functionality. In some cases, the organization may limit seats in each tenancy of each platform so that only certain users have access to messaging functionality and only certain users have access to project management functionality; the organization can exercise discretion as to which users have access to either or both tenancies.

In another example, a multiplatform service provider can host a suite of collaboration tools. For example, a multiplatform service provider may host, for its clients, a multitenant issue tracking system, a multitenant code repository service, and a multitenant documentation service. In this example, an organization that is a customer/client of the service provider may be a tenant of each of the issue tracking system, the code repository service, and the documentation service.

As with preceding examples, the organization can create and/or purchase user accounts for its employees, so that certain selected employees have access to one or more of issue tracking functionality, documentation functionality, and code repository functionality.

In this example and others, a system may leverage multiple collaboration tools to advance individual projects or goals. For example, for a single software development project, a software development team may use (1) a code repository to store project code, executables, and/or static assets, (2) a documentation service to maintain documentation related to the software development project, (3) an issue tracking system to track assignment and progression of work, and (4) a messaging service to exchange information directly between team members.

However, as organizations grow, as project teams become larger, and/or as software platforms mature and add features or adjust user interaction paradigms over time, using multiple software platforms can become inefficient for both individuals and organizations. To counteract these effects, many organizations define internal policies that employees are required to follow to maintain data freshness across the various platforms used by an organization.

For example, when a developer submits a new pull request to a repository service, that developer may also be required by the organization to (1) update a description of the pull request in a documentation service, (2) change a project status in a project management application, and/or (3) close a ticket in a ticketing or issue tracking system relating to the pull request. In many cases, updating and interacting with multiple platforms on a regular and repeating basis is both frustrating and time consuming for both individuals and organizations, especially if the completion of work of one user is dependent upon completion of work of another user.

Some solutions to these and related problems often introduce further issues and complexity. For example, many software platforms include an in-built automation engine that can expedite performance of work within that software platform. In many cases, however, users of a software platform with an in-built automation engine may not be familiar with the features of the automation engine, nor may those users understand how to access, much less efficiently utilize, that automation engine. For example, in many cases, accessing in-built automation engines of a software platform requires diving deep into a settings or options menu, which may be difficult to find.

Other solutions involve an inter-platform bridge software that allows data from one platform to be accessed by another platform. Typically, such bridging software is referred to as an "integration" between platforms. An integration between different platforms may allow content, features, and/or functionality of one platform to be used in another platform.

For example, a multiplatform service provider may host an issue tracking system and a documentation system. The provider may also supply an integration that allows issue tracking information and data objects to be shown, accessed, and/or displayed from within the documentation system. In this example, the integration itself needs to be separately maintained in order to be compliant with an organization's data sharing and/or permissions policies. More specifically, an integration must ensure that authenticated users of the documentation system that view a page that references information stored by the issue tracking system are also authorized to view that information by the issue tracking system.

Phrased in a more general way, an architecture that includes one or more integrations between tenancies of different software platforms requires multiple permissions requests that may be forwarded to different systems, each of which may exhibit different latencies, and have different response formats, and so on. More broadly, some system architectures with integrations between software platforms necessarily require numerous network calls and requests, occupying bandwidth and computational resources at both software platforms and at the integration itself, to simply share and request information and service requests for information by and between the different software platforms. This architectural complexity necessitates careful management to prevent inadvertent information disclosure.

Furthermore, the foregoing problem(s) with maintaining integrations' compliance with an organization's policies and organization-owned content access policies may be exacerbated as a provider's platform suite grows. For example, a provider that maintains three separate platforms may choose to provide three separate integrations interconnecting all three platforms. (e.g., 3 choose 2). In this example, the provider is also tasked with maintaining policy compliance associated with those three platforms and three integrations. If the provider on-boards yet another platform, a total of six integrations may be required (e.g., 4 choose 2). If the provider on-boards a fifth platform, a total of ten integrations may be required (e.g., 5 choose 2). Generally, difficulties of maintaining integrations between different software platforms (in a permissions policy compliant manner) scales exponentially with the number of platforms provided.

Further to the inadvertent disclosure risk and maintenance obligations associated with inter-platform integrations, each integration is still only configured for information sharing, and not automation of tasks. Although context switching to copy data between two integrated platforms may be reduced, the quantity of tasks required of individual users may not be substantially reduced.

Further solutions involve creating and deploying dedicated automation platforms that may be configured to operate with one, and/or perform automations of, or more platforms of a multiplatform system. These, however, much like automation engines in-built to individual platforms, may be difficult to use, access, or understand. Similarly, much like integrations described above, dedicated automation platforms require separate maintenance and employee training, in addition to licensing costs and physical or virtual infrastructure allocations to support the automation platform (s).

In still further other circumstances, many automations may take longer for a user to create than the time saved by automating that particular task. In these examples, individual users may avoid defining automations altogether, despite that, in aggregate, automation of a given task may save an organization substantial time and cost.

These foregoing and other embodiments are discussed below with reference to FIGS. 1-11. However, those skilled in the art will readily appreciate that the detailed description given herein with respect to these figures is for explanation only and should not be construed as limiting.

FIG. 1 depicts system diagram that includes multiple platforms that can include and/or may receive input from a generative output engine, as described herein. The system 100 can be used to produce generative responses, which may include recommended objects, recommended supplemental content, summaries, and/or brief descriptions of content items, as described herein. The system 100 of FIG. 1 depicts an example of how multiple platforms 108, 110 may utilize a centralized generative service 112 (also referred to as a centralized content generation service 112), which may produce the summaries or brief descriptions or other generative content using a generative output engine of a generative output service 116.

The system 100 is depicted as implemented in a client-server architecture, but it may be appreciated that this is merely one example and that other communications architectures are possible. In particular the system 100 includes a set of host servers 102 which may be one or more virtual or physical computing resources (collectively referred in many cases as a "cloud platform"). In some cases, the set of host servers 102 can be physically collocated or in other cases, each may be positioned in a geographically unique location.

The set of host servers 102 can be communicably coupled to one or more client devices; two example devices are shown as the client device 104 and the client device 106. The client devices 104, 106 can be implemented as any suitable electronic device. In many embodiments, the client devices 104, 106 are personal computing devices such as desktop computers, laptop computers, or mobile phones.

The set of host servers 102 can support infrastructure for one or more backend applications, each of which may be associated with a particular software platform, such as a whiteboarding platform, a documentation platform, or an issue tracking platform. Other examples include information technology system management (ITSM) systems, chat platforms, messaging platforms, and the like. These backends can be communicably coupled to a generative output engine that can be leveraged to provide unique intelligent functionality to each respective backend. For example, the generative output engine can be configured to receive user prompts, such as described herein, to modify, create, or otherwise perform operations against content stored by each respective software platform.

By centralizing access to the generative output engine in this manner, the generative output platform can also serve as an integration between multiple platforms. For example, one platform may be a documentation platform and the other platform may be an issue tracking platform. In these examples, a user of the documentation platform may input a prompt requesting a summary of the status of a particular project documented in a particular page of the documentation platform. A comprehensive continuation/response to this summary request may pull data or information from the issue tracking platform as well.

The systems described herein may trigger production of generative output in a number of suitable ways. The examples described herein include the triggering of a centralized generative service 112 (also referred to as a generative service or generative system) in response to a synchronous or scheduled processing of a set of content items that satisfy a content criteria. The generation service 112 may also be triggered in response to user input provided to a frontend application corresponding to a respective one of the platform backends 108, 110. A variety of implementations and examples are described in the following figures.

Turning to FIG. 1, a portion of the set of host servers 102 can be allocated as physical infrastructure supporting a first platform backend 108 and a different portion of the set of host servers 102 can be allocated as physical infrastructure supporting a second platform backend 110. The two different platforms maybe instantiated over physical resources provided by the set of host servers 102. Once instantiated, the first platform backend 108 and the second platform backend 110 can each communicably couple to a centralized generative service 112.

The centralized generative service 112 can be configured to cause generation and display of generative content within respective frontends of each of the first platform backend 108 and the second platform backend 110. In this manner, and as a result of this construction, each of the first platform and the second platform can be provided with a consistent or uniform user experience with respect to the generation of generative content. As described in more detail, herein, the centralized generative service 112 can also be used to provide a tailored or variable interface depending on the platform, while providing access to a common or shared set of functions and resources.

The centralized generative service 112 may provide access to automated processing services or agents, plugin services, and other functionality. The centralized generative service 112 may also provide a mechanism to request and obtain summaries of content through selectable graphical objects and other elements from various platforms in the multiplatform environment, and communicate with the generative output engine to fulfill the summary requests and provide responses from the generative output engine back within the selectable graphical objects. As a result of this centralized architecture, multiple platforms in a multiplatform environment can leverage the features of the generative output engine via the selectable graphical object, regardless of the platform of the system 100 in which the selectable graphical object resides. This provides a consistent experience to users across platforms while simplifying processes of updating or otherwise modifying the service to the generative output engine.

For example, in one embodiment, a user in a multiplatform environment may use and operate a documentation platform and an issue tracking platform. In this example, both the issue tracking platform and the documentation platform may be associated with a respective frontend and a respective backend. Each platform may be additionally communicably and/or operably coupled to a centralized generative service 112 that can be called by each respective frontend whenever it is required to present the user of that respective frontend with an interface to edit text. For example, the documentation platform's frontend or the issue tracking platform's fronted may call upon the centralized generative service 112 to interact with a generative output engine to obtain and provide a generative content in accordance with a scheduled or synchronous processing of a set of content items. The generation service 112 may also be utilized to summarize or process target content referenced by a selectable graphical object when a user of the documentation platform or issue tracking platform requests the summary via a button or other input of the selectable graphical object.

Similarly, the documentation platform's frontend or the issue tracking platform's frontend may call upon the centralized generative service 112 to interact with a generative output engine to obtain and provide a response to a question or query regarding the target content referenced by a selectable graphical object when a user of the documentation platform provides a question or query regarding the target content via an input of the selectable graphical object.

In these examples, the centralized generative service 112 can parse text input provided by users of the documentation platform and/or the issue tracking platform, monitoring for summary request inputs or questions provided via selectable graphical objects. In addition, as a result of the architectures described herein, services supporting the centralized generative service 112 can be extended to include additional features and functionality that can automatically be leveraged by any further platform that incorporates selectable graphical objects, and/or otherwise integrates with the centralized generative service 112 itself.

The generative output engine service may be hosted over the host servers 102 or, in other cases, may be a software instance instantiated over separate hardware. In some cases, the generative engine service may be a third party service that serves an API interface to which one or more of the host services and/or preconditioning service can communicably couple. The generative output engine can be configured as described above to provide any suitable output, in any suitable form or format. Examples include content to be added to user-generated content, API request bodies, replacing user-generated content, and so on.

More generally and broadly, the embodiments described herein refence systems and methods for generating a summary of target content within selectable graphical objects sharing user interface elements rendered by a centralized generative service 112 and features thereof, between different software platforms in an authenticated and secure manner.

The first platform backend 108 can be configured to communicably couple to a first platform frontend instantiated by cooperation of a memory and a processor of the client device 104. Once instantiated, the first platform frontend can be configured to leverage a display of the client device 104 to render a graphical user interface so as to present information to a user of the client device 104 and so as to collect information from a user of the client device 104. Collectively, the processor, memory, and display of the client device 104 are identified in FIG. 1 as the client devices resources 104*a*-104*c*, respectively.

As with many embodiments described herein, the first platform frontend can be configured to communicate with the first platform backend 108 and/or the centralized generative service 112. Information can be transacted by and between the frontend, the first platform backend 108 and the centralized generative service 112 in any suitable manner or form or format. In many embodiments, as noted above, the client device 104 and in particular the first platform frontend can be configured to send an authentication token 120 along with each request transmitted to any of the first platform backend 108 or the centralized generative service 112 or the preconditioning service or the generative output engine.

Similarly, the second platform backend 110 can be configured to communicably couple to a second platform frontend instantiated by cooperation of a memory and a processor of the client device 106. Once instantiated, the second platform frontend can be configured to leverage a display of the client device 106 to render a graphical user interface so as to present information to a user of the client device 106 and so as to collect information from a user of the client device 106. Collectively, the processor, memory, and display of the client device 106 are identified in FIG. 1 as the client devices resources 106*a*-106*c*, respectively.

As with many embodiments described herein, the second platform frontend can be configured to communicate with the second platform backend 110 and/or the centralized generative service 112. Information can be transacted by and between the frontend, the second platform backend 110 and the centralized generative service 112 in any suitable manner or form or format. In many embodiments, as noted above, the client device 106 and in particular the second platform frontend can be configured to send an authentication token 122 along with each request transmitted to any of the second platform backend 110 or the centralized generative service 112.

As a result of these constructions, the centralized generative service 112 can provide uniform feature sets to users of either the client device 104 or the client device 106. As noted above, the centralized generative service 112 ensures that common features are available to frontends of different platforms. One such class of features provided by the centralized generative service 112 invokes output of a generative output engine of a service such as the generative output service 116. For example, as noted above, the generative output service 116 can be used to generate content, supplement content, and/or generate API requests or API request bodies that cause one or both of the first platform backend 108 or the second platform backend 110 to perform a task. In some cases, an API request generated at least in part by the generative output service 116 can be directed to another system not depicted in FIG. 1. For example, the API request can be directed to a third-party service (e.g., referencing a callback, as one example, to either backend platform) or an integration software instance. The integration may facilitate data exchange between the second platform backend 110 and the first platform backend 108 or may be configured for another purpose.

As with other embodiments described herein, the prompt management service 114 can be configured to receive user input (provided via a graphical user interface of the client device 104 or the client device 106) from the centralized generative service 112. The user input may include a prompt to be continued by the generative output service 116.

The prompt management service 114 can be configured to modify the user input, to supplement the user input, select a prompt from a database (e.g., the database 118) based on the user input, insert the user input into a template prompt, replace words within the user input, preform searches of databases (such as user graphs, team graphs, and so on) of either the first platform backend 108 or the second platform backend 110, change grammar or spelling of the user input, change a language of the user input, and so on. The prompt management service 114 may also be referred to herein as an "editor assistant service" or a "prompt constructor." In some cases, the prompt management service 114 is also referred to as a "content creation and modification service."

Output of the prompt management service 114 can be referred to as a modified prompt or a preconditioned prompt. This modified prompt can be provided to the generative output service 116 as an input. More particularly, the prompt management service 114 is configured to structure an API request to the generative output service 116. The API request can include the modified prompt as an attribute of a structured data object that serves as a body of the API request. Other attributes of the body of the API request can include, but are not limited to: an identifier of a particular LLM or generative engine to receive and continue the modified prompt; a user authentication token; a tenant authentication token; an API authorization token; a priority level at which the generative output service 116 should process the request; an output format or encryption identifier; and so on. One example of such an API request is a POST request to a Restful API endpoint served by the generative output service 116. In other cases, the prompt management service 114 may transmit data and/or communicate data to the generative output service 116 in another manner (e.g., referencing a text file at a shared file location, the text file including a prompt, referencing a prompt identifier, referencing a callback that can serve a prompt to the generative output service 116, initiating a stream comprising a prompt, referencing an index in a queue including multiple prompts, and so on; many configurations are possible).

In response to receiving a modified prompt as input, the generative output service 116 can execute an instance of a generative output engine, such as an LLM. As noted above, in some cases, the prompt management service 114 can be configured to specify what engine, engine version, language, language model or other data should be used to continue a particular modified prompt.

The selected LLM or other generative engine continues the input prompt and returns that continuation to the caller, which in many cases may be the prompt management service 114. In other cases, output of the generative output service 116 can be provided to the centralized generative service 112 to return to a suitable backend application, to in turn return to or perform a task for the benefit of a client device such as the client device 104 or the client device 106. More particularly, it may be appreciate that although FIG. 1 is illustrated with only the prompt management service 114 communicably coupled to the generative output service 116, this is merely one example and that in other cases the generative output service 116 can be communicably coupled to any of the client device 106, the client device 104, the first platform backend 108, the second platform backend 110, the centralized generative service 112, or the prompt management service 114.

In some cases, output of the generative output service 116 can be provided to an output processor or gateway configured to route the response to an appropriate destination. For example, in an embodiment, output of the generative engine may be intended to be prepended to an existing document of a documentation system. In this example, it may be appropriate for the output processor to direct the output of the generative output service 116 to the frontend (e.g., rendered on the client device 104, as one example) so that a user of the client device 104 can approve the content before it is prepended to the document. In another example, output of the generative output service 116 can be inserted into an API request directly to a backend associated with the documentation system. The API request can cause the backend of the documentation system to update an internal object representing the document to be updated. On an update of the document by the backend, a frontend may be updated so that a user of the client device can review and consume the updated content.

In other cases, the output processor/gateway can be configured to determine whether an output of the generative output service 116 is an API request that should be directed to a particular endpoint. Upon identifying an intended or specified endpoint, the output processor can transmit the output, as an API request to that endpoint. The gateway may receive a response to the API request which in some examples, may be directed to yet another system (e.g., a notification that an object has been modified successfully in one system may be transmitted to another system).

More generally, the embodiments described herein and with particular reference to FIG. 1 relate to systems for collecting user input, modifying that user input into a particularly engineered prompt, and submitting that prompt as input to a trained large language model. Output of the LLM can be used in a number of suitable ways.

In some embodiments, user input can be provided by text input that can be provided by a user typing a word or phrase into an editable dialog box such as a rich text editing frame rendered within a user interface of a frontend application on a display of a client device. For example, the user can type a particular character or phrase in order to instruct the frontend to enter a command receptive mode. In some cases, the frontend may render an overlay user interface that provides a visual indication that the frontend is ready to receive a command from the user. As the user continues to type, one or more suggestions may be shown in a modal UI window.

These suggestions can include and/or may be associated with one or more "preconfigured prompts" that are engineered to cause an LLM to provide particular output. More specifically, a preconfigured prompt may include a static string of characters, symbols, and words, that causes—deterministically or pseudo-deterministically—the LLM to provide consistent output. For example, a preconfigured prompt may be "generate a summary of changes made to all documents in the last two weeks." Preconfigured prompts can be associated with an identifier or a title shown to the user, such as "Summarize Recent System Changes." In this example, a button with the title "Summarize Recent System Changes" can be rendered for a user in a UI as described herein. Upon interaction with the button by the user, the prompt string "generate a summary of changes made to all documents in the last two weeks" can be retrieved from a database or other memory, and provided as input to the generative output service 116.

Suggestions rendered in a UI can also include and/or may be associated with one or more configurable or "templatized prompts" that are engineered with one or more fields that can be populated with data or information before being provided as input to an LLM. A templatized prompt may include static language that may also be referred to as "predetermined query prompt text" and may be combined with current context or content in order to construct or generate a prompt. An example of a templatized prompt may be "summarize all tasks assigned to ${user} with a due date in the next 2 days." In this example, the token/field/variable ${user} can be replaced with a user identifier corresponding to the user currently operating a client device.

This insertion of an unambiguous user identifier can be preformed by the client device, the platform backend, the centralized summary generation service, the prompt management service, or any other suitable software instance. As with preconfigured prompts, templatized prompts can be associated with an identifier or a title shown to the user, such as "Show My Tasks Due Soon." In this example, a button with the title "Show My Tasks Due Soon" can be rendered for a user in a UI as described herein. Upon interaction with the button by the user, the prompt string "summarize all tasks assigned to user123 with a due date in the next 2 days" can be retrieved from a database or other memory, and provided as input to the generative output service 116.

Suggestions rendered in UI can also include and/or may be associated with one or more "engineered template prompts" that are configured to add context to a given user input. The context may be an instruction describing how particular output of the LLM/engine should be formatted, how a particular data item can be retrieved by the engine, or the like. As one example, an engineered template prompt may be "${user prompt} provide output of any table in the form of a tab delimited table formatted according to the markdown specification." In this example, the variable ${user prompt} may be replaced with the user prompt such that the entire prompt received by the generative output service 116 can include the user prompt and the example sentence describing how a table should be formatted.

In yet other embodiments, a suggestion may be generated by the generative output service 116. For example, in some embodiments, a system as described herein can be configured to assist a user in overcoming a cold start/blank page problem when interacting with a new document, new issue, or new board for the first time. For example, an example backend system may be Kanban board system for organizing work associated with particular milestones of a particular project. In these examples, a user needing to create a new board from scratch (e.g., for a new project) may be unsure how to begin, causing delay, confusion, and frustration.

In these examples, a system as described herein can be configured to automatically suggest one or more prompts configured to obtain output from an LLM that programmatically creates a template board with a set of template cards. Specifically, the prompt may be a preconfigured prompt as described above such as "generate a JSON document representation of a Kanban board with a set of cards each representing a different suggested task in a project for creating a new iced cream flavor." In response to this prompt, the generative output service 116 may generate a set of JSON objects that, when received by the Kanban platform, are rendered as a set of cards in a Kanban board, each card including a different title and description corresponding to different tasks that may be associated with steps for creating a new ice cream flavor. In this manner, the user can quickly be presented with an example set of initial tasks for a new project.

In yet other examples, suggestions can be configured to select or modify prompts that cause the generative output service 116 to interact with multiple systems. For example, a suggestion in a documentation system may be to create a new document content section that summarizes a history of agent interactions in an ITSM system. In some cases, the generative output service 116 can be called more than once and/or it may be configured to generate its own follow-up prompts or prompt templates which can be populated with appropriate information and re-submitted to the generative output service 116 to obtain further generative output. More simply, in some embodiments, generative output may be recursive, iterative, or otherwise multi-step in some embodiments.

These foregoing embodiments depicted in FIG. 1 and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

For example, it may be appreciated that all software instances described above are supported by and instantiated over physical hardware and/or allocations of processing/memory capacity of physical processing and memory hardware. For example, the first platform backend 108 may be instantiated by cooperation of a processor and memory collectively represented in the figure as the resource allocations 108*a*.

Similarly, the second platform backend 110 may be instantiated over the resource allocations 110*a* (including processors, memory, storage, network communications systems, and so on). Likewise, the centralized generative service 112 is supported by a processor and memory and network connection (and/or database connections) collectively represented for simplicity as the resource allocations 112*a*.

The prompt management service 114 can be supported by its own resources including processors, memory, network connections, displays (optionally), and the like represented in the figure as the resource allocations 114*a*. In many cases, the generative output service 116 may be an external system, instantiated over external and/or third-party hardware which may include processors, network connections, memory, databases, and the like. In some embodiments, the generative output service 116 may be instantiated over physical hardware associated with the host servers 102. Regardless of the physical location at which (and/or the physical hardware over which) the generative output service 116 is instantiated, the underlying physical hardware including processors, memory, storage, network connections, and the like are represented in the figure as the resource allocations 116*a*.

Further, although many examples are provided above, it may be appreciated that in many embodiments, user permissions and authentication operations are performed at each communication between different systems described above. Phrased in another manner, each request/response transmitted as described above or elsewhere herein may be accompanied by user authentication tokens, user session tokens, API tokens, or other authentication or authorization credentials.

Generally, generative output systems, as described herein, should not be usable to obtain information from an organization's datasets that a user is otherwise not permitted to obtain. For example, a prompt of "generate a table of social security numbers of all employees" should not be executable. In many cases, underlying training data may be siloed based on user roles or authentication profiles. In other cases, underlying training data can be preconditioned/scrubbed/tagged for particularly sensitive datatypes, such as personally identifying information. As a result of tagging, prompts may be engineered to prevent any tagged data from being returned in response to any request. More particularly, in some configurations, all prompts output from the prompt management service 114 may include a phrase directing an LLM to never return particular data, or to only return data from particular sources, and the like.

In some embodiments, the system 100 can include a prompt context analysis instance configured to determine whether a user issuing a request has permission to access the resources required to service that request. For example, a prompt from a user may be "Generate a text summary in Document123 of all changes to Kanban board 456 that do not have a corresponding issue tagged in the issue tracking system." In respect of this example, the prompt context analysis instance may determine whether the requesting user has permission to access Document123, whether the requesting user has written permission to modify Document123, whether the requesting user has read access to Kanban board 456, and whether the requesting user has read access to referenced issue tracking system. In some embodiments, the request may be modified to accommodate a user's limited permissions. In other cases, the request may be rejected outright before providing any input to the generative output service 116.

Furthermore, the system can include a prompt context analysis instance or other service that monitors user input and/or generative output for compliance with a set of policies or content guidelines associated with the tenant or organization. For instance, the service may monitor the content of a user input and block potential ethical violations including hate speech, derogatory language, or other content that may violate a set of policies or content guidelines. The service may also monitor output of the generative engine to ensure the generative content or response is also in compliance with policies or guidelines. To perform these monitoring activities, the system may perform natural language processing on the monitored content in order to detect key words or phrases that indicate potential content violations. A trained model may also be used that has been trained using content known to be in violation of the content guidelines or policies.

Further to these foregoing embodiments, it may be appreciated that a user can provide input to a frontend of a system in a number of suitable ways, including by providing input as described above to a frame rendered with support of a centralized generative service 112. As further described herein, the system 100 supports content summary generation within a content collaboration system. In one or more embodiments, as further described herein, the system 100 utilizes selectable graphical objects or other elements within a graphical user interface (GUI) that is displayed at a client device. The selectable graphical objects or other elements may contain a portion of content obtained from target content, and other selectable elements and graphics including, for example a title, author or content creating user, or other content. A user may be provided, via the GUI, with an input to use to request a summary of the target content. The request may be provided via a designated user input like a cursor hover input or may be a selection of a selectable control (e.g., a button). The system, for example by the centralized generative service 112, may generate a prompt and provide to the generative output engine (e.g., via the generative output service 116) that prepares and outputs a generative response. The generative response may include a textual, natural language summary. The summary may be, for example, a textual summary of a page, set of messages, list of actions, key decisions, or items and summaries related to the target content. Subsequent processing of the summary may include identifying textual portions associated with system-specific items, and populating the summary with system-specific mentions, links, tables, video, audio, and so on. In some cases, the system-specific mentions are populated based on permissions that are specific to the user.

Figure 2:
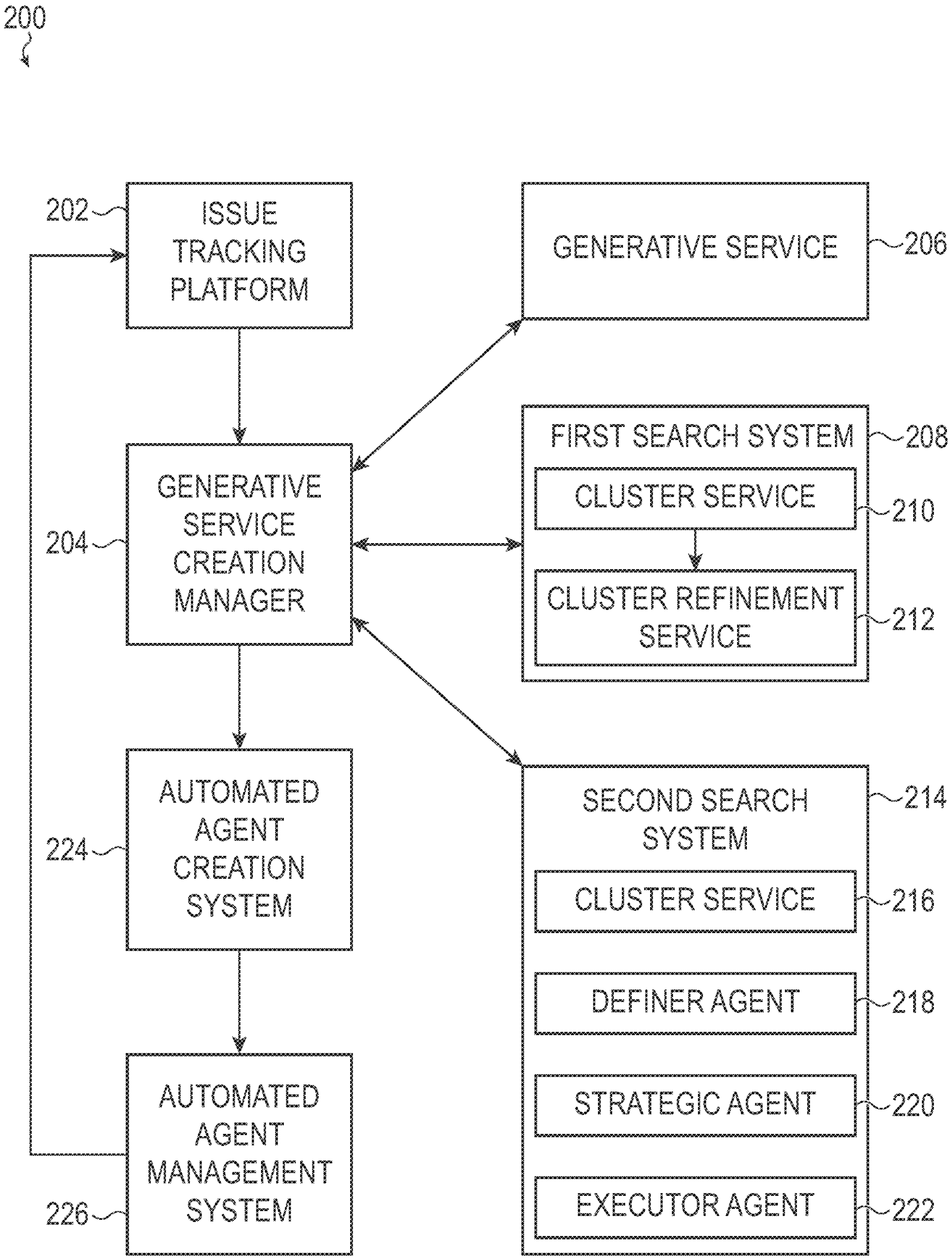
FIG. 2 depicts an example system for a generative service that can be used to create automated assistant services for performing actions on issue tickets, as described herein.

FIG. 2 depicts an example system 200 for a generative service that can be used to create automated assistant services to for performing actions on issue tickets, as described herein. The system 200 can include an issue tracking platform 202, a generative service creation manager 204, one or more generative outputs services 206, a first search system 208, a second search system 214, an automated assistant service creation service 224, and an automated assistant service management system 226. The system 200 can be an example of system 100 and/or leverage components described with respect to system 100 to define and create automated assistant services, as described here. For example, the issue tracking platform 202 can be an example of a platform backend 108, 110, and include a front that generates graphical user interfaces at client devices (e.g., client devices 104, 106). The generative service creation manager 204 can be an example of a centralized content service 112, and the generative service 206 can be an example of the generative output service(s) 116.

Generally, the system 200 can be configured to leverage issue content for issue tickets managed by an issue tracking platform 202, and a generative service(s) 206 to enhance and expand functionality of an automated assistance service by identifying issue tickets or specific types of issues that required intervention (e.g., escalation to a support agent) and utilize information stemming from the escalation to define a problem statement, define a product definition, and/or generate an automated assistant service for performing specialized processing operations at the issue tracking platform 202. The system 200 can include an automate service creation manager 204 which is configured to manage data transfer and processing operations between the issue tracking platform 202 and other components of the system including the generative service 206, the search systems 208, 214, the automated assistant service creation system 224, and/or the automated assistant service management system 226. In some cases, one or more of the system 200 components can be integrate with the issue tracking platform 202.

The issue tracking platform 202 can be configured to assign work within an organization and/or to track completion of work, may be used to track compliance with service level agreements, and so on. The issue tracking platform 202 can manage issue tickets (which may also be referred to as "issues" or "tickets"). Issue content or ticket content can be extracted from the issue tracking platform and processed using the processes and operations, described herein.

An issue tracking platform can manage various issues or tasks (which may also be referred to as a work item or work items) that are processed in accordance with an automated workflow. The workflow may define a series of states that the issue or task must traverse before being completed. The system may also track user interaction events, issue state transitions, and other events that occur over the lifecycle of the issue, which may be indexed and searchable by the platform. The issue tracking platform can be configured to generate a graphical user interface at one or more client devices. The issue tracking platform can be configured to generate an issue view within the graphical user interface. An issue can be associated with issue content (which also may be referred to as issue attributes), which may include a variety of information including a request type, an issue title, a summary of the issue input by a requesting user, and/or other information that is created at the time of the issue. The issue view can display fields that display issue content for an issue. Additionally or alternatively, the issue tracking platform can be configured to define and/or manage projects, which may be a data structure such as an issue/task/work item that is used to group a set of issues to related to a common initiate, feature or other common classification. For example, a project may be an issue data object that contains a group of interrelated issues. In some cases, issues may depend from other issue and/or have other defined hierarchy structures, which may define a workflow for the project and/or an order in which issues are progressed.

The generative service 206 is configured to provide generative responses or other generative content that leverages designated content provided by the issue tracking platform 202. The generative service 206 may also include services or modules that are able to provide various preprocessing and postprocessing operations described with respect to other systems, as described herein. The generative service 206 can be example of the generative services described herein, including generative service 116, and can utilize one or more generative output engines to obtain generative content, as described herein.

The generative service creation manager 204 may be able take a natural language input and/or other inputs in order to formulate content requests that are served to the issue tracking platform 202 the generation service 206, and/or other platforms or services. The generative service creation manager 204 may include or have access to a registry of registered platforms or content providers that are accessible to the generative service 206. The registry may include an address or network location of each of the respective platforms, a list of designated content associated with each platform, and a search classifier that indicates the type or class of input that the platform is configured to use for content retrieval. For example, the search classifier may indicate which type or class of feature set that should be used with the issue tracking platform. Some platforms are adapted to identify content using a set of key words or phrases and other platforms may be adapted to identify content using statements of intent or other semantic features. The registry may also include additional information including authentication information for platforms that provide secure content, keywords or intent classifying information that can be used for platform selection, and other data that facilitates efficient and accurate content retrieval.

The generative service creation manager 204 can include a structured search module, which can formulate respective content requests to be provided the issue tracking platform 202. Each content request may include a feature set or other analysis based on user input. The content request may also include an identifier of the an issue ticket provided by the issue tracking platform 202. For platforms or content providers hosting secure content, the request may also include authentication data including, for example authentication credentials, an authentication token, certificate, or other data element that can be used for authenticating the user. The authentication data may be obtained from a trusted authentication service or passed along by the hosting platform or service. The generative service creation manager 204 may be provided access on par with or no greater than access granted to the user initiating the request or providing the user input. The content request may also be formulated in accordance with platform specific schema and, in some implementations, is provided as an application programming interface (API) call. The content requests may be paired or grouped in accordance with common or shared search classifiers such that a shared or common feature set may be used for each of the requests in the group. Grouped requests may be executed concurrently, may be executed in series, or in an order determined by generative service creation manager 204 and structured search module.

In response to a content requests, the issue tracking platform 202 may produce a set of results, which may include issue tickets, content items, content identifiers corresponding to a respective issue ticket or content item, extracted text, aggregated search results or other forms of content corresponding to the feature sets provided in each respective request. The results returned by all of the issue tracking platform or content providers may be aggregated by the generative service creation manager 204. In some cases, the generative service creation manager 204 can be configured to request content (e.g., generate or otherwise cause queries to be performed at the issue tracking platform), and/or obtain issue content from the issue tracking platform using API communication protocols (e.g., API calls), as described herein.

The aggregated results may be processed to extract a set of results (e.g., designated number of top-scoring or top-ranking results), which may be used to formulate a prompt. In one example, the aggregated results are processed by the generative service creation manager 204 to produce an aggregated set of text snippet portions. The generative service creation manager 204 may, for example identify text blocks in each content item or in the aggregated search results and may extract respective text snippet portions that include a least an extraction threshold number of sentences or phrases. For example, a title, summary, and/or description from an issue may be extracted as a text snipped portion. In some cases, a natural language processing technique is used to identify topic and supporting sentences, which are extracted as text snippet portions. Other natural language processing techniques may eliminate text that is predicted to be contextual, redundant, or non-essential to the text block and remaining text is designated as the respective text snippet portion.

The text snippet portions that have been aggregated by the generative service creation manager 204 may be evaluated with respect to the natural language user input or a representative thereof. For example, each text snippet portion may be subjected to an embedding operation and/or generate a multi-dimensional vector representation of the text. An example embedding operation may add synonyms and predicted corresponding words to words or phrases of the respective text snippet. Additionally, the text snippets may be represented as a vector or other multi-dimensional data element allowing for comparison to a similarly vectorized or processed representation of the natural language user input. For example, a representative vector may be constructed using a word vectorization service that maps words or phrases into a vector of numbers or other characters. A comparison of each vector or other representation may be performed with respect to the user input to determine a degree of correlation or similarity. In one example implementation, a cosine similarity or other similar comparison is performed between respective vectors and a score or value is determined for each pairing. The evaluated snippets may be ranked or sorted by degree of correlation and a subset of snippets may be selected for use in constructing a prompt. In some cases, a threshold score or other degree of correlation is used to select the subset of snippets. In other cases, a threshold number of top scoring results are selected. In other examples, the top-scoring results that provide a threshold number of characters or aggregated snippet size are selected.

The selected or subset of text snippet portions may then be used by the generative service creation manager 204 to construct a prompt that is designed to provoke a relevant and useful generative response from the generative output service 206. The generative service creation manage 204 may combine the subset of text snippet portions, context data, at least a portion of a user input, and predetermined prompt text (also referred to as predetermined query prompt text, template prompt text, or simply prompt text) in order to generate or complete the prompt that will be transmitted to the generative service 206. The predetermined prompt text may include one of a number of predetermined phrases that provide instructions to the generative output service 206 including, without limitation, formatting instructions regarding a preferred length of the response, instructions regarding the tone of the response, instructions regarding the format of the response, instructions regarding prohibited words or phrases to be included in the response, context information that may be specific to the tenant or to the platform, and other predetermined instructions. In some cases, the predetermined prompt text includes a set of example input-output data pairs that may be used to provide example formatting, tone, and style of the expected generative response. In some cases, the predetermined prompt text includes special instructions to help prevent hallucinations in the response or other potential inaccuracies. The predetermined prompt text may also be pre-populated with exemplary content extracted from the platform's content item representing an ideal or reference output, which may reflect a style and tone of the tenant or content hosted on the platform.

In some implementations, the generative service 206 may also obtain or extract context data that is used to improve or further customize the prompt for a particular user, current session, or use history. In one example, the generative service 206 may obtain a user profile associated with an authenticated user operating the frontend that produced the user input. The user profile may include information about the user's role, job title, or content permissions classification, which may indicate the type of content that the user is likely to consume or produce. The role classification may be used to construct specific prompt language that is intended to tailor the generative response to the particular user. Additionally or alternatively, other context data may be obtained, which may be used to generate specific text designed to prompt a particular level of detail or tone of the generative response. Other context data includes content items that are currently or recently open in the current session, user event logs or other logs that indicate content that has been read or produced by the authenticated user, organizational information that indicates the authenticated user's supervisors and/or reporting employees and current role, and other similar context data. In some cases, a personalized query log is referenced, which includes the user's past queries or search history and an indication of successful (or non-responsive) results may be used as context data. Based on prior search results, the generative service 206 may further supplement to include language that improved past results or omit language that produced non-responsive or otherwise unsatisfactory results.

In some implementations, the generative service 206 may generate block-specific tags or text that is associated with each block of text inserted into the prompt. The tag may be string of numbers and/or letters and may be used to identify the content item from which the block of text or segment of text was extracted (a tag may also be referred to as a content identifier). The tag may be an unassociated string of characters that does not inherently indicate a source of the text but can be used by the system, via a registry or some other reference object, to identify the source of the text. In other cases, the tag may include at least a portion of the content identifier, name of the content item, or other characters from which the source of the text can be directly inferred without a registry or reference object. In either configuration, the prompt may include predetermined prompt text that includes instructions for maintaining a record of tags which are used to generate the generative response. Accordingly, the generative service 206 may include a corresponding set of tags in the generative response that indicate which text blocks or snippets of text were used to generate the body of the generative response. This second set or corresponding set of tags may be used by the generative service 206 or other aspect of the system, to generate links, selectable icons, or other graphical objects that are presented to the user. Selection of the generated objects may cause a redirection of the graphical user interface to the respective content item, whether on the same platform or on a different platform. By using a tagging technique, the user may easily select a generated link in order to review the source material or to perform more extensive research into the subject matter of the generative response. If permitted by the generative output engine, reference to the content items (e.g., a URL or other addressable location) may be passed to the generative output engine using the prompt and the prompt may include instructions to maintain or preserve the reference to the content items, which can be used to generate the links displayed in the interface with the generative response.

In accordance with other examples described herein, the prompt generated by the generative service 206 may be communicated to a generative output engine via the prompt management service or prompt gateway. The prompt management service may manage requests or input from multiple generative services in order to provide a single or shared gateway access to the generative output engine. In implementations in which the generative output engine is an external service, the prompt may be communicated to the external generative output engine using an application programming interface (API) call. In some cases, the prompt is provided to the generative output engine using a JSON file format or other schema recognized by the generative output engine. If the generative output engine is an integrated service, other techniques may be used to communicate the prompt to the generative output engine as provided by the architecture of the platform including passing a reference or pointer to the prompt, writing the prompt to a designated location, or other similar internal data transfer technique. As described throughout herein, the generative output engine may include a large language model or other predictive engine that is adapted to produce or synthesize content in response to a given prompt. The generative response is unique to the prompt and different prompts, containing different prompt text, will result in a different generative response.

In response to the prompt, the generative service 206 sends a generative response to the generative service creation manager 204. The generative service creation manager 204 or a related service may perform post processing on the generative response including validation of the response, filtering operations to remove prohibited or non-preferred terms, eliminate potentially inaccurate phrases or terms, or perform other post-processing operations. As discussed above, the generative service 206 may also process any tags or similar items returned in the generative response that indicate the source of content that was used for the generative response. The generative service 206 or a related service may generate links, icons, or other selectable objects to be rendered/displayed in the generative answer interface. Subsequent to any post-processing operations, the generative response, or portions thereof, are communicated to the frontend application for display in the generative answer interface. In some implementations, the generative service 206 may also receive express feedback provided via the interface regarding the suitability or accuracy of the results. The generative service 206 may also provide feedback that results from object selections, dwell time on the generative response, subsequent queries, and other user interaction events that may signal positive or negative feedback, which may be used to train intent recognition modules or other aspects of the system 200 to improve the accuracy and performance of subsequent responses.

In the present example the generative response and/or a postprocessed version of the generative response is passed back to one or more platforms including an issue tracking platform 202, which may cause display of at least a portion of the generative response in the generative interface or other respective interface. In the example where the input is received via an issue tracking platform 202, the generative response may include content identifiers, which can be used to be display respective issue content in a graphical user interface of the issue tracking platform.

In some instances, the generative service 206 may include instructions to provide a confidence metric, such as a confidence interval or confidence score, with any generative response. The confidence metric may indicate an estimated confidence in the accuracy or relevancy of the generative response. In response, the generative output engine, may provide the corresponding confidence metric along with the generative output. If the provided confidence metric falls below a threshold or fails to satisfy a confidence criteria, the generative service 206 may not return a generative response and/or cause the generative response to be displayed in the generative interface. In some cases, a message indicating that an answer or response is currently not available or other similar message may be displayed in the generative answer interface.

The first search system 208 can be configured to determine or identify a set of issue tickets that will be used to generate one or more product definitions, product speciation and/or the corresponding automated assistant service(s) as described herein. The first search system 208 can be configured as a parallel processing system, an example of which is described with reference to FIG. 7A. The first search system 208 can be configured to analyze a set of issue tickets (and corresponding data), as described herein and generate multiple groups. In some, cases, the first search system 208 can be configured to perform clustering operations on the set of issue tickets to generate multiple cluster groups as described herein. The first search system 208 can be configured to receive issue ticket identifiers and/or issue ticket data from the generative service creation manager 204. The first search system 208 can analyze the issue ticket data and output a structured data set to the generative service creation manager 204.

The first search system 208 can include a clustering service 210 and a cluster refinement service 212, which can be implement utilizing the hardware and software systems described herein. The clustering service 210 can be configured to separate the issue tickets into multiple different cluster groups, which can be performed on the embedded vector representation corresponding to each issue ticket, as described herein. The cluster refinement service can be configured to identify and separate outliers in the original cluster groups. For example, the cluster refinement service may include a density-based clustering algorithm that groups together issue tickets that are close together, marking outliers as noise, as described herein.

The second search system 214 can be configured to determine or identify a set of issue tickets that will be used to generate one or more product definitions, product speciation and/or the corresponding automated assistant service (s) as described herein. The second search system 214 can be configured as an iterative processing system, an example of which is described with reference to FIG. 7B. The second search system 214 can be configured to analyze a set of issue tickets (and corresponding data), as described herein and generate one or more groups. In some, cases, the second search system 214 can be configured to perform clustering operations on the set of issue tickets to generate one or more cluster groups as described herein. The second search system 214 can be configured to receive issue ticket identifiers and/or issue ticket data from the generative service creation manager 204, analyze the issue ticket data, and output a structured data set to the generative service creation manager 204.

The clustering service 216, which can be implement utilizing the hardware and software systems described herein. The clustering service 216 can be configured to separate the issue tickets into multiple cluster groups, as described herein. The clustering service 216 can be configured to separate the issue tickets into clusters using processes such as Gaussian mixture models clustering, k-means clustering or other suitable clustering processes, as described herein. The clustering service 216 can be configured to select a single cluster group from the one or more cluster groups identified using the clustering process. In some cases, the clustering service may select a cluster group having the greatest number of issue tickets assigned to the same cluster, a cluster group having the greatest density, a cluster group satisfying a defined number of issues tickets, and/or other parameters, or combinations thereof.

The second search system 214 can include a definer agent 218, a strategic agent 220 and an executer agent 222, which can be configured to receive the output or results from the clustering service 216 and perform one or more additional actions that identify a set of document which are used to generate a product definition, product specification and/or automated assistant service, as described herein. The definer agent 218, a strategic agent 220 and an executer agent 222 can be implement utilizing the hardware and software systems described herein.

The definer agent 218 can be configured to a set of technical documents related to the issue tickets identified by the cluster service 214 (e.g., issue tickets relating to a same cluster group) and produce a structured definition that includes details for an automated assistant service. The definer agent 218 can be configured to utilize a generative service 206, as described herein (e.g., via generative service creation manager 204). In some cases, defined agent 218 can be configured to output a set of technical documents that include a name for an issue, a summary of the problem from one or more of the issue tickets in a cluster group, required inputs to the issue ticket(s), required tools utilized to progress or resolve the issue tickets, and/or a sequence of operational steps that led to resolution for one or more of the issue tickets.

The strategic agent 220 can be configured to receive the one or more technical documents output by the definer agent 218 and generate a search schema for identifying additional documents that are related to issue tickets (e.g., seed tickets) of a cluster groups, as described herein. The executor agent 222 is configured to receive the search schema from the strategy agent 220 and use the search schema to generate one or more queries to the issue tracking platform for identifying additional issue tickets or other resources that are related to the issue tickets of a particular cluster group (e.g., the seed issue tickets).

The automated assistant service create system 224 can be configured to receive a problem definition, product specification and generate an automated assistant service using the received problem definition and product specification. The product specification document can define required inputs to be obtained by the automated assistant service, required tool configurations for the automated assistant service and a set of operational steps to be implemented by the automated assistant service utilizing the required inputs and the required tool configurations. Accordingly, when utilized by the automated processing service the product specification can provide specific actions or instructions that are to be performed by the assistant service when performing on an issue that correspond to the automated assistant service. In some cases, the required inputs can define one or more data sources for the automated processing service to access and the required tool configurations can define a query language to be used by the automated processing service to obtain data from one or more data sources. Additionally, the product specification can define a multi-step process for the automated assistant service to follow in relation to the new issue.

The automated assistant service management system 226 can be configured to utilize an automated assistant service to perform one or more automations on a new issue. The automated assistant service management system 226 can be configured to analyze the new issue ticket data received at the issue tracking platform 202 to determine whether the new issue ticket corresponds to a particular automated assistant service. In some cases, the automated assistant service management system 225 can be configured to perform a semantic analysis on the new issue ticket data (e.g., a title provided by a respecting user, a description of the issue provided by the requesting user, message thread data, and/or other content associated with the new ticket) and use the results of the analysis to determine a similarity criteria of the new ticket to one or more of the automated assistant services. For example, the automated management system 226 can determine a semantic similarity between the new ticket data and a problem definition corresponding to one or more automated assistant service. If the similarity criteria satisfy a defined metric, the automated assistant service management system 226 can be configured to cause the issue tracking platform 202 to utilize the corresponding automated assistant service for performing actions for the new issue.

In some cases, the automated assistant service management system 226 can be configured to evaluate new issue tickets with respect to one or more automated assistant services using a set of key words or phrases and other platforms may be adapted to identify content using statements of intent or other semantic features. The system 200 can be configured to include additional information including authentication information for platforms that provide secure content, keywords or intent classifying information that can be used for platform selection, and other data that facilitates efficient and accurate content retrieval. In some cases, the automated management system 226 may be configured to process new issue tickets utilizing the generative service 206, and may be configured to extract new issue ticket data, and information relating to one or more automated assistant services to include in a prompt that is configured to return an output which can be used to determine whether a particular automated assistant service can be used for a respective new issue ticket.

Figure 3A:
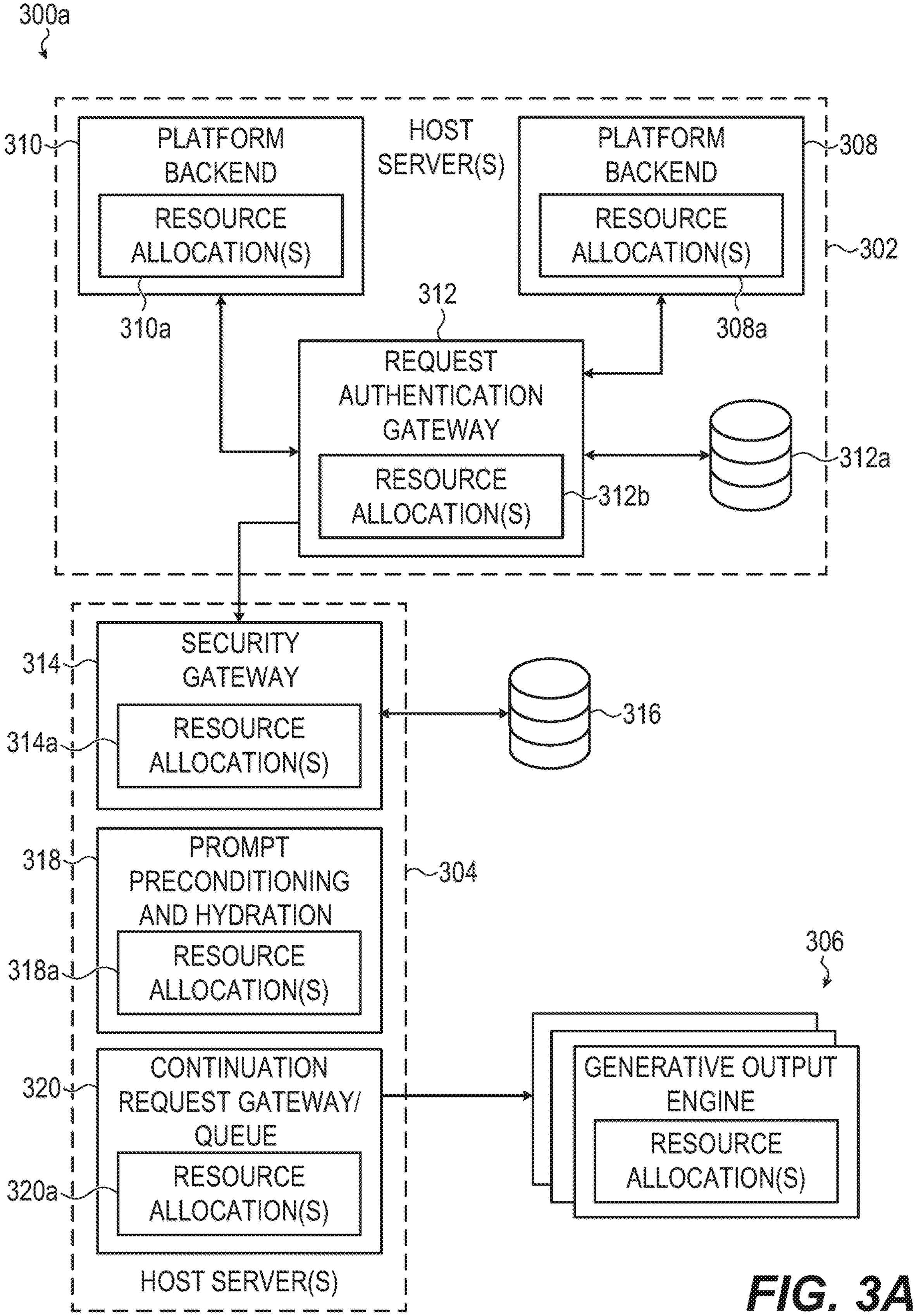
FIG. 3A depicts an example diagram of a system, such as described herein that can include and/or may receive input from a generative output engine.
Figure 3B:
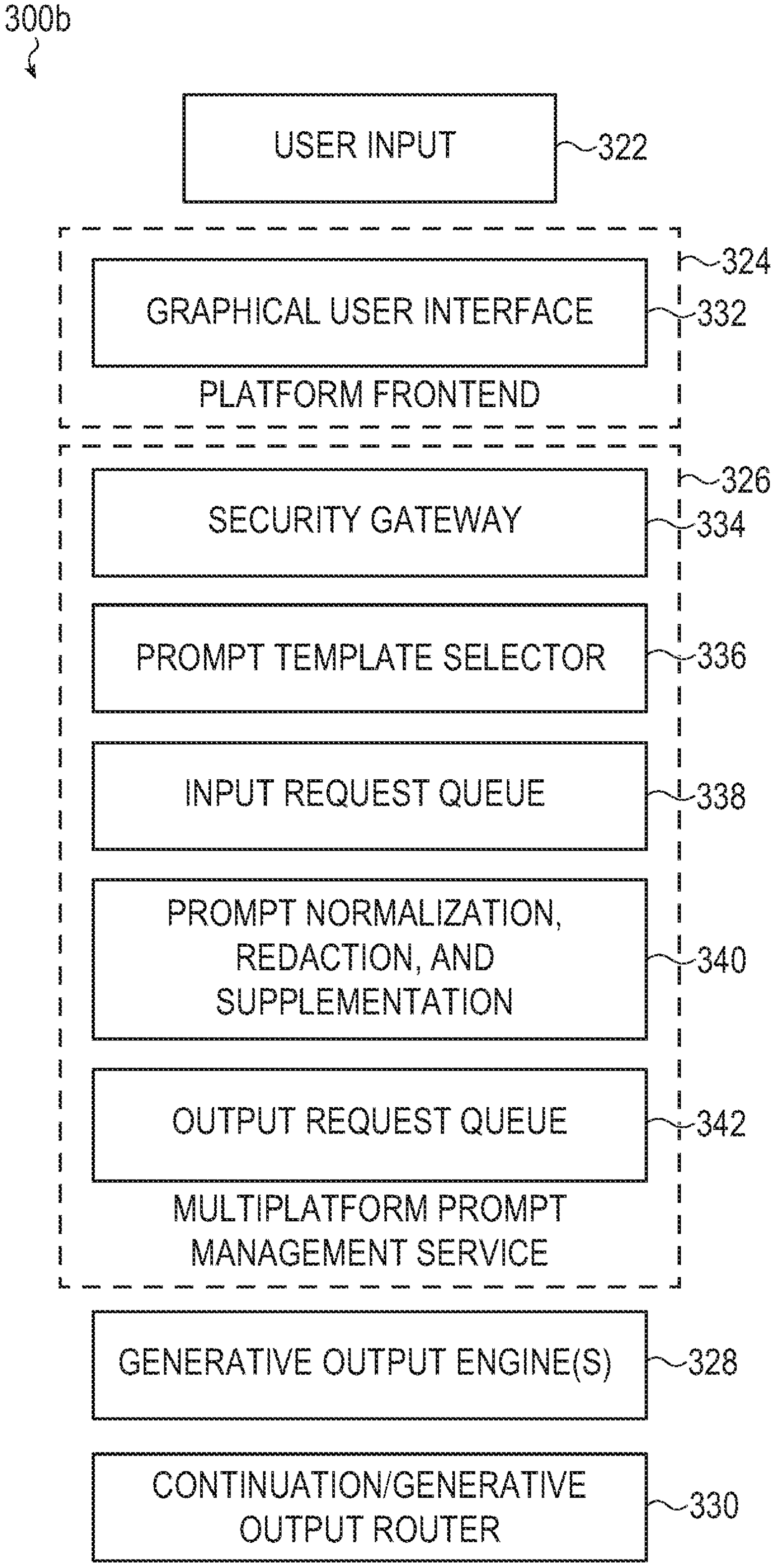
FIG. 3B depicts a functional system diagram of a system that can be used to implement a multiplatform prompt management service.

FIGS. 3A-3B depict system diagrams and network/communication architectures that may support a system as described herein. Referring to FIG. 3A, the system 300*a* includes a first set of host servers 302 associated with one or more software platform backends. These software platform backends can be communicably coupled to a second set of host servers 304 and purpose configured to process requests and responses to and from one or more generative output engines 306.

Specifically, the first set of host servers 302 (which, as described above can include processors, memory, storage, network communications, and any other suitable physical hardware to instantiate software) can allocate certain resources to instantiate a first and second platform backend, such as a first platform backend 308 and a second platform backend 310. Each of the respective backends can be instantiated by cooperation of processing and memory resources associated to each respective backend. As illustrated, such dedicated resources are identified as the resource allocations 308*a* and the resource allocations 310*a*.

Each of these platform backends can be communicably coupled to an authentication gateway 312 configured to verify, by querying a permissions table, directory service, or other authentication system (represented by the database 312*a*) whether a particular request for generative output from a particular user is authorized. Specifically, the first or second platform backend 308, 310 may be a content generation platform used by a user operating a frontend thereof.

Once the authentication gateway 312 determines that a request from a user of either platform is authorized to access data or resources implicated in service that request, the request may be passed to a security gateway 314, which may be a software instance supported by physical hardware identified in FIG. 3A as the resource allocations 314*a*. The security gateway 314 may be configured to determine whether the request itself conforms to one or more policies or rules (data and/or executable representations of which may be stored in a database 316) established by the organization. For example, the organization may prohibit executing prompts for offensive content, value-incompatible content, personally identifying information, health information, trade secret information, unreleased product information, secret project information, and the like. In other cases, a request may be denied by the security gateway 314 if the prompt requests beyond a threshold quantity of data.

Once a particular user-initiated prompt has been sufficiently authorized and cleared against organization-specific generative output rules, the request/prompt can be passed to a preconditioning and hydration service 318 configured to populate request-contextualizing data (e.g., user ID, page ID, project ID, URLs, addresses, times, dates, date ranges, and so on), insert the user's request into a larger engineered template prompt and so on. Example operations of a preconditioning instance are described elsewhere herein; this description is not repeated. The preconditioning and hydration service 318 can be a software instance supported by physical hardware represented by the resource allocations 318*a*. In some implementations, the hydration service 318 may also be used to rehydrate personally identifiable information (PII) or other potentially sensitive data that has been extracted from a request or data exchange in the system.

One a prompt has been modified, replaced, or hydrated by the preconditioning and hydration service 318, it may be passed to an output gateway 320 (also referred to as a continuation gateway or an output queue). The output gateway 320 may be responsible for enqueuing and/or ordering different requests from different users or different software platforms based on priority, time order, or other metrics. The output gateway 320 can also serve to meter requests to the generative output engines 306.

FIG. 3B depicts a functional system diagram of the system 300*a* depicted in FIG. 3A. In particular, the system 300*b* is configured to operate as a multiplatform prompt management service supporting and ordering requests from multiple users across multiple platforms. In particular, a user input 322 may be received at a platform frontend 324. The platform frontend 324 passes the input to a prompt management service 326 that formalizes a prompt suitable for input to a generative output engine 328, which in turn can provide its output to an output router 330 that may direct generative output to a suitable destination. For example, the output router 330 may execute API requests generated by the generative output engine 328, may submit text responses back to the platform frontend 324, may wrap a text output of the generative output engine 328 in an API request to update a backend of the platform associated with the platform frontend 324, or may perform other operations.

Specifically, the user input 322 (which may be an engagement with a button, typed text input, spoken input, chat box input, and the like) can be provided to a graphical user interface 332 of the platform frontend 324. The graphical user interface 332 can be communicably coupled to a security gateway 334 of the prompt management service 326 that may be configured to determine whether the user input 322 is authorized to execute and/or complies with organization-specific rules.

The security gateway 334 may provide output to a prompt selector 336 which can be configured to select a prompt template from a database of preconfigured prompts, templatized prompts, or engineered templatized prompts. Once the raw user input is transformed into a string prompt, the prompt may be provided as input to a request queue 338 that orders different user request for input from the generative output engine 328. Output of the request queue 338 can be provided as input to a prompt hydrator 340 configured to populate template fields, add context identifiers, supplement the prompt, and perform other normalization operations described herein. In other cases, the prompt hydrator 340 can be configured to segment a single prompt into multiple discrete requests, which may be interdependent or may be independent.

Thereafter, the modified prompt(s) can be provided as input to an output queue at 342 that may serve to meter inputs provided to the generative output engine 328.

These foregoing embodiments depicted in FIGS. 3A-3B and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

Figure 4A:
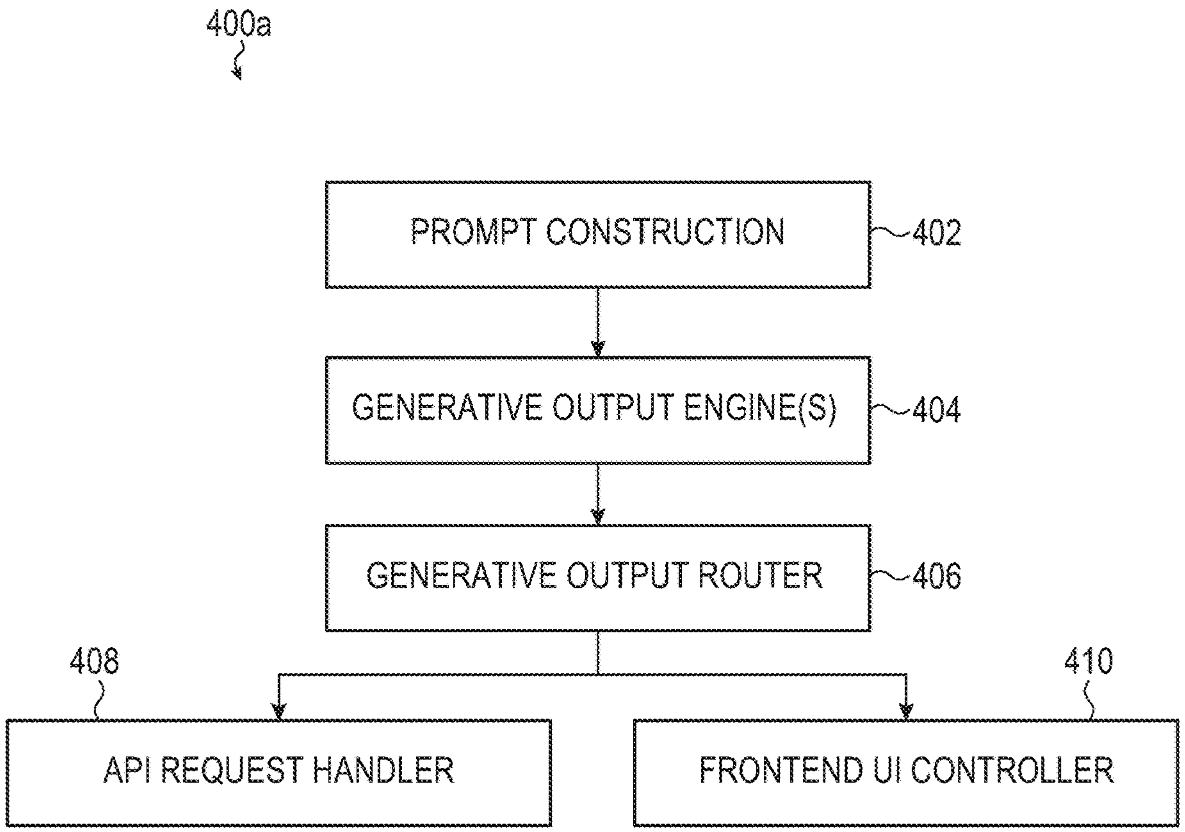
FIG. 4A depicts an example system diagram and data processing pipeline.

For example, although many constructions are possible, FIG. 4A depicts an example system diagram and data processing pipeline as described herein. The system 400*a* receives input and constructs a prompt therefrom at operation 402. After constructing a suitable prompt, and populating template fields, selecting appropriate instructions and examples for an LLM to continue, the modified constructed prompt is provided as input to a generative output engine 404. A continuation from the generative output engine 404 is provided as input to a router 406 configured to classify the output of the generative output engine 404 as being directed to one or more destinations. For example, the router 406 may determine that a particular generative output is an API request that should be executed against a particular API (e.g., such as an API of a system or platform as described herein). In this example, the router 406 may direct the output to an API request handler 408. In another example, the router 406 may determine that the generative output may be suitably directed to a graphical user interface/frontend.

Figure 4B:
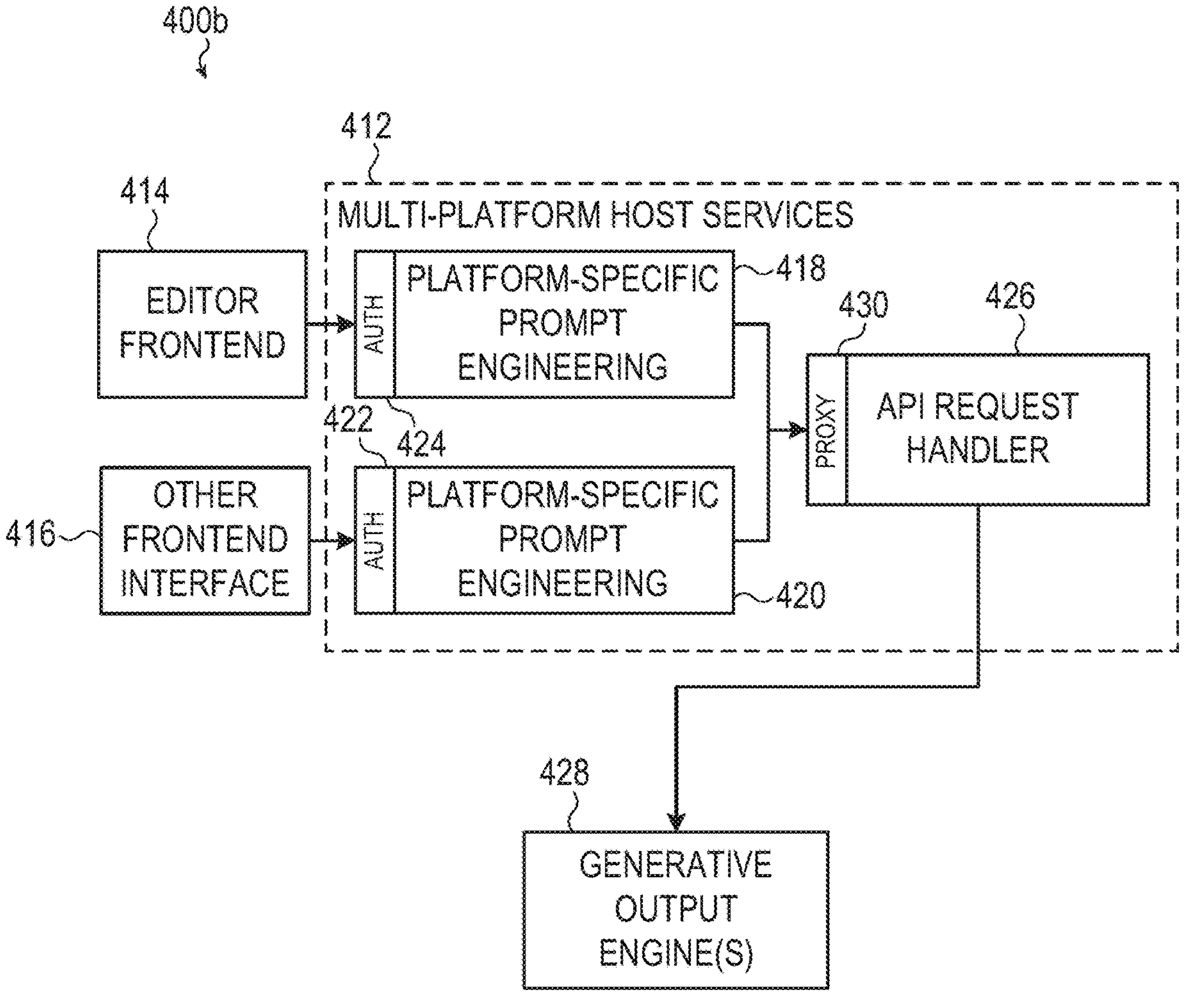
FIG. 4B depicts a system providing multiplatform prompt management as a service.

Another example architecture is shown in FIG. 4B, illustrating a system providing prompt management, and in particular multiplatform prompt management as a service. The system 400*b* is instantiated over cloud resources, which may be provisioned from a pool of resources in one or more locations (e.g., datacenters). In the illustrated embodiment, the provisioned resources are identified as the multi-platform host services 412.

The multi-platform host services 412 can receive input from one or more platforms in a variety of ways. In some cases, user input may not be required, and prompts may be requested and/or engineered automatically.

The multi-platform host services 412 can include multiple software instances or microservices each configured to receive user inputs and configured to provide, as output, an engineered prompt. In many cases, these instances—shown in the figure as the platform-specific prompt engineering services 418, 420—can be configured to generate engineered prompts retrieved from a database such as described above.

In many cases, the platform-specific prompt engineering services 418, 420 can each be configured to authenticate requests received from various sources. In other cases, requests from editor regions or other user interface elements of particular frontends can be first received by one or more authenticator instances, such as the authentication instances 422, 424. In other cases, a single centralized authentication service can provide authentication as a service to each request before it is forwarded to the platform-specific prompt engineering services 418, 420.

Once a prompt has been engineered/supplemented by one of the platform-specific prompt engineering services 418, 420, it may be passed to a request queue/API request handler 426 configured to generate an API request directed to a generative output engine 428 including appropriate API tokens and the engineered prompt as a portion of the body of the API request. In some cases, a service proxy 430 can interpose the platform-specific prompt engineering services 418, 420 and the request queue/API request handler 426, so as to further modify or validate inputs prior to including those inputs in an API call to the generative output engine 428 by the request queue/API request handler 426 although this is not required of all embodiments.

These foregoing embodiments depicted in FIGS. 3A-3B and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

More generally, it may be appreciated that a system as described herein can be used for a variety of purposes and functions to enhance functionality of collaboration tools. Detailed examples follow. Similarly, it may be appreciated that systems as described herein can be configured to operate in a number of ways, which may be implementation specific.

For example, it may be appreciated that information security and privacy can be protected and secured in a number of suitable ways. For example, in some cases, a single generative output engine or system may be used by a multiplatform collaboration system as described herein. In this architecture, authentication, validation, and authorization decisions in respect of business rules regarding requests to the generative output engine can be centralized, ensuring auditable control over input to a generative output engine or service and auditable control over output from the generative output engine. In some constructions, authentication to the generative output engine's services may be checked multiple times, by multiple services or service proxies. In some cases, a generative output engine can be configured to leverage different training data in response to differently authenticated requests. In other cases, unauthorized requests for information or generative output may be denied before the request is forwarded to a generative output engine, thereby protecting tenant-owned information within a secure internal system. It may be appreciated that many constructions are possible.

Additionally, some generative output engines can be configured to discard input and output once a request has been serviced, thereby retaining zero data. Such constructions may be useful to generate output in respect of confidential or otherwise sensitive information. In other cases, such a configuration can enable multi-tenant use of the same generative output engine or service, without risking that prior requests by one tenant inform future training that in turn informs a generative output provided to a second tenant. Broadly, some generative output engines and systems can retain data and leverage that data for training and functionality improvement purposes, whereas other systems can be configured for zero data retention.

In some cases, requests may be limited in frequency, total number, or in scope of information requestable within a threshold period of time. These limitations (which may be applied on the user level, role level, tenant level, product level, and so on) can prevent monopolization of a generative output engine (especially when accessed in a centralized manner) by a single requester. Many constructions are possible.

In some cases, a generative response, for example based on issue data from similar issues identified using semantic analysis, can be used to generate a user message for display in the intake portal graphical user interface using the received generative response. The user message can include a suggested action narrative and agent information. In some cases, the recommendation panel can include an option to cause the user message to be displayed in the intake portal graphical user interface. Accordingly, in response to an agent selection of the option the user message may be sent to the user via the intake portal graphical user interface.

Figure 5:
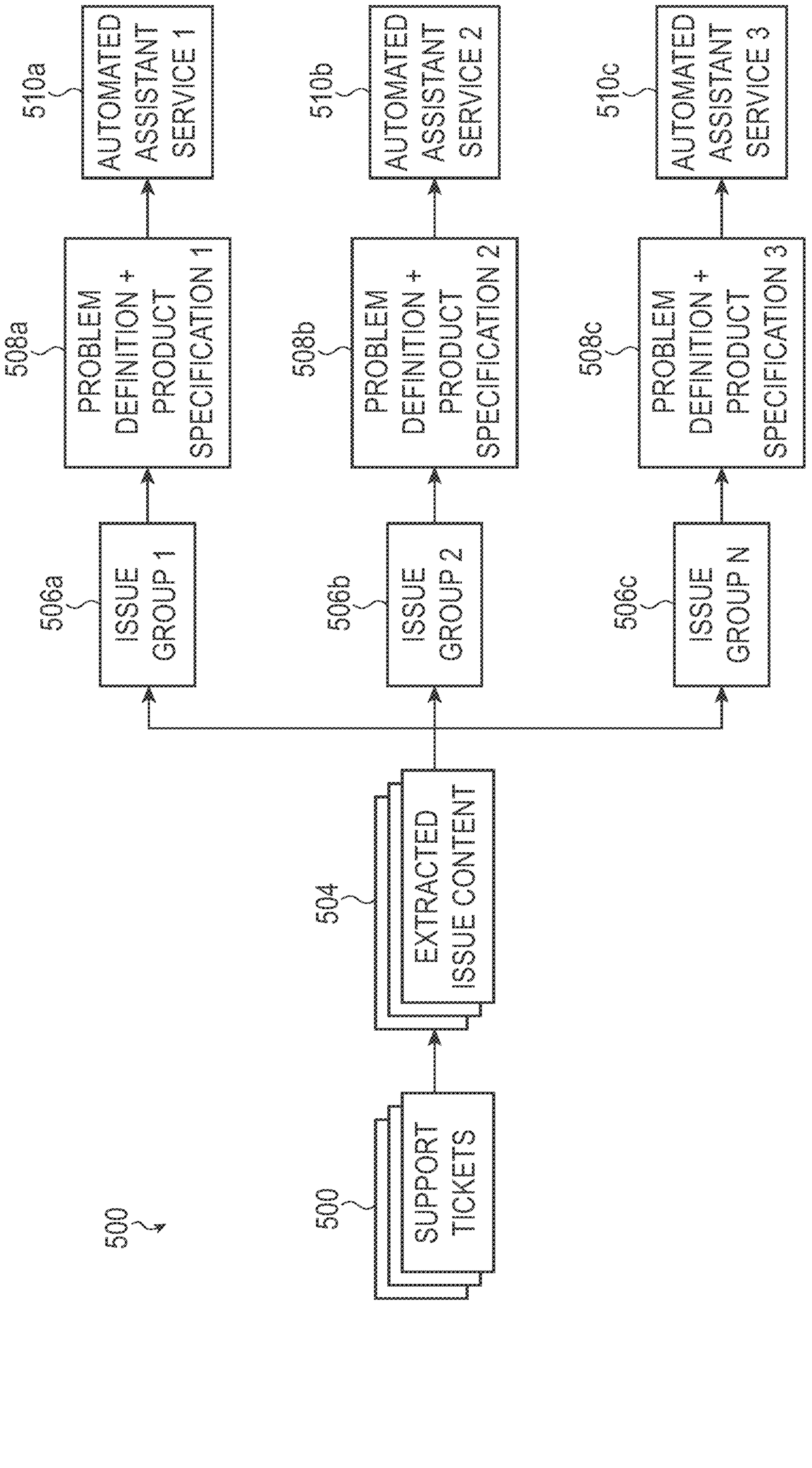
FIG. 5 depicts an example data processing scheme for creating automated assistant services, as described herein.

FIG. 5 depicts an example data processing scheme 500 for creating automated assistant services, as described herein. The data processing scheme 500 can be performed by the systems described herein, including the system 200.

The data processing scheme 500 can be used to create one or more automated assistant services that can perform actions/operations for issue tickets managed by an issue tracking platform, as described herein. The data processing scheme 500 can be configured to identify issues that required escalation from an automated service and to a support agent (e.g., specialized user that analyzes and performs actions to progress or resolve an issue ticket), determine sets of issue tickets that are related to a common issue and/or require similar or the same resolutions steps from a support agent, and generate content that can be used to create an automated assistant service which can be used to automatically resolve or progress future issue tickets.

The data processing scheme 500 can include obtaining issue tickets 502 and corresponding issue ticket data that will be analyzed to generate the automated assistant services. In some cases, the system (e.g., issue tracking platform 202 and/or generative service creation manager 204) can be configured to identify issue tickets 502 based on one or more parameters. For example, the system may be configured to identify issue tickets 502 that are associated with a specific status, such as issue tickets that are associated with a specific resolution criteria (e.g., successful resolution) and/or were escalated from an automated service to a support agent at an issue tracking platform. The system may generate one or more queries to a database associated with the issue tracking platform, and the queries can be configured to identify and obtain issue tickets that were escalated to a support agent.

In some cases, the issue tracking platform is configured to generate issue data indicating each action that occurs with respect to each issue ticket. Accordingly, as an issue ticket is transitioned between different states, messages are exchanged, status is updated, one or more other fields are changed or updated, automations are performed, and so on, the issue tracking platform may update data associate with the issue ticket to indicate these events. Accordingly, a transition of an issue ticket from an automated service to a support agent can result in the issue ticket being updated with data that indicates this transition. Accordingly, the one or more queries can be configured to identify issue tickets that have data indicating escalation from an automated service and to a support agent.

Additionally or alternatively, the system can be configured to query the issue tracking system to identify issue tickets that are associated with other types of parameters. For example, a query can be configured to return issue tickets that are associated with specific types of service platforms (e.g., a collaborative document platform, a messaging platform, an issue tracking platform, and so on), with specific business units, user groups, components, user groups or users, and so on. Accordingly, the issue tickets 502, that are obtained by the system can include issue tickets that have one or more defined characteristics, such as being associated with an escalation event.

In some cases, the data processing scheme can be configured to obtain issue tickets 502 based on a specific type of event(s) that is associated with an issue ticket and/or higher-level associations of the ticket such as a related product, service or business unit. At the initial stage of obtaining issue tickets 502 the system may not analyze content that is specific to an individual issue ticket, such as a title, description, and so on. Accordingly, the issue tickets 502 that are initially obtained may be issue tickets that are related to a variety of different problems experienced by users or one or more platforms and include different solutions that are specific to each issue ticket. Obtaining an initial set of issue tickets 502 that include issue tickets direct to different problems, which are obtained using broad categorical criteria such as escalation events, product groups and so on, allows the subsequent steps of the data processing schema to specifically determine groups of issue tickets that can be analyzed and used to generate robust automated assistant services that can be applied to new issue tickets requiring a same or similar solution.

In some cases, because issue tickets are submitted by a variety of different users of the system, different issue tickets may identify or request help for problems that require a similar or same solution, but may describe that solution in a variety of different ways. Accordingly, identifying multiple issue tickets 502 using broad categorical criteria helps ensure that the data used to generate the automated assistant services includes user submitted content that has variations in user inputted content. For example, the multiple issue tickets 502 can be obtained as described herein such that the support tickets 502 may include multiple tickets that can be grouped as having a similar problem, requiring similar or the same solutions, while having a variety of different types of user submitted content describing or characterizing the corresponding issue. The system can be configured to utilize the variation in the user inputs to generate a robust data set that can be used to identify new tickets, which may also have variable user inputs, and that can be solved by an automated assistant service using a same or similar solution steps. For example, the data processing scheme 500 allows the system to robustly identify issue tickets that have large variations in user input (e.g., user descriptions characterizing an issue) but can be solved by an automated assistant service using the same or similar processing steps.

The system can be configured to generate the issue tickets 502 in different structured data formats. For example, the issue tracking platform may return issue identifiers for issue tickets that were identified by one or more queries. In these cases, the structured data format may be a data object containing issue identifiers, which can be used by the system to obtain additional data or content for one or more of the identified issue tickets 502. In other cases, the issue tracking platform may return other issue content in addition to the issue identifiers. For example, the issue tracking platform may include content such as an issue title, issue description, issue status, message thread data, associated with each issue ticket identified from the query.

The data processing scheme 500 can include generating extracted issue content 504 from the obtained issue tickets 502. In some cases, the extracted issue content 504 includes a specific subset of issue data associated with each issue ticket 502. For example, the issue content 504 may include interaction data, which may be data, meta-data or other content generated by the issue tracking platform that indicates user interactions (e.g., inputs to an issue ticket received from one or more users of issue tracking platform, or caused by a user's interaction with the issue tracking platform or other platform of a collaborative platform environment. In some cases, the interaction data may include message thread data for each issue ticket. The message thread data may include messages that were exchanged between a requesting user (e.g., a user that submitted a respective issue ticket) and messages generated by an automated processing service and/or one or more support agents. Additionally or alternatively, the extracted issue content may include a description for each issue, a title for each issue or other data that was input by a requesting user. Accordingly, the extracted issue content 504 may include a subset of all the issue data/content associated with an issue. This may improve the efficiency of data processing operations by reducing the amount of issue data exchanged and analyzed by the computing systems described herein. Additionally, the extracted issue content 504 may provide a limited and focused data set that is processed by one or more generative output engines, which may reduce the likelihood of errors in generative outputs, generative outputs that include extraneous information, and so on.

The extracted issue content 504 can be configured in a variety of different formats. In some cases, the extracted issue content 504 can be configured as a structured data format that uniquely relates extracted issue content to a respective issue identifier. For example, each unique issue identifier can correspond to its respective message thread data, issue title, description, and/or other extracted issue data.

The data processing scheme 500 can determine issue groups **506*a*, 506*b*, 506*c* using the extracted issue content. Each issue groups 506*a*, 506*b*, 506*c* can include issue tickets, identified from the set of issue tickets 502, that include similar or the same resolution process. For example, a first group of issue tickets 506*a* may include a first subset of issue tickets identified from the set of issue tickets 502 that include issues requiring a first similar or same resolution process, a second groups of issue tickets 506*b* may include a second subset of issues tickets identified from the set of issue tickets 502** that include issue requiring a second similar or same resolution process, different from the first resolution process, and so on.

The data processing scheme 500 can be configured to determine the issue groups **506*a*, 506*b*, 506*c* using a variety of techniques. In some cases, the data processing scheme 500 can be configured to utilize a clustering process to generate multiple clustering groups in parallel, each of which can be used to generate a respective automated assistant service. An example of a parallel clustering process is described with respect to FIGS. 6 and 7A. In other cases, the data processing scheme 500 can be configured to utilize an iterative clustering process, in which all issue tickets identified in the set of issue tickets 502 can be used to determine the first group of issue tickets 506*a*. Using this process, the remaining issue tickets 502 that were not assigned to the first group of issue tickets 506*a*, can be subsequently analyzed using second iteration of the clustering process to determine the second group of issue tickets 506*b*, and so on. An example of an iterative clustering process is described with respect to FIGS. 6 and 7**B.

The data processing scheme 500 can be configured to generate a problem definition and product specification using issue data from issue tickets assigned to each of the issue groups 506*a*, 506*b*, 506*c*. For example, the data processing scheme 500 can include generating a first problem definition and product specification 508*a* using issue data for issues assigned to the first issue group 506*a*, a second problem definition and product specification 508*b* using issue data for issues assigned to the second issue group 506*b*, and so on.

In some cases, each problem definition can be created using a generative output engine, as described herein. Each problem definition may include a name, a summary of a problem common to an issue group 506, and/or other information relevant to the respective issue group 506. In some cases, the problem definition may be based on user inputs provided to issue tickets that are assigned to an issue group. A generative output engine may generate the problem definition based on a variety of different user inputs to respective issue tickets, which may describe similar problems and/or problems requiring similar solutions in a variety of different ways. Accordingly, a problem definition generated by the generative output engine may be configured to identify new issues having varied user inputs and require issue resolution processes that are similar to issue tickets of a particular issue group. In this way the system described herein may improve the process for identifying new issues tickets that are submitted to the issue tracking platform with varied user inputs describing a problem, and which can be solved using an automated assistant service created using issue data from a particular issue group 508.

In some cases, the system can be configured to construct a prompt that is configured to obtain a generative output that include a problem definition and/or product specification. For example, the prompt may include predetermined prompt text that includes instructions for the generative output engine to analyze the corresponding data according to a specific process, example input types and/or input data, example output types and/or output data, which may be used to produce a generative output including a specific format (e.g., particular structured data format) and content. The system can be configured to analyze the generate output to identify specific content from the structured data format such as a problem definition and a product specification. In some cases, the problem definition and/or product specification may include sub-sections of content which may be identified and processed by the system.

Each product specification can define parameters for an automated assistant service that can be used to resolve or progress each of the issue tickets assigned to a particular issue group. For example, issue data for issue tickets from the first issue group 506*a* may be used to generate an automated assistant service that is configured to resolve or progress each issue ticket in the first issue group 506*a*. Accordingly, as new issue are submitted to the issue tracking platform and identified as relating to the first issue groups 506*a* (e.g., a new issue meets a similarity criteria to a problem definition for a first problem statement 508*a* of the first issue group 506*a*), the system can utilize a first automated assistant service 510*a* that corresponds to the first issue group 506*a* and/or the first problem statement and product specification 508*a* to perform actions on a new issue to resolve or progress the new issue. Additionally, the system can utilize a second automated assistant service 510*b* that corresponds to the second issue group 506*b* and/or the second problem statement and second product specification 508*b*, a third automated assistant service 510*c* that corresponds to the third issue group 506*c* and/or the third problem statement and second product specification 508*c*, to perform actions on new issues to resolve or progress the new issues. The data processing scheme 500 can be used to generate new automated assistant services for resolving problems/issues that were not previously resolvable by an automated processing service, and can be utilized by the automated processing service on new issues that meet a criterion for employing an automated assistant service. The processing of generating automated assistant services by using the grouping processes and generative output engine(s) as described herein, helps improve determining when to utilize a particular automated assistant service for a new issue and helps ensure that when an automated assistant service is employed it will effectively resolve or progress the new issue.

In some cases, an automated assistant service can caused the system to extract issue content from a new issue ticket and generate a prompt that includes the extracted issue ticket data and specialized prompt instructions associated with the particular automated assistant service. The system can be configured to provide the prompt to a generative output engine, which can utilize the new issue ticket data and specialized prompt instructions to cause actions to be performed with respect to the new issue ticket. The actions may include API calls to specialized systems formatted in accordance with the specialized prompt instructions, API calls to the issue tracking platform, utilization of one or more plugins or services and/or other processes defined by the specialized instructions.

Figure 6:
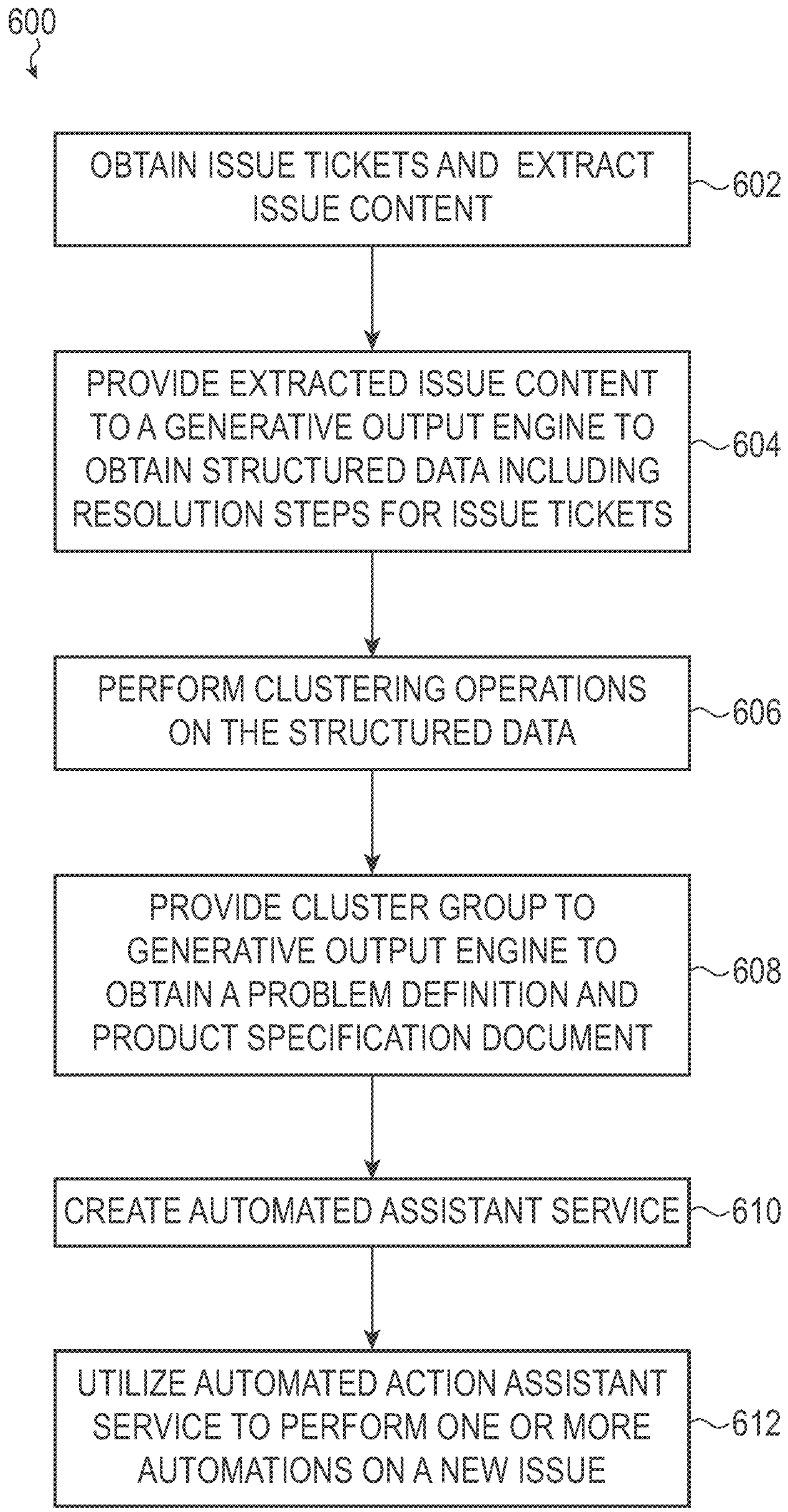
FIG. 6 depicts an example process for creating automated assistant services for performing actions on issue tickets, as described herein.

FIG. 6 depicts an example process 600 for creating automated assistant services for performing actions on issue tickets, as described herein. The process 600 can be performed by the system and platforms described herein. For example, in some cases, an issue tracking platform may be configured to perform process 600. In other cases, one or more operations of the process 600 may be performed by separate systems and/or may interface with an issue tracking platform to obtain data and/or provide an automated processing service at the issue tracking platform, as described herein.

At operation 602, the process 600 can include obtaining issue tickets and extracting issue content. The system can be configured to obtain a first set of issue tickets corresponding to issues managed by an issue tracking platform. In some cases, this may include generating one or more queries for obtaining issue tickets managed by the issue tracking platform (or otherwise accessing issue tickets and corresponding issue data from the issue tracking platform). Obtaining the issue tickets can include obtaining issue tickets that are associated with one or more parameters, as described herein. For example, the system may generate queries that obtain issue tickets that are each associated with an escalation event indicating transition of a respective issue ticket from an automated support system to a user-based support system (e.g., tickets that were escalated to and progressed or resolved by a support engineer).

Additionally or alternatively, the system can be configured to query the issue tracking system to identify issue tickets that are associated with other types of parameters. For example, a query can be configured to return issue tickets that are associated with specific types of service platforms (e.g., a collaborative document platform, a messaging platform, an issue tracking platform, and so on), with specific business units, user groups, components, user groups or users, and so on. Accordingly, the issue tickets 502, that are obtained by the system can include issue tickets that have one or more defined characteristics, such as being associated with an escalation event. In some cases, the system can be configured to execute API call(s) including particular criteria, which are configured to identify issue tickets that have been escalated, as described herein. Additionally or alternatively, the system can obtain issue tickets based on parameters associated with an issue such as an issue type, using natural language terms or phrases, or other suitable processes.

The system can be configured to extract particular types of content from the first set of issue tickets, which may be used for subsequent steps in the process 600. For example, the system may be configured to extract issue content from a message thread associated with each issue ticket of the first set of issue tickets. In some cases, the message thread content may include input information generated by a first user of the issue tracking platform as part of a service request, and support information generated by a second user (e.g., support agent) of the issue tracking platform as part of an issue response.

In some cases, the system may utilize a generative service to extract particular types of issue content (e.g., message thread-data) from issue tickets of the first set of issue tickets. In other cases, the system can include applications or services that are configured to extract specific data fields from each issue (e.g., all content from a message thread) and generate a structured data object(s) that include an issue identifier and the corresponding extracted content. In this way the system may isolate specific types of data from issue tickets for further processing and the extracting processes may exclude other types of issue content. For example, after the extraction process, issue content that is not included in the message thread associated with each issue ticket may be removed.

At operation 604, the process 600 can include providing the extracted issue content to a generative output engine to obtain structured data including resolution steps for the obtained issue tickets. The system can be configured to generate a first prompt including the extracted issue content for the first set of issue tickets and prompt text that include instructions to identify resolutions steps and corresponding customer inputs for each issue ticket. The instructions to identify resolutions steps can include instructions for the generative output engine to analyze the message thread data (e.g., including text based message data between a requesting user, and an automated processing service and support engineer) to identify the process steps that were required to progress or resolve the issue ticket. For example, in issue tickets that were escalated to a support engineer, the prompt may be configured to cause the generative output engine to focus on content in the message thread input by the support engineer. In escalated tickets, the solution or resolution steps are typically provided as text-based inputs to the message thread by the support engineer. Accordingly, the prompt can be configured to cause the generative output engine to focus on specific aspects of the extracted data such as messages from one or more support engineers.

In some cases, the message thread may include references to other resources such as support documentation, or indicate actions that the support engineer performed with respect to an issue. For example, the message thread may indicate that a support engineer utilized a specific application or software platform, accessed specific resources, and so on. In some cases, the prompt can be configured to cause the generative output engine to identify these resources and/or obtain additional data from these resources indicating the operations or actions that were performed to progress or resolve the issue.

Additionally, the prompt can be configured to identify customer inputs that correspond to the resolutions steps. For example, the prompt may be configured to cause the generative output engine to focus on message inputs from a requesting user to identify a problem statement, a description(s) of the problem the user is experiencing, message inputs responding to inquiries from an automated processing service and/or a support engineer, and so on.

The system can provide the prompt to a generative output engine to obtain a first structured data set. The first structured data set can include for each issue ticket in the first set of issue tickets, one or more resolutions steps for a respective issue ticket and one or more customer inputs corresponding to the one or more resolution steps for the respective issue ticket. In some cases, the structured data set may uniquely identify each issue (e.g., using a data field that includes an issue identifier for each respective issue at the issue tracking platform) and associate the identified resolutions steps from the corresponding issue data with the respective issue identifier. Additionally, the system can associate the determined customer inputs with the respective issue identifier. Accordingly, the structured data set may include multiple issue identifies each associated with a respective one or more resolutions steps and one or more user inputs determined from a requesting user.

At operation 606, the process 600 can include performing clustering operation on the structured data. The clustering operation can be configured to obtain at least one cluster group identifying a first subset of issue tickets from the first set of issue tickets included in the first structured data set.

In some cases, the clustering operation 606 can be configured to utilize a clustering process to generate multiple clustering groups in parallel, each of which can be used to generate a respective automated assistant service. An example of a parallel clustering process is described with respect to FIG. 7A. In other cases, the clustering operation 606 can be configured to utilize an iterative clustering process, in which all issue tickets identified in the set of issue tickets can be used to determine the first group of issue tickets. Using this process, the remaining issue tickets that were not assigned to the first group of issue tickets, can be subsequently analyzed using second iteration of the clustering process to determine the second group of issue tickets, and so on. An example of an iterative clustering process is described with respect to FIG. 7B.

At operation 608, the process 600 can include providing one or more cluster groups to a generative output engine to obtain a problem definition and product specification document. The system can be configured to generate a second prompt including a subset of issue tickets assigned to a cluster group. The second prompt can also include instructions for the generative output engine to analyze the issue ticket data assigned to the cluster group and to define a problem definition and a product specification for the first subset of issue tickets.

In some cases, the subset of issue tickets included in the second prompt can include the issue content contained in the structured data set obtained in response to the first prompt. In other cases, the issue content may include additional issue data corresponding to one or more of the issue tickets identified in the subset of issue tickets corresponding to the cluster group.

The prompt can include instructions that define parameters for generative output engine when analyzing the issue data and generating the problem definition. For example, the prompt may include example output formats, word limits, specific considerations, and/or other parameters. The prompt can also include instructions that define parameters for the generative output engine to when analyzing the issue data and generating the product specification. The prompt may include instructions to generate a specifically formatted document defining parameters for an automated assistant service that can be used to resolve the problem for the first subset of issue tickets. For example, the prompt may include instructions to generate a product specification document that includes parameters defining required inputs to be obtained by the automated assistant service, required tool configurations for the automated assistant service and a set of operational steps to be implemented by the automated assistant service utilizing the required inputs and the required tool configurations. In some cases, the required inputs can define one or more data sources that the automated assistant service is configured to access and the required tool configurations that define a query language to be used by the automated assistant service to data from the one or more data sources. The operational steps can define a multi-step process and each step in the multi-step process can include an action performed by the automated assistant service in relation to the new issue. Additionally or alternatively, the parameters can define one or more syntax rules for performing one or more steps of the multi-step process.

The system can provide the second prompt to a generative output engine to obtain a second structured data set comprising the problem definition and the product specification document. The second structured data set can uniquely identify a particular cluster group and associate the problem definition and product specification with the particular cluster group. Additionally or alternatively, the second structured data set may identify or indicate the issue tickets that were used to generate the problem definition and product specification.

At operation 610, the process 600 can include creating an automated assistant service using a product definition and product specification corresponding to a cluster group. The automated assistant service can be configured to be utilized by an automated processing service when servicing an issue. In some cases, the automated assistant service can include a specialized prompt that is utilized by the automated processing service. The specialized prompt may include the product definition and/or product specification and include instructions for performing specialized actions on an issue based on the process outlined in the product specification.

The product specification document can define required inputs to be obtained by the automated assistant service, required tool configurations for the automated assistant service and a set of operational steps to be implemented by the automated assistant service utilizing the required inputs and the required tool configurations. Accordingly, when utilized by the automated processing service the product specification can provide specific actions or instructions that are to be performed by the assistant service when performing on an issue that correspond to the automated assistant service. In some cases, the required inputs can define one or more data sources for the automated processing service to access and the required tool configurations can define a query language to be used by the automated processing service to obtain data from the one or more data sources. Additionally, the product specification can define a multi-step process for the automated assistant service to follow in relation to the new issue.

At operation 612, the process 600 can include utilizing the automated assistant service to perform one or more automations on a new issue. In response to receiving a new issue ticket at the issue tracking platform, the issue tracking platform may be configured to analyze the new issue ticket data to determine whether the new issue ticket corresponds to a particular automated assistant service. In some cases, this can include performing a semantic analysis on the new issue ticket data (e.g., a title provided by a respecting user, a description of the issue provided by the requesting user, message thread data, and/or other content associated with the new ticket). In some cases, the semantic analysis can include vectoring and embedding issue content from the new issue ticket. The system can determine a similarity criterion of the new ticket to one or more of the automated assistant services, for example, based on a semantic similarity between the new ticket data and a problem definition corresponding to an automated assistant service. If the similarity criterion satisfies a defined metric, the system can be configured to utilize the corresponding automated assistant service for performing actions for the new issue.

Figure 7A:
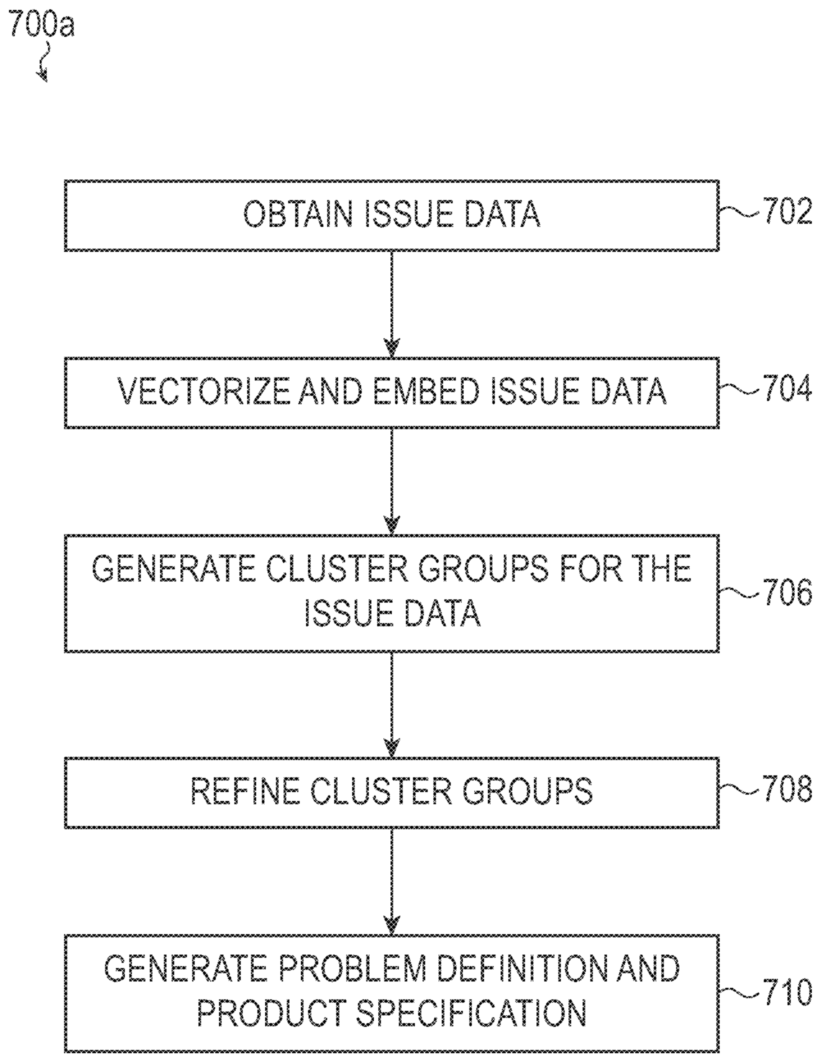
FIGS. 7A-7B depict example processes for identifying issue tickets that can be used to create an automated assistant service, as described herein.

FIG. 7A depicts an example of a first process 700*a* for identifying issue tickets that can be used to create an automated assistant service, as described herein. The process 700*a* can be performed by the system and platforms described herein.

At operation 702, the process 700 can include obtaining issue data, as described herein. For example, the issue data used in process 700*a* can include a structured data set the includes an identification or multiple issue tickets and one or more resolutions steps that are identified using issue content from a respective issue ticket, as described herein. For example, the issue data can be a structured data set as described with respect to operations 602 and 604 of process 600.

At operation 704, the process 700*a* can include vectorizing and embedding the issue data. For example, the system can be configured to generate an embedded vector representation corresponding to issue data for each issue ticket in the structured data set. For example, for each issue ticket identified in the structured data set, the system can use the respective issue content (e.g., resolution steps and corresponding customer input data contained in the generative output) and generate an embedded vector representation of the issue content. The embedding operation can generate a multi-dimensional vector representation of the issue content. An example embedding operation may add synonyms and predicted corresponding words to words or phrases of the respective issue content. Additionally, the issue content may be represented as a vector or other multi-dimensional data element allowing for comparison to a similarly vectorized or processed representation of the particular issue data.

At operation 706, the process 700*a* can include generating cluster groups using the issue data including the embedded vector representation corresponding to the respective issue tickets. The system can perform a first clustering operation to separate issue tickets of the first set of issue tickets into multiple cluster groups. The first clustering operation can be configured to separate the issue tickets in multiple different cluster groups, which can be performed on the embedded vector representation corresponding to each issue ticket. In some cases, the first clustering operation can include generating lower-dimensional vector representations for each issue ticket can performing a set of multiple first cluster groups, which can be refined using a second clustering operation.

At operation 708, the process 700*a* can include refining the cluster groups generated at operation 706. For example, the system may use a second clustering process to identify and separate outliers in the original cluster groups. For example, the second clustering process may include a density-based clustering algorithm that groups together issue tickets that are close together, marking outliers as noise. This clustering process may be performed on higher-dimensional embedded vectors for each of the issue tickets, which may help preserve additional semantic meaning for comparison. For each outlier (which may also be referred to as a "noise point"), the process can include determining the outliers cosine similarity to each of the different clusters centroid and may reassign the outlier to a cores cluster which has the highest similarity. In some cases, the noise point may only be reassigned in the similarity satisfies a defined threshold. This process may be performed as a second clustering operation or combined with the first clustering operation 706. The clustering operations may be referred to as a semantic noise reassignment process, which causing one or more issue tickets to be moved between cluster groups of the multiple cluster groups.

At operation 710, the process 700*a* can include generating a problem definition and product specification for each of the cluster groups, as described herein. In some cases, the system can be configured to generate multiple problem definitions and product specifications in parallel, each corresponding to a different cluster group.

For example, the system can generate, for each of the multiple cluster groups, a respective prompt comprising a subset of issue tickets assigned to a respective cluster group and instructions to define a problem definition for the subset of issue tickets and a product specification document defining parameters for an automated assistant service that can be used to resolve the problem for the subset of issue tickets in the respective cluster group. Additionally, the system can generate, using one or more outputs obtained in response to providing each respective prompt to the generative output engine, a respective automated assistant service, each respective automated assistant service configured to be utilized by the automated processing service when servicing an issue, as described herein.

Figure 7B:
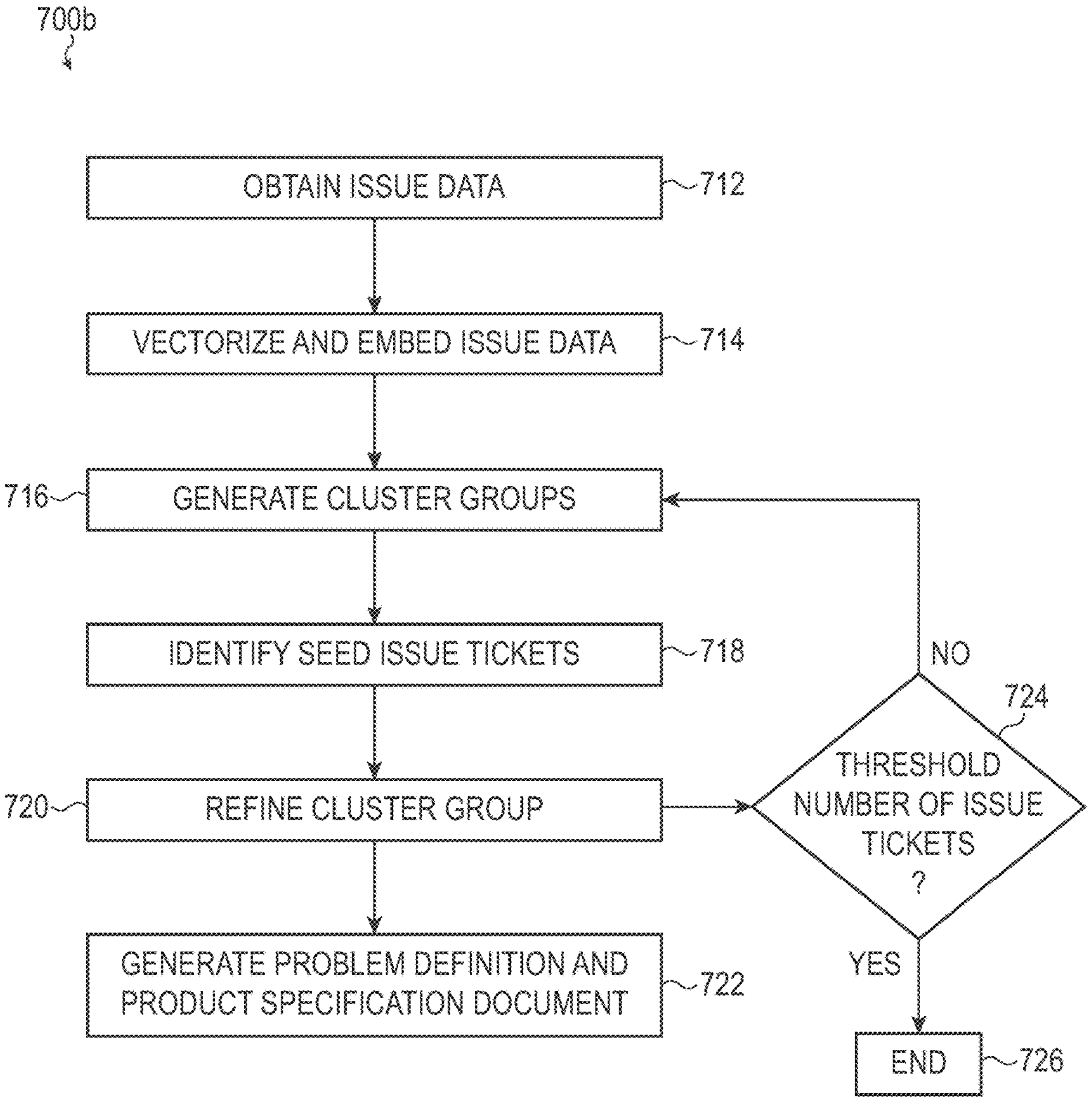

FIG. 7B depicts an example of a second process 700*b* for identifying issue tickets that can be used to create an automated assistant service, as described herein. The process 700*b* can be performed by the system and platforms described herein.

At operation 712, the process 700*b* can include obtaining issue data. as described herein. For example, the issue data used in process 700*b* can include a structured data set the includes an identification or multiple issue tickets and one or more resolutions steps that are identified using issue content from a respective issue ticket, as described herein. For example, the issue data can be a structured data set as described with respect to operations 602 and 604 of process 600.

At operation 714, the process 700*b* can include vectorizing and embedding the issue data. For example, the system can be configured to generate an embedded vector representation corresponding to issue data for each issue ticket in the structured data set. For example, for each issue ticket identified in the structured data set, the system can use the respective issue content (e.g., resolution steps and corresponding customer input data contained in the generative output) and generate an embedded vector representation of the issue content. The embedding operation can generate a multi-dimensional vector representation of the issue content. An example embedding operation may add synonyms and predicted corresponding words to words or phrases of the respective issue content. Additionally, the issue content may be represented as a vector or other multi-dimensional data element allowing for comparison to a similarly vectorized or processed representation of the particular issue data.

At operation 716, the process 700*b* can include generating cluster groups using the issue data. The system can perform a first clustering process to separate issue tickets of the first set of issue tickets into multiple cluster groups including the cluster group. In some cases, the first clustering operation can be performed using the embedded vector representations of the issue ticket data. In some cases, the first clustering operation may include using clustering processes such as Gaussian mixture models clustering, k-means clustering or other suitable clustering processes. In some cases, the first clustering operation may be selected or configured to group documents that are thematically related. The first clustering operation can be performed to identify at least one cluster of issue tickets from the set of issue tickets. In some cases, the first clustering operation can obtain multiple cluster groups.

The system can be configured to select a single cluster group from the one or more cluster groups identified using the first clustering process. In some cases, the system may select a cluster group having the greatest number of issue tickets assigned to the same cluster, a cluster group having the greatest density, a cluster group satisfying a defined number of issues tickets, and/or other parameters, or combinations thereof.

At operation 718, the process 700*b* can include identifying seed issue tickets from a cluster group. The seed issue tickets may also be referred to as key issue tickets and may include a subset of issue tickets that are assigned to a specific cluster group, for example, the single cluster group identified at operation 716. In some cases, the system can be configured to utilize a generative service to identify the seed issue tickets from the cluster group. For example, the system can be configured to generate a prompt comprising issue data for the issue tickets assigned to the cluster group. In some cases, the issue data can include the issue data generated as part of a structured data set (e.g., the first structured data set generated at operation 604). The prompt can include instructions configured to cause the generative output engine to analyze all the issue data for the cluster groups and select the seed issue tickets. In some cases, the prompt can include instructions to select or identify a defined number of issue tickets from the set of issue tickets identified in the cluster. The system can provide the prompt to the generative output engine to obtain an output identifying the seed issue tickets.

At operation 720, the process 700*b* can include refining the cluster group using the seed issue tickets identified at operation 718. In some cases, the system can perform, using seed of issue tickets, a query at the issue tracking platform to identify a second set of issue tickets that satisfy a similarity metric with respect to the seed issue tickets. For example, the system may used embedded vector representations of the seed issue tickets and/or embedded data for issues managing by the issue tracking system to identify issue tickets that were not identified in the initial issue data (e.g., at operation 712). The system can assign the second set of issue tickets to the cluster group to generate a refined cluster group.

At operation 722, the process 700*b* can include generating a problem definition and product specification using the refined cluster group, as described herein. For example, the system can generate a prompt comprising the issue tickets assigned to the refined cluster group and instructions to define a problem definition and a product specification document defining parameters for an automated assistant service that can be used to resolve the problem for the issue tickets. Additionally, the system can generate, using one or more outputs obtained in response to providing the prompt to the generative output engine, a respective automated assistant service configured to be utilized by the automated processing service when servicing an issue, as described herein.

At operation 724, the process 700*b* can include determining whether a threshold number of documents remain. The system can be configured to remove the issue ticket data for issue assigned to the first refined cluster group from the issue tickets to generated a second set of issue tickets. The second set of issue tickets can include the remaining issue tickets after generating the refined cluster group. In some cases, the system may determine whether a threshold number of issue tickets remains and perform operations 716 through 722 on the remaining issue tickets. The system may continue to identify seed issue tickets, refine the cluster group and generate a corresponding problem definition and product specification. Each iteration can remove the utilized issue tickets from the remaining group and the operations can be iteratively performed until the remaining documents no longer satisfy a defined threshold, at which point the process 700*b* may end at operation 728.

Figure 8A:
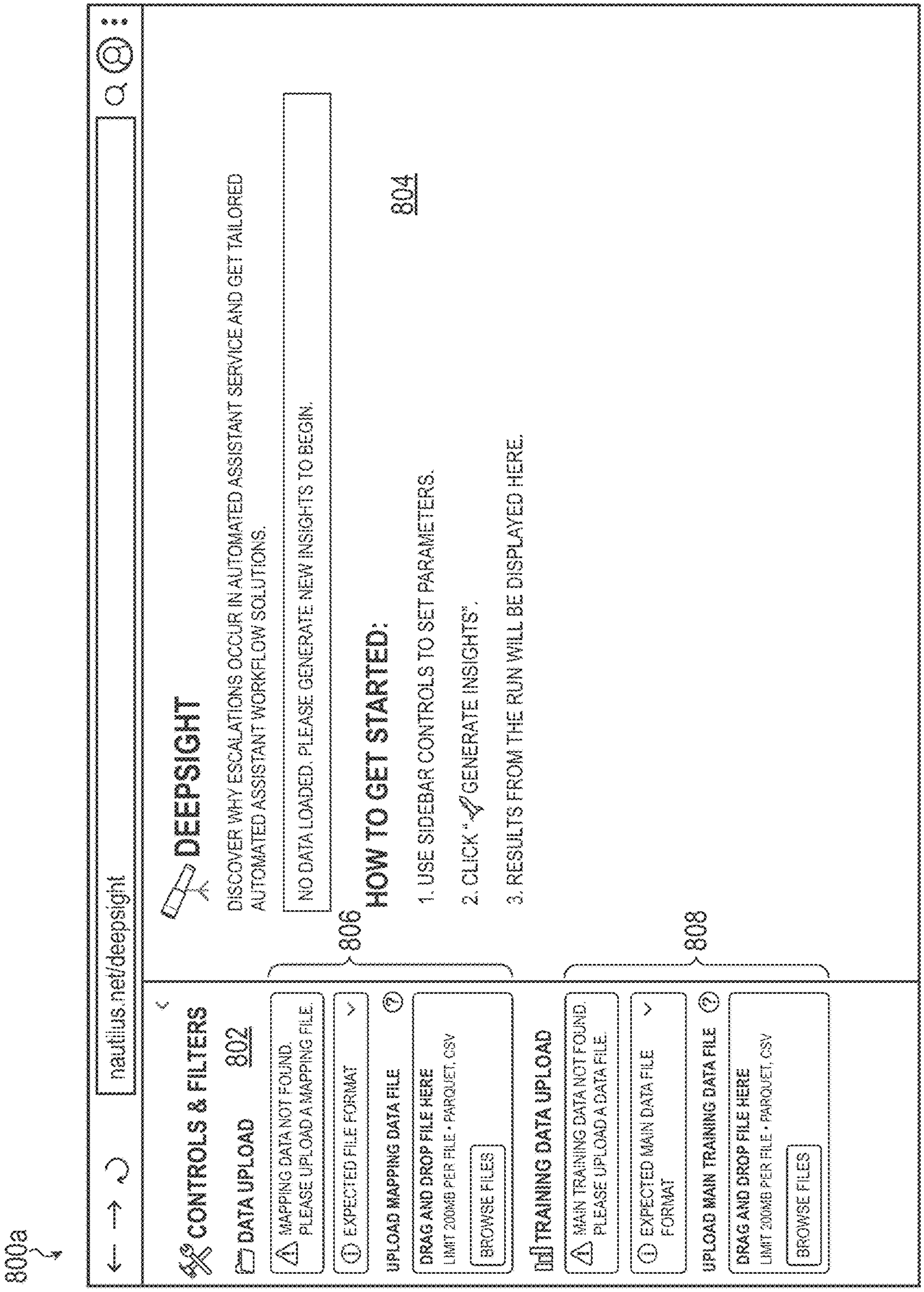
FIGS. 8A-8B depict an example graphical user interface that can be used to create an automated assistant service, as described herein.
Figure 8B:
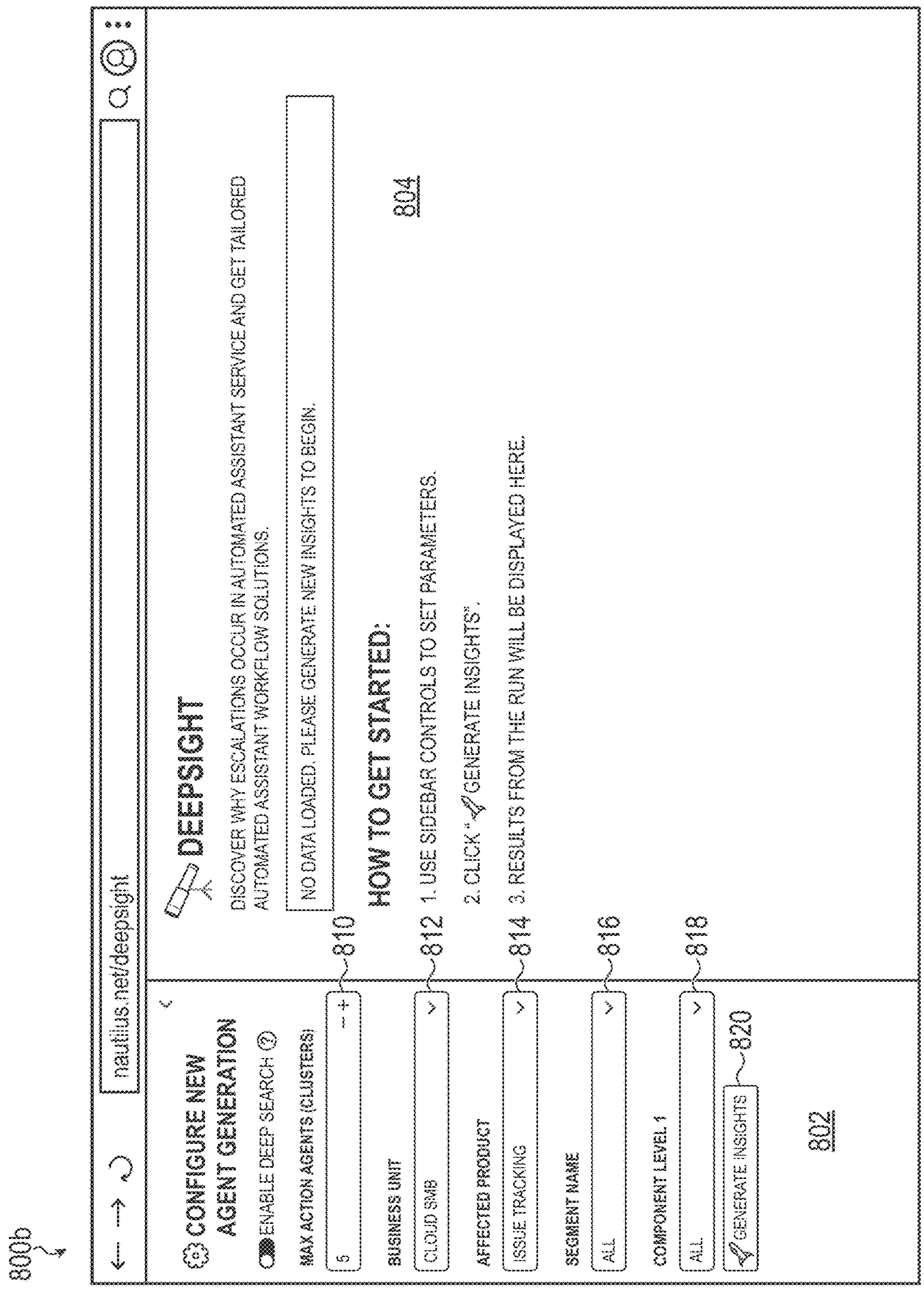

FIGS. 8A-8B depict an example graphical user interface 800 that can be used to create an automated assistant service, as described herein. FIG. 8A shows a first instance of the graphical user interface 800*a* and FIG. 8B shows a second instance of the graphical user interface 800*b*. The graphical user interface 800 can be used to input one or more parameters, which will be used to create one or more automated assistant services as described herein.

As shown in FIG. 8A, the graphical user interface 800*a* may have various partitions/sections displaying different content. For example, the graphical user interface 800*a* may include an input panel 802, and a content panel 804. Objects shown in the input panel 802 may allow a user to specify and/or upload the data that will be used to generate the one or more automated assistant services, using the processes described herein. The content panel 804 can display content related to the automated assistant service generation processes. The content display in the content panel 804 may be updated as different objects displayed in the input panel are selected or otherwise receive input from a user of the system. For example, the content panel 804 may display an overview of the automated assistant service generation process and instructions for a user to get started creating one or more automated assistant services. As inputs to the content panel 804 are received (e.g., system detects a user interaction with the data upload options 806), the system may update the content displayed in the content panel 804 to display information related to the data upload options.

The content panel 802 can include a first set of objects, which provided data upload options 806 for the system to use when generating one or more automated assistant services. The data upload options 806 can allow a user to select and upload a mapping data file and select an expected file format for the mapping data filed. The content panel 802 can include a second set of objects, which provide training data upload options 808 for the system to use when generating one or more automated assistant services. The training data upload options can allow a user to select and upload a training data file and select an expected filed format for the training data file. The mapping file can identify the mappings between the product, business unit, segment and component level parameters and the training data can include the issue ticket data obtained for issues managed by the issue tracking platform. In some cases, the system can be configured to obtain data directly from the issue tracking platform (e.g., using one or more API calls, or be integrated with the issue tracking platform), in which cases, the system may include interface elements that specify parameters from retrieving data, but don't require upload or identification of specific data files.

As shown in FIG. 8B, the graphical user interface 800*b* can be updated (e.g., via a scroll operation) to show additional options in the content panel 802. The graphical user interface 800*b* can include a first input object 810 for specifying the maximum amount of clusters that will be determined from the issue data. For example, the maximum amount of clusters may by used be the system to specify how many different cluster groups should be determined during the clustering process (e.g., clustering process 700*a* or clustering process 700*b*).

The input panel 802 of the updated graphical user interface 800*b* can include additional objects which can be used to specify other parameters related to how the system will generate the automated assistant services, as described herein. For example, the input panel 802 can include a second input object 812 for specifying a business unit for selecting issue tickets that will be used in the automated assistant service generation process. Selection of a particular business unit via the second input object 812 can cause the system to only retrieve issue tickets related to the selected business unit (e.g., at operation 602 of processes 600). The input panel 802 can include a third input object 814 for specifying an affected product for selecting issue tickets that will be used in the automated assistant service generation process. Selection of a particular product via the third input object 814 can cause the system to only retrieve issue tickets related to the selected product (e.g., at operation 602 of process 600).

Additionally or alternatively, the input panel 802 can include a fourth input object 816 for selecting a segment related to one or more types of products and/or a fifth input object 818 for selecting specific component levels of products that will be used in the automated assistant service generation process. Selection of option via the fourth input object and the fifth input object can cause the system to only retrieve issue tickets related to the selected options (e.g., at operation 602 of process 600).

The input panel 802 can include a selectable generation object 820, which can be used to initiate the process for generating a product definition and product specification for one or more automated assistant services. Additionally or alternatively, selection of the generation object 820 may cause the system to create the one or more automated assistant services, as described herein.

Figure 9A:
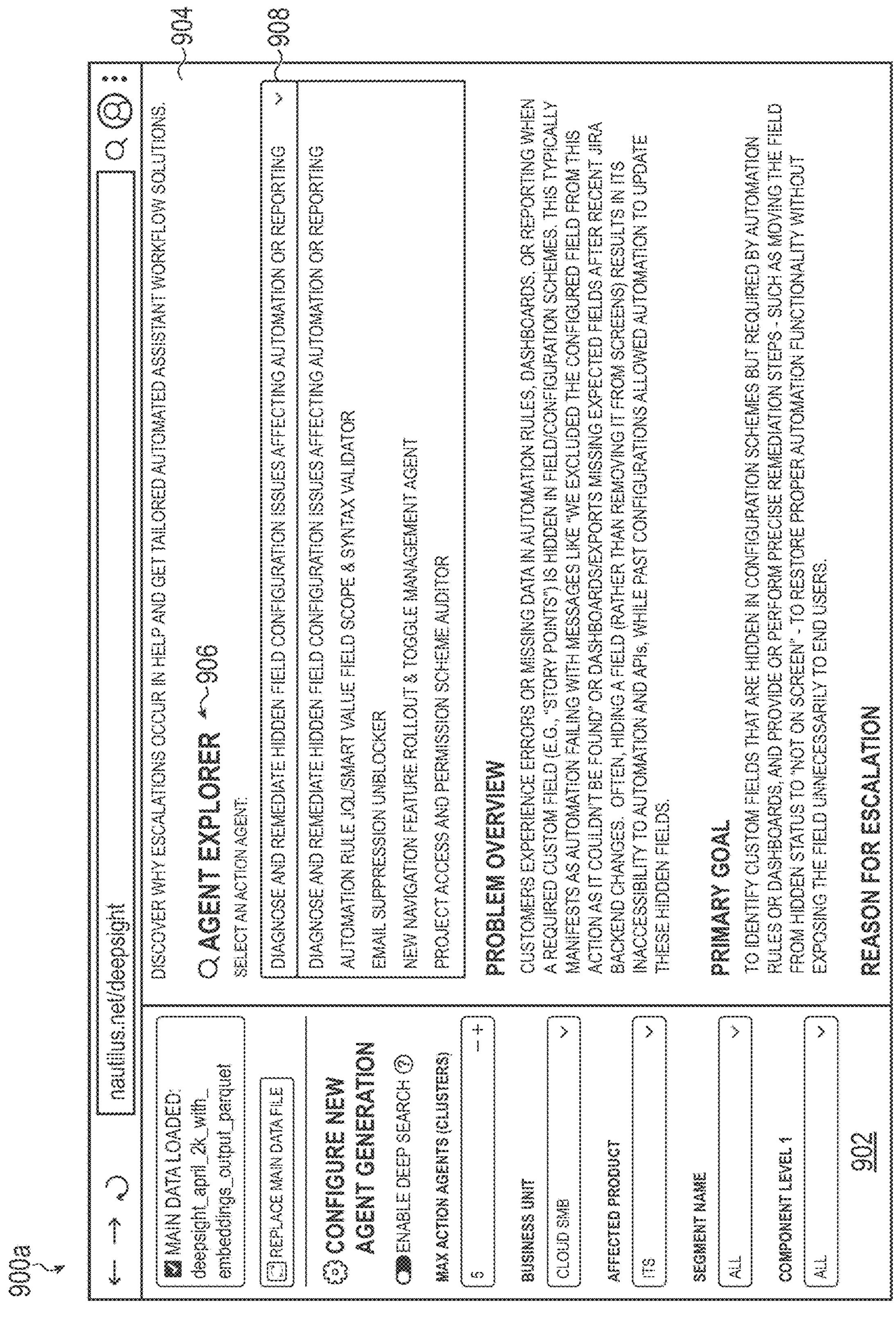
FIGS. 9A-9C depict an example graphical interface displaying a product specification and problem definition for an automated assistant service, as described herein.
Figure 9B:
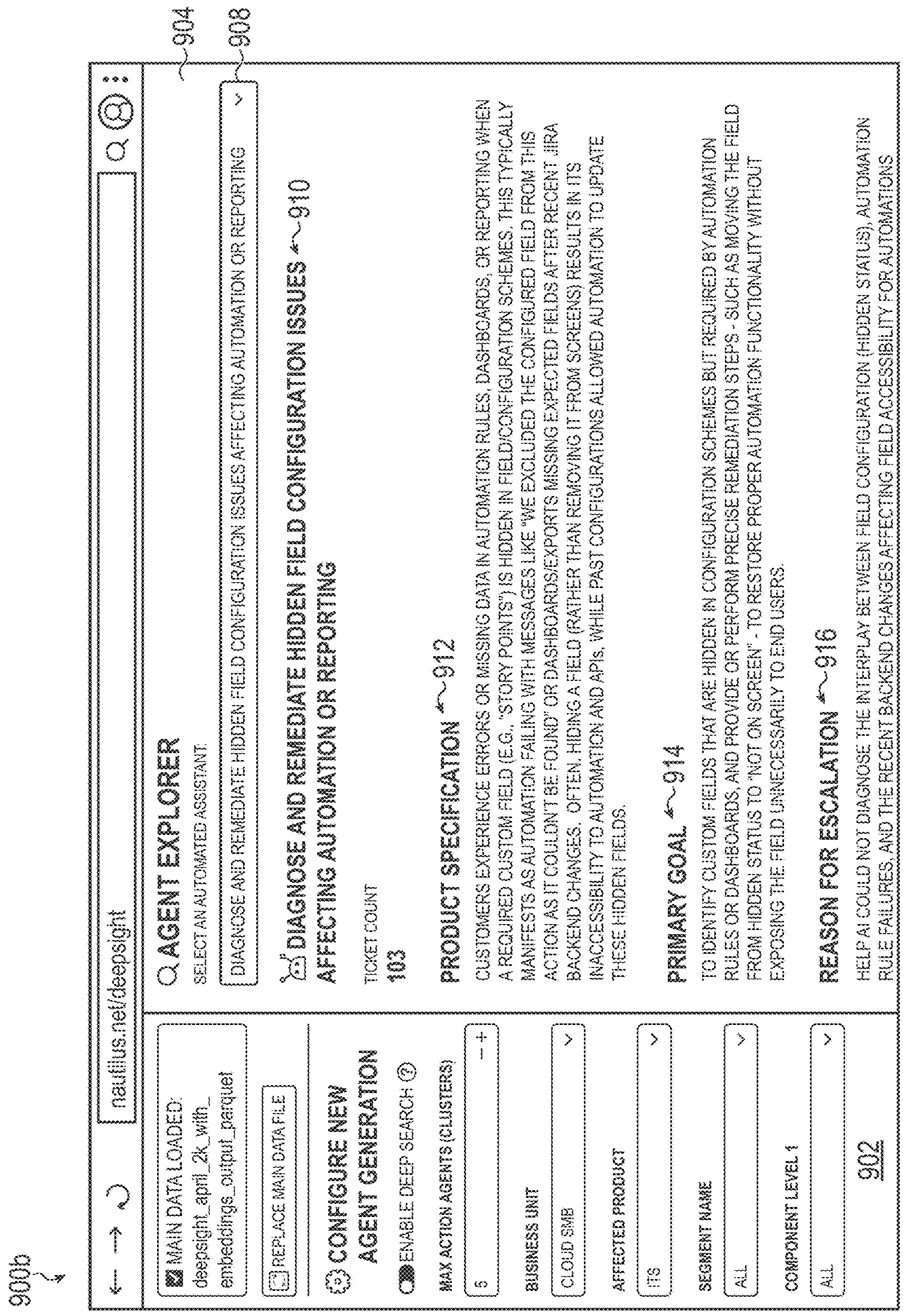
Figure 9C:
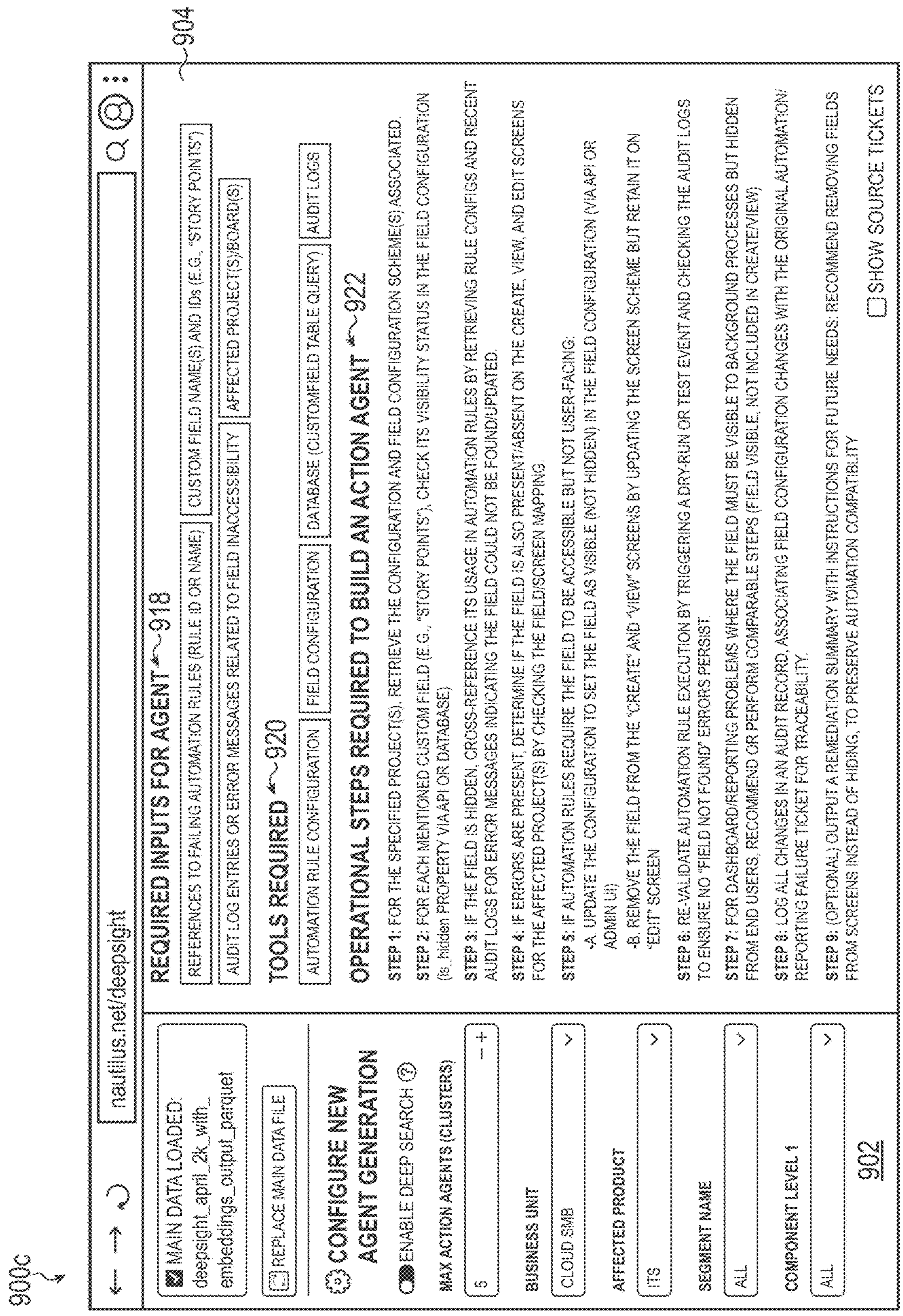

FIGS. 9A-9C depict an example graphical interface 900 displaying a product specification document and problem definition for an automated assistant service, as described herein. FIG. 9A shows a first instance of the graphical user interface 900*a* displaying first content, FIG. 9B shows a second instance of the graphical user interface 900*b* displaying updated/different content, and FIG. 9B shows a third instance of the graphical user interface 900*c* displaying updated/different content. The graphical user interface 900 can display an example of an output the system generating one or more product definitions and/or product specifications using the processes described herein.

The graphical user interface 900 may have various partitions/sections displaying different content. For example, the graphical user interface 900 may include an input panel 902, and a content panel 904. The input panel 902 can display parameters/options that were used to create the automated assistant services, as described herein. The content panel can include content that was generated as part of the processes described herein include a product definition and/or product specification for one or more cluster groups determined during the automated assistant service generation process.

FIG. 9A shows a first instance of the graphical user interface 900*a*, which includes a first display area 906 for displaying content related to the different action agents (e.g., cluster groups) that were determined during the automated assistant service generation process as described herein. In some cases, the issue tracking platform or other system can generate the graphical user interface 900 to display content from the problem definition, product specification, and/or other content related to one or more automated assistant services that was generated using the systems and processes described herein.

The first display area 906 can include a drop-down menu 908 (or other suitable interface object) that displays a title for each different automated assistant service (e.g., cluster group) that was identified during the automated assistant service generation process, as described herein (e.g., process 600). Selection of a particular automated assistant service title/cluster group title can cause the graphical user interface 900*a* to display generated content specific to the selected automated assistant service/cluster group.

FIG. 9B shows a second instance of the graphical user interface 900*b*, after selection of a particular automated assistant service title/cluster group title from the drop-down menu 908. The graphical user interface 900*b* can be updated to display information related to the selected automated assistant service including a product definition and product specification that was generated from the automated assistant service, as described herein. The content panel 904 can include the product specification 912, which was generated as part of the processes described herein (e.g., data analysis scheme 500, process 600, process 700*a* and/or process 700*b*). In some cases, the product specification can also include a primary goal 914 and/or reason for escalation 916, which may provide additional content characterizing the particular automated assistant service. In some cases, this additional content can be used to identify new tickets to determine whether the corresponding automated assistant service can be used to resolve an problems associated with an new issue ticket. For example, the primary goal 914 and/or reason for escalation may be used in a semantic analysis process to determine whether the new issue satisfies a similarity criteria with respect to the particular automated assistant service, as described herein.

FIG. 9B shows a third instance of the graphical user interface 900*c*, which include product specification information related to the particular automated assistant service/cluster group selected from the drop-down menu 908. The content panel 904 can include a required inputs data 918, required tools data 920, and operational steps 922, which may form the product specification, as described herein.

In some cases, the content panel 904 can be a displayed as a continuous panel and difference instances of the graphical user interface 900*a*, 900*b*, 900*c* can be display effects of scrolling or otherwise navigating with the content panel 904.

Figure 10A:
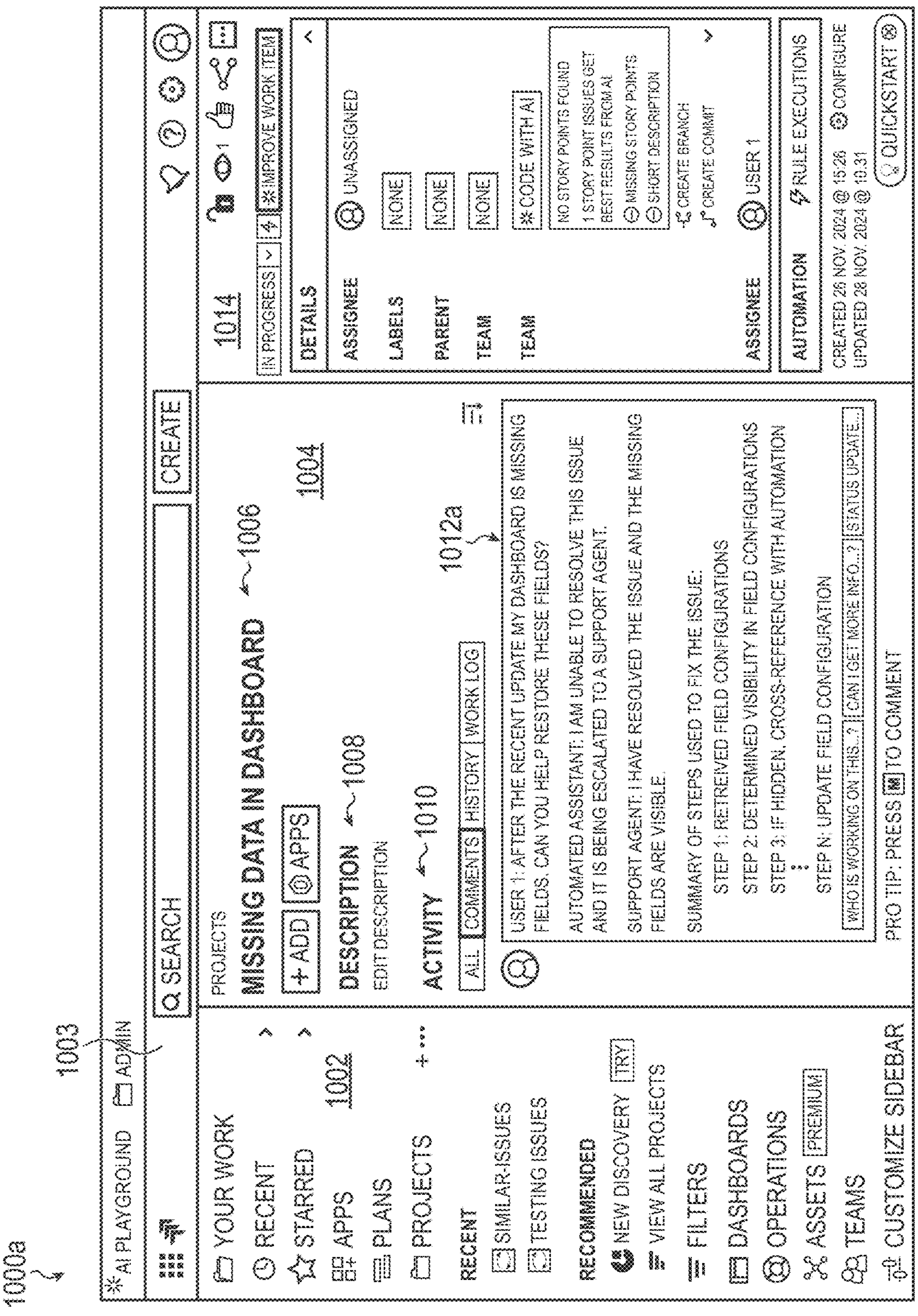
FIGS. 10A-10B depict an example graphical user interface for an issue ticket which can utilize an automated assistant service to perform one or more actions on the issue object, as described herein.
Figure 10B:
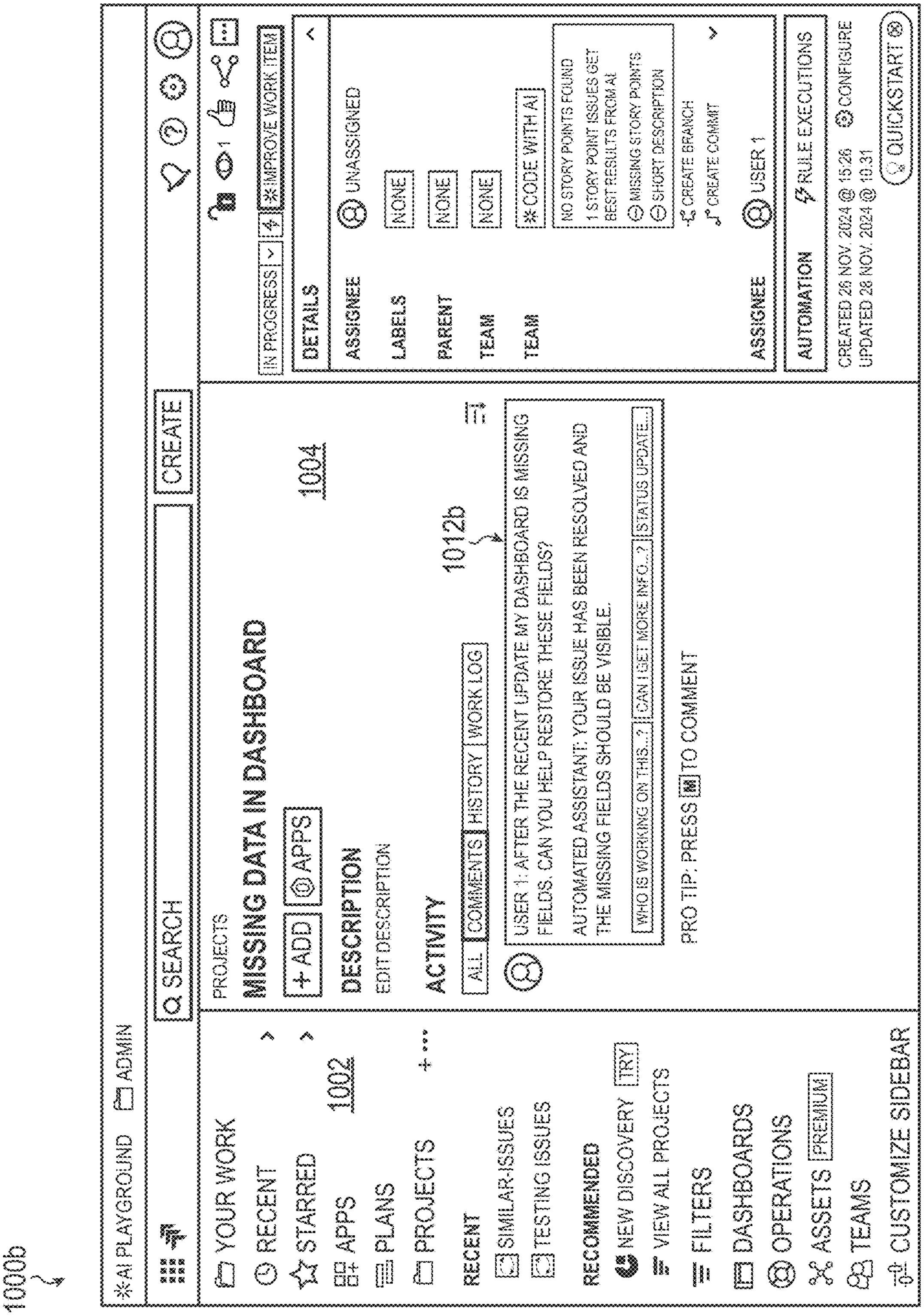

FIGS. 10A-10B depict instances of an example graphical user interface 1000 for an issue ticket generated by a frontend of an issue tracking platform, as described herein. In some cases, the graphical user interface 1000*a* and 1000*b* can have various partitions/sections displaying different content. For example, the graphical user interface 1000 may include a navigational panel 1002, a toolbar 1003, and an issue content panel 1004.

The navigational panel 1002 may include a hierarchical element tree (also referred to herein as a listing of queues, issue groups or issues), which may be associated with particular issue tickets, one or more issue queues, and/or one or mor particular projects, which may be used to manage a set of issues tickets. The hierarchical element tree includes tree elements, which may be selectable to cause display of a corresponding issue tickets or queue. Tree elements may also be referred to herein as selectable elements. Each tree element for the hierarchical element tree may be selectable. In response to a user selection of a respective element of the hierarchical element tree, content of the respective issue tickets may be displayed in the issue content panel 1004. In some cases, display of the navigational panel 1002 may be suppressed or hidden using a control provided in the graphical user interface 1000. Additionally or alternatively, the navigational panel 1002 may be resized or slid all the way to the side of the graphical user interface in order to hide or suppress display of the navigational panel 1002.

The toolbar 1003 may provide, to a user, various control options, including but not limited to, set, or configure various restrictions for the issue, queue, and/or project, to view or review issues. The toolbar 1003 may also include a search or query space for the user to enter one or more keywords to perform search for issues, queues, projects, or content that may be managed by the issue tracking platform. The toolbar 1003 may also include options for selecting a different project, view recently viewed issues or queues, view people associated with the system or respective content, navigate or launch other applications, or view other aspects of the system.

The issue content panel 1004 can display issue content related to a particular issue (e.g., selected using the navigation panel 1002). The issue content panel 1004 can include a title field 1006 and/or summary field of an issue, which may be input by a requesting user as part of creating the particular issue. The issue content panel 1004 can include a description field 1008 an activity transaction log 1010, which may display issue data display a message thread 1012, which may be an example of the message threads displayed herein. Additionally, the transaction log 1010 may include and/or display an issue summary, a workflow log, automations performed on a particular issue, actions performed at external systems that are related to the particular issue and so on.

The issue content panel 1004 can also include an issue a second issue content panel 1014, which can include additional issue fields such as one or more assignees, labels associated with the issue, defined links/relationships (e.g., identification of a parent issue), one or more assigned teams, automation information, and/or additional fields for other content related to the issue.

FIG. 10A shows a first example of the graphical user interface 1000*a*, and provides an example of the respective issue being escalated from an automated processing service and resolved by a support agent, as described herein. The message thread 1012*a* includes an example messages that are exchanged between a requesting user (e.g., "User 1"), an automated processing service that is not configured with an automated assistant service that can be used to resolve the issue, and a support engineer that takes one or more actions to progress and/or resolve the issue ticket. The graphical user interface 1000*a* for an issue ticked and corresponding message thread 1012*a*, provides an example of a message thread that may be analyzed as part of an automated assistant service generation process, as described herein and used, along with other identified issue tickets, to generate a problem definition, product specification and/or a corresponding automated assistant service.

FIG. 10B shows a second example of the graphical user interface 1000*b*, and provides an example of the respective issue being resolved using an automated assistant service generated using the processes, as described herein. For example, the content included in the message thread 1012*b* can be analyzed to determine whether an automated assistant service can be used to solve the problem raised by the corresponding issue ticket. In response to determining that an automated assistant service can be used for the issue ticket (e.g., using semantic analysis as described herein), the corresponding automated assistant service can automatically perform the actions detailed by the product specification to progress or resolve the issue ticket.

Figure 11:
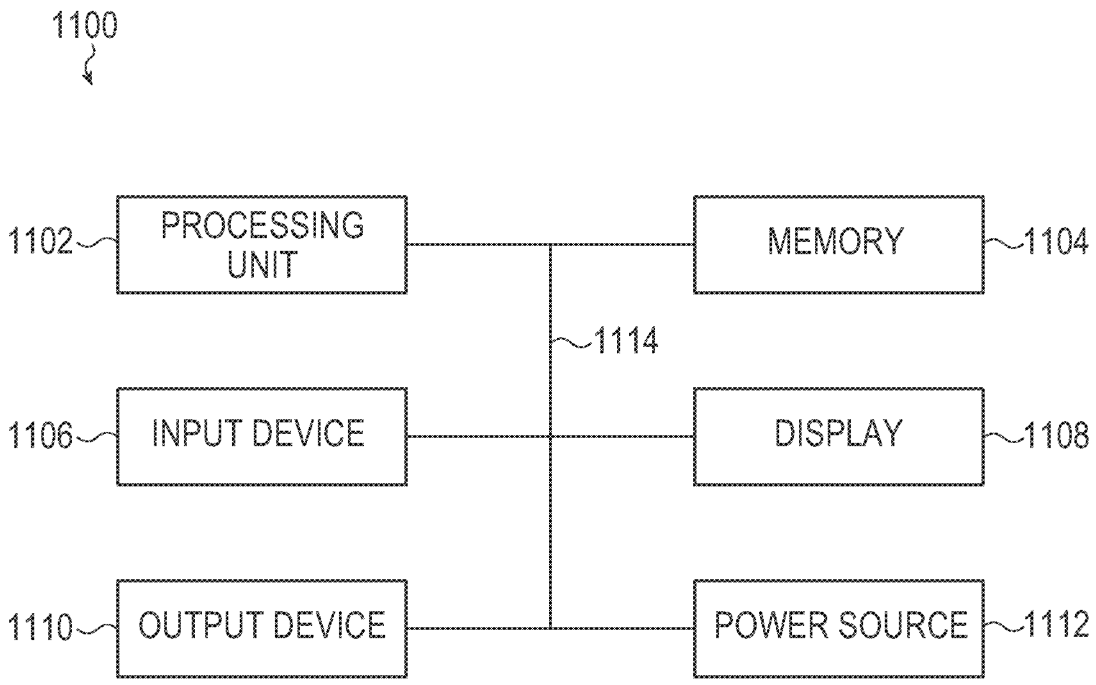
FIG. 11 shows a sample electrical block diagram of an electronic device.

FIG. 11 shows a sample electrical block diagram of an electronic device 1100 that may perform the operations described herein. The electronic device 1100 may in some cases take the form of any of the electronic devices described with reference to FIGS. 1-10 including client devices, and/or servers or other computing devices associated with the content generation system. The electronic device 1100 can include one or more of a processing unit 1102, a memory or storage device 1104, input devices 1106, a display 1108, output devices 1110, and a power source 1112. In some cases, various implementations of the electronic device 1100 may lack some or all of these components and/or include additional or alternative components.

The processing unit 1102 can control some or all of the operations of the electronic device 1100. The processing unit 1102 can communicate, either directly or indirectly, with some or all of the components of the electronic device 1100. For example, a system bus or other communication mechanism 1114 can provide communication between the processing unit 1102, the power source 1112, the memory 1104, the input devices 1106, and the output devices 1110.

The processing unit 1102 can be implemented as any electronic device capable of processing, receiving, or transmitting data or instructions. For example, the processing unit 1102 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 1100 can be controlled by multiple processing units. For example, select components of the electronic device 1100 (e.g., an input device 1106) may be controlled by a first processing unit and other components of the electronic device 1100 (e.g., the display 1108) may be controlled by a second processing unit, where the first and second processing units may or may not be in communication with each other.

The power source 1112 can be implemented with any device capable of providing energy to the electronic device 1100. For example, the power source 1112 may be one or more batteries or rechargeable batteries. Additionally, or alternatively, the power source 1112 can be a power connector or power cord that connects the electronic device 1100 to another power source, such as a wall outlet.

The memory 1104 can store electronic data that can be used by the electronic device 1100. For example, the memory 1104 can store electronic data or content such as, for example, audio and video files, documents and applications, device settings and user preferences, timing signals, control signals, and data structures or databases. The memory 1104 can be configured as any type of memory. By way of example only, the memory 1104 can be implemented as random access memory, read-only memory, flash memory, removable memory, other types of storage elements, or combinations of such devices.

In various embodiments, the display 1108 provides a graphical output, for example, associated with an operating system, user interface, and/or applications of the electronic device 1100 (e.g., a chat user interface, an issue-tracking user interface, an issue-discovery user interface, etc.). In one embodiment, the display 1108 includes one or more sensors and is configured as a touch-sensitive (e.g., single-touch, multi-touch) and/or force-sensitive display to receive inputs from a user. For example, the display 1108 may be integrated with a touch sensor (e.g., a capacitive touch sensor) and/or a force sensor to provide a touch- and/or force-sensitive display. The display 1108 is operably coupled to the processing unit 1102 of the electronic device 1100.

The display 1108 can be implemented with any suitable technology, including, but not limited to, liquid crystal display (LCD) technology, light emitting diode (LED) technology, organic light-emitting display (OLED) technology, organic electroluminescence (OEL) technology, or another type of display technology. In some cases, the display 1108 is positioned beneath and viewable through a cover that forms at least a portion of an enclosure of the electronic device 1100.

In various embodiments, the input devices 1106 may include any suitable components for detecting inputs. Examples of input devices 1106 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 1106 may be configured to detect one or more particular types of input and provide a signal (e.g., an input signal) corresponding to the detected input. The signal may be provided, for example, to the processing unit 1102.

As discussed above, in some cases, the input devices 1106 include a touch sensor (e.g., a capacitive touch sensor) integrated with the display 1108 to provide a touch-sensitive display. Similarly, in some cases, the input devices 1106 include a force sensor (e.g., a capacitive force sensor) integrated with the display 1108 to provide a force-sensitive display.

The output devices 1110 may include any suitable components for providing outputs. Examples of output devices 1110 include light emitters, audio output devices (e.g., speakers), visual output devices (e.g., lights or displays), tactile output devices (e.g., haptic output devices), communication devices (e.g., wired, or wireless communication devices), and so on, or some combination thereof. Each output device 1110 may be configured to receive one or more signals (e.g., an output signal provided by the processing unit 1102) and provide an output corresponding to the signal.

In some cases, input devices 1106 and output devices 1110 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 1102 may be operably coupled to the input devices 1106 and the output devices 1110. The processing unit 1102 may be adapted to exchange signals with the input devices 1106 and the output devices 1110. For example, the processing unit 1102 may receive an input signal from an input device 1106 that corresponds to an input detected by the input device 1106. The processing unit 1102 may interpret the received input signal to determine whether to provide and/or change one or more outputs in response to the input signal. The processing unit 1102 may then send an output signal to one or more of the output devices 1110, to provide and/or change outputs as appropriate.

These foregoing embodiments depicted in FIGS. 1-11 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

As used herein, the term "computing resource" (along with other similar terms and phrases, including, but not limited to, "computing device" and "computing network") refers to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

The foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

It may be further appreciated that a request-response RESTful system implemented in whole or in part over cloud infrastructure is merely one example architecture of a system as described herein. More broadly, a system as described herein can include a frontend and a backend configured to communicably couple and to cooperate in order to execute one or more operations or functions as described herein. In particular, a frontend may be an instance of software executing by cooperation of a processor and memory of a client device. Similarly, a backend may be an instance of software and/or a collection of instantiated software services (e.g., microservices) each executing by cooperation of a processor resource and memory resources allocated to each respective software service or software instance. Backend software instances can be configured to expose one or more endpoints that frontend software instances can be configured to leverage to exchange structured data with the backend instances. The backend instances can be instantiated over first-party or third-party infrastructure which can include one or more physical processors and physical memory devices. The physical resources can cooperate to abstract one or more virtual processing and/or memory resources that in turn can be used to instantiate the backend instances.

The backend and the frontend software instances can communicate over any suitable communication protocol or set of protocols to exchange structured data. The frontend can, in some cases, include a graphical user interface rendered on a display of a client device, such as a laptop computer, desktop computer, or personal phone. In some cases, the frontend may be a browser application and the graphical user interface may be rendered by a browser engine thereof in response to receiving HTML served from the backend instance or a microservice thereof.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

As described herein, the term "memory" refers to any software and/or hardware-implemented data storage device or circuit physically and/or structurally configured to store data in a non-transitory or otherwise nonvolatile, durable manner. This term is meant to encompass memory devices, memory device arrays (e.g., redundant arrays and/or distributed storage systems), electronic memory, magnetic memory, optical memory, and so on.

In other examples, the data can conform to a particular data transfer protocol-whether proprietary or standardized-such as, but not limited to: universal serial bus (typically referred to as "USB"); peripheral component interconnect express standard (typically referred to as "PCIe"); controller area network (typically referred to as "CAN"); on-board diagnostics (typically referred to as "OBD" or "OBD-II"); serial peripheral interface bus (typically referred to as "SPI Bus"); high-definition multimedia interface (typically referred to as "HDMI"); ethernet; integrated drive electronics (typically referred to as "IDE"); serial or parallel advanced technology attachment (typically referred to as "SATA" or "PATA"); inter-integrated circuit bus (typically referred to as "I2C"); and so on. In other cases, more than one protocol, encoding, and/or encryption technique or technology can be used in parallel.

As used herein, the term "generative model" (and similar terms and phrases, including, but not limited to, "large language model," "foundation model," and "diffusion model") may be used to refer to any machine-learning model, whether locally hosted or remotely hosted (or a combination thereof), whether implemented as a single model or as a set of cooperating sub-models, that is trained, fine-tuned, or otherwise configured to produce new data in response to an input prompt. The produced data can include, without limitation, natural-language text, executable code, images, audio, video, structured data, semi-structured data, or any combination thereof. References herein to a generative model encompass models trained using supervised, unsupervised, reinforcement, or self-supervised techniques; models generated in respect of larger parent models; and models executed on any suitable computing resource as defined above.

What is claimed is:

1. A computer-implemented method, comprising:

obtaining, at a first server system, a first set of issue tickets corresponding to issues managed by an issue tracking platform, each issue ticket of the first set of issue tickets associated with an escalation event indicating transition of a respective issue ticket from an automated support system to a user-based support system;

extracting issue content from the first set of issue tickets, the issue content extracted from a message thread associated with each issue ticket of the first set of issue tickets and comprising:

input information generated by a respective first user of the issue tracking platform as part of a service request; and support information generated by a respective second user of the issue tracking platform as part of an issue response;

generating a first prompt comprising the extracted issue content for the first set of issue tickets and prompt text comprising instructions for identifying resolution steps and corresponding customer inputs for each issue ticket;

providing the first prompt to a generative output engine and obtaining a first structured data set, the first structured data set comprising, for each issue ticket of the first set of issue tickets, one or more resolution steps for a respective issue ticket and one or more customer inputs corresponding to the one or more resolution steps for the respective issue ticket;

performing a clustering operation on the first structured data set to obtain a cluster group comprising a first subset of issue tickets from the first set of issue tickets included in the first structured data set;

generating a second prompt comprising the first subset of issue tickets assigned to the cluster group and instructions for defining a problem definition for the first subset of issue tickets and a product specification document defining parameters for an automated assistant service that can be used to resolve a problem for the first subset of issue tickets;

providing the second prompt to the generative output engine and obtaining a second structured data set comprising the problem definition and the product specification document;

generating the automated assistant service using the second structured data set, the automated assistant service configured to be utilized by an automated processing service when processing an issue submitted to the issue tracking platform; and in response to receiving a new issue ticket determined to correspond to the problem definition, causing the automated processing service to utilize the automated assistant service to perform one or more operations for the new issue ticket.

2. The computer-implemented method of claim 1, wherein performing the clustering operation comprises:

performing a first clustering operation to separate issue tickets of the first set of issue tickets into multiple cluster groups including the cluster group;

identifying a first portion of the first subset of issue tickets as key issue tickets; and performing, using the first portion of the first subset of issue tickets, a query at the issue tracking platform to identify a second set of issue tickets that satisfy a similarity criteria with respect to the first portion of the first subset of issue tickets.

3. The computer-implemented method of claim 2, further comprising assigning the second set of issue tickets to the cluster group, wherein the second set of issue tickets is included in the first subset of issue tickets used to generate the second prompt.

4. The computer-implemented method of claim 2, further comprising:

performing a second clustering operation on issue tickets from the first set of issue tickets that are not included in the cluster group to obtain a second cluster group comprising a second subset of issue tickets from the first set of issue tickets;

generating a third prompt comprising the second subset of issue tickets assigned to the second cluster group and instructions for defining a second problem definition for the second subset of issue tickets and a second product specification document defining second parameters for a second automated assistant service configured to be used to resolve an issue identified from the second subset of issue tickets;

providing the third prompt to the generative output engine to obtain a third structured data set comprising the second problem definition and the second product specification document;

generating the second automated assistant service using the third structured data set, the second automated assistant service configured to be utilized by the automated processing service when servicing a second new issue ticket; and in response to receiving the second new issue ticket determined to correspond to the second problem definition, causing the automated processing service to utilize the second automated assistant service to perform one or more operations for the second new issue ticket.

5. The computer-implemented method of claim 2, wherein identifying the first portion of the first subset of issue tickets as the key issue tickets comprises generating a fourth prompt comprising issue data for issues corresponding to the key issue tickets and providing the fourth prompt to the generative output engine to obtain an output identifying the second set of issue tickets.

6. The computer-implemented method of claim 5, wherein the fourth prompt specifies a defined number of issue tickets to include as the key issue tickets.

7. The computer-implemented method of claim 2, wherein performing the query at the issue tracking platform to identify the second set of issue tickets comprises determining a vector representation of the key issue tickets; and performing a semantic search at the issue tracking platform using the vector representation of the key issue tickets.

8. The computer-implemented method of claim 1, wherein performing the clustering operation comprises:

performing a first clustering operation to separate issue tickets of the first set of issue tickets into multiple cluster groups including the cluster group; and performing a semantic noise reassignment operation causing one or more issue tickets to be moved between cluster groups of the multiple cluster groups.

9. The computer-implemented method of claim 8, further comprising:

generating, for each of the multiple cluster groups, a respective prompt comprising a subset of issue tickets assigned to a respective cluster group and instructions for defining a respective problem definition for the subset of issue tickets and a respective product specification document defining parameters for a respective automated assistant service configured to be used to resolve a problem for the subset of issue tickets in the respective cluster group; and generating, using one or more outputs obtained in response to providing each respective prompt to the generative output engine, the respective automated assistant service, each respective automated assistant service configured to be utilized by the automated processing service when servicing a new issue ticket.

10. A computer-implemented method, comprising:

obtaining, at a first server system, a first set of issue tickets corresponding to issues managed by an issue tracking platform;

extracting issue content from the first set of issue tickets, the issue content extracted from a message thread associated with each issue ticket of the first set of issue tickets and comprising:

input information generated by a respective first user of the issue tracking platform as part of a service request; and support information generated by a respective second user of the issue tracking platform as part of an issue response;

generating a first prompt comprising the extracted issue content for the first set of issue tickets and prompt text comprising instructions for identifying resolution steps and corresponding customer inputs for each issue ticket;

providing the first prompt to a generative output engine and obtaining a first structured data set, the first structured data set comprising, for each issue ticket of the first set of issue tickets, one or more resolution steps for a respective issue ticket and one or more customer inputs corresponding to the one or more resolution steps for the respective issue ticket;

performing a clustering operation on the first structured data set, the clustering operation comprising:

performing a first clustering operation to separate issue tickets of the first set of issue tickets into multiple cluster groups;

for a first cluster group of the multiple cluster groups, identifying a first subset of issue tickets as key issue tickets; and performing, using the key issue tickets, a query at the issue tracking platform to identify a second set of issue tickets that satisfy a similarity metric with respect to the key issue tickets;

generating a second prompt comprising the key issue tickets and the second set of issue tickets, and instructions for defining a problem definition for issue tickets included in the second prompt and a product specification document defining parameters configured to be used to generate an automated assistant service to resolve the issue tickets included in the second prompt;

providing the second prompt to the generative output engine and obtaining a second structured data set comprising the problem definition and the product specification document;

generating the automated assistant service using the second structured data set, the automated assistant service configured to be utilized by an automated processing service when processing an issue submitted to the issue tracking platform; and in response to receiving a new issue ticket determined to correspond to the problem definition, causing the automated processing service to utilize the automated assistant service to perform one or more operations for the new issue ticket.

11. The computer-implemented method of claim 10, wherein the parameters defined in the product specification document comprise required inputs to be obtained by the automated assistant service, required tool configurations for the automated assistant service and a set of operational steps to be implemented by the automated assistant service utilizing the required inputs and the required tool configurations.

12. The computer-implemented method of claim 11, wherein the required inputs define one or more data sources that the automated assistant service is configured to access and the required tool configurations define a query language to be used by the automated assistant service to obtain data from the one or more data sources.

13. The computer-implemented method of claim 11, wherein the operational steps define a multi-step process and each step in the multi-step process comprises an action to be performed by the automated assistant service in relation to the new issue ticket.

14. The computer-implemented method of claim 13, wherein the parameters define one or more syntax rules for performing one or more steps of the multi-step process.

15. The computer-implemented method of claim 10, wherein each issue ticket of the first set of issue tickets is associated with an escalation event indicating transition of a respective issue ticket from an automated support system to a user-based support system.

16. The computer-implemented method of claim 10, wherein extracting the issue content comprises excluding issue content that is not included in the message thread associated with each issue ticket of the first set of issue tickets.

17. A computer-implemented method, comprising:

obtaining, at a first server system, a first set of issue tickets corresponding to issues managed by an issue tracking platform;

extracting issue content from the first set of issue tickets, the issue content extracted from a message thread associated with each issue ticket of the first set of issue tickets and comprising:

input information generated by a first user of the issue tracking platform as part of a service request; and support information generated by a second user of the issue tracking platform as part of an issue response;

generating a first prompt comprising the extracted issue content for the first set of issue tickets and prompt text comprising instructions for identifying resolution steps and corresponding customer inputs for each issue ticket;

providing the first prompt to a generative output engine and obtaining a first set of structured data, the first set of structured data comprising, for each issue ticket of the first set of issue tickets, one or more resolution steps for a respective issue ticket and one or more customer inputs corresponding to the one or more resolution steps for the respective issue ticket;

performing a clustering operation on the first set of structured data, the clustering operation comprising:

performing a first clustering operation to separate issue tickets of the first set of issue tickets into multiple cluster groups; and performing a second clustering operation causing one or more issue tickets to be moved between cluster groups of the multiple cluster groups;

generating, for each of the multiple cluster groups, a respective prompt comprising a subset of issue tickets assigned to a respective cluster group and instructions for defining a problem definition for the subset of issue tickets and a product specification document defining parameters for an automated assistant service configured to be used to resolve a problem for the subset of issue tickets in the respective cluster group; and generating, using one or more outputs obtained in response to providing each respective prompt to the generative output engine, multiple automated assistant services; and in response to receiving a new issue ticket that is categorized as corresponding the problem definition, causing one of the multiple automated assistant services to perform one or more operations for the new issue ticket.

18. The computer-implemented method of claim 17, wherein the second clustering operation comprises a semantic noise reassignment operation.

19. The computer-implemented method of claim 17, wherein the parameters defined in the product specification document comprise required inputs to be obtained by the automated assistant service, required tool configurations for the automated assistant service and a set of operational steps to be implemented by the automated assistant service utilizing the required inputs and the required tool configurations.

20. The computer-implemented method of claim 19, wherein the operational steps define a multi-step process and each step in the multi-step process comprises an action performed by the automated assistant service in relation to the new issue.

* * * * *